United States Patent
Wijekoon et al.

(10) Patent No.: US 12,206,324 B2
(45) Date of Patent: Jan. 21, 2025

(54) DC/DC POWER CONVERTER, METHOD FOR CONTROLLING SWITCHING THEREOF, DC/DC POWER CONVERTER ARRANGEMENT AND SYSTEM

(71) Applicant: HUAWEI TECHNOLOGIES CO., LTD., Shenzhen (CN)

(72) Inventors: Piniwan Thiwanka Bandara Wijekoon, Nuremberg (DE); Zhaohui Wang, Nuremberg (DE); Jun Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 277 days.

(21) Appl. No.: 17/991,645

(22) Filed: Nov. 21, 2022

(65) Prior Publication Data
US 2023/0089387 A1 Mar. 23, 2023

Related U.S. Application Data

(63) Continuation of application No. PCT/CN2020/116278, filed on Sep. 18, 2020.

(51) Int. Cl.
*H02M 3/07* (2006.01)
*H02M 1/00* (2006.01)
*H02M 3/00* (2006.01)

(52) U.S. Cl.
CPC ............ *H02M 3/07* (2013.01); *H02M 1/007* (2021.05); *H02M 1/009* (2021.05); *H02M 3/01* (2021.05)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18;
(Continued)

(56) References Cited

U.S. PATENT DOCUMENTS 11,011,990 B2 *  5/2021 Grbovic ................. H02M 7/483
11,146,170 B2 * 10/2021 Xiong ..................... H02M 3/07
(Continued)

FOREIGN PATENT DOCUMENTS

WO    2019145015 A1   8/2019
WO    2019145016 A1   8/2019

*Primary Examiner* — Jeffrey A Gblende
(74) *Attorney, Agent, or Firm* — Leydig, Voit & Mayer, Ltd.

(57) ABSTRACT

A DC/DC power converter for converting voltage at an input to a voltage at an output of the DC/DC power converter is provided, wherein the output voltage is a multiple of the input voltage. The DC/DC power converter comprises two switching circuits electrically connected in series, two capacitor units electrically connected in series, and a resonant circuit comprising a resonant capacitor and a resonant inductor. A first switching circuit of the two switching circuits is electrically connected to one side of the first capacitor unit opposite to the other side of the first capacitor unit connected to the second capacitor unit of the two capacitor units. The switches of the first switching circuit are controllable semiconductor switches. The first switching circuit comprises one or more diode units electrically connecting the first capacitor unit to the two switching units of the first switching circuit.

22 Claims, 14 Drawing Sheets

(58) Field of Classification Search
CPC ... G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H02M 1/0048; H05B 39/048; B23K 11/24; H04B 2215/069

See application file for complete search history.

(56) References Cited

U.S. PATENT DOCUMENTS

| | | |
|---|---|---|
| 11,316,426 B2 * | 4/2022 | Grbovic ............... H02M 3/156 |
| 2009/0261793 A1 | 10/2009 | Urakabe et al. |
| 2018/0278177 A1 | 9/2018 | Glovinsky et al. |

* cited by examiner

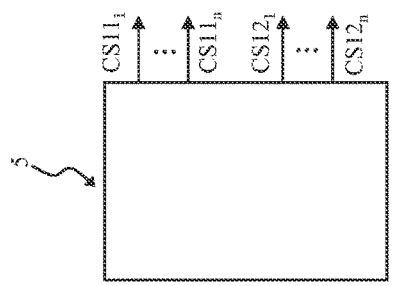
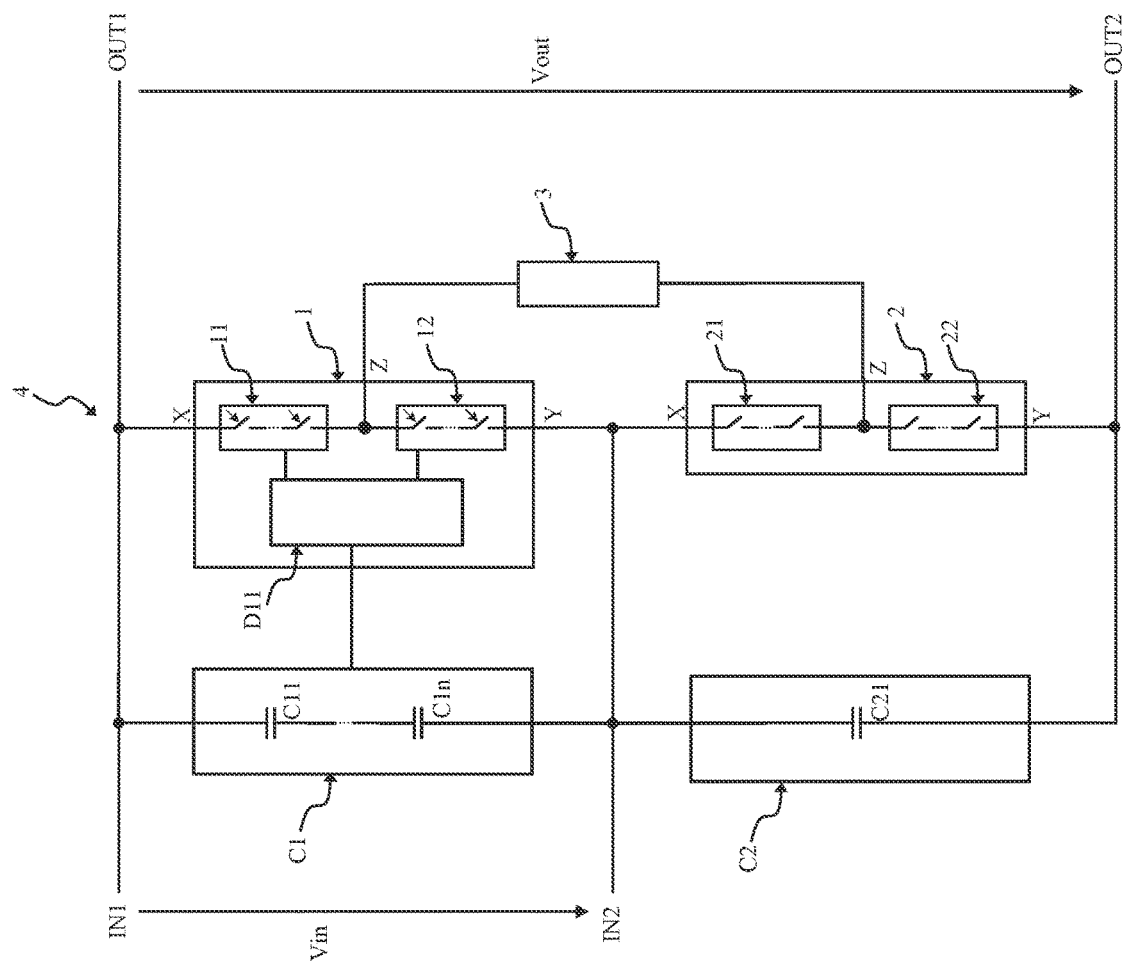
Figure 2(A)
Figure 2(B)

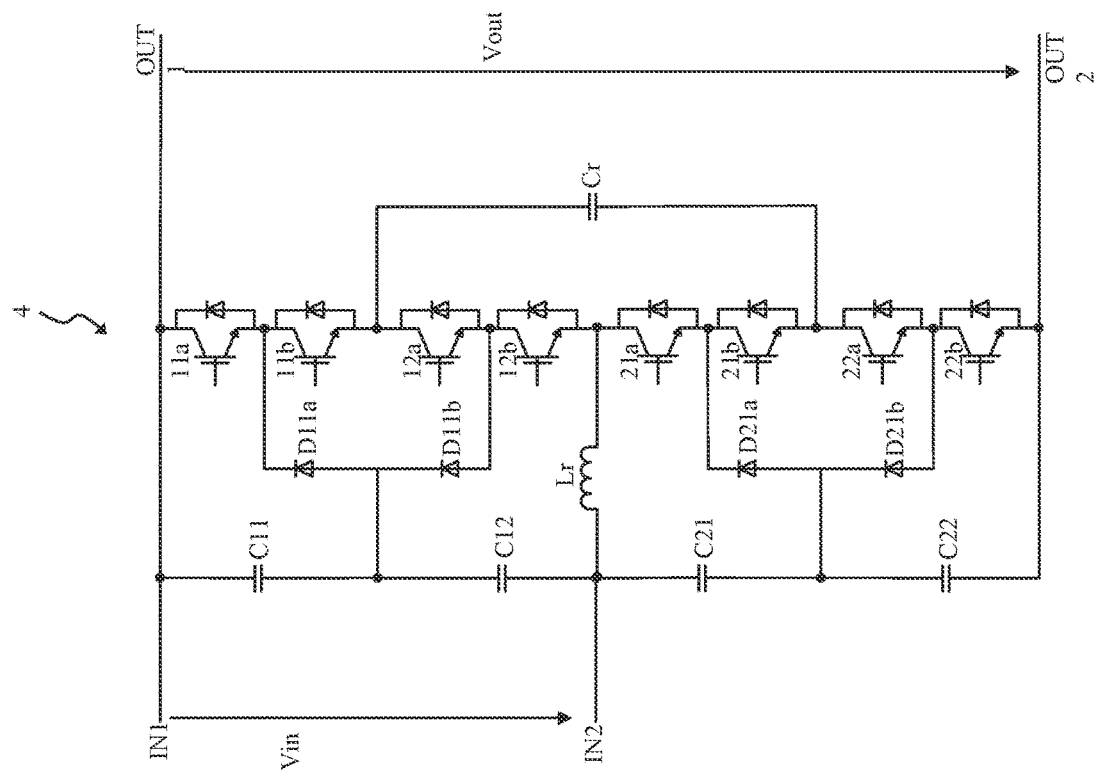
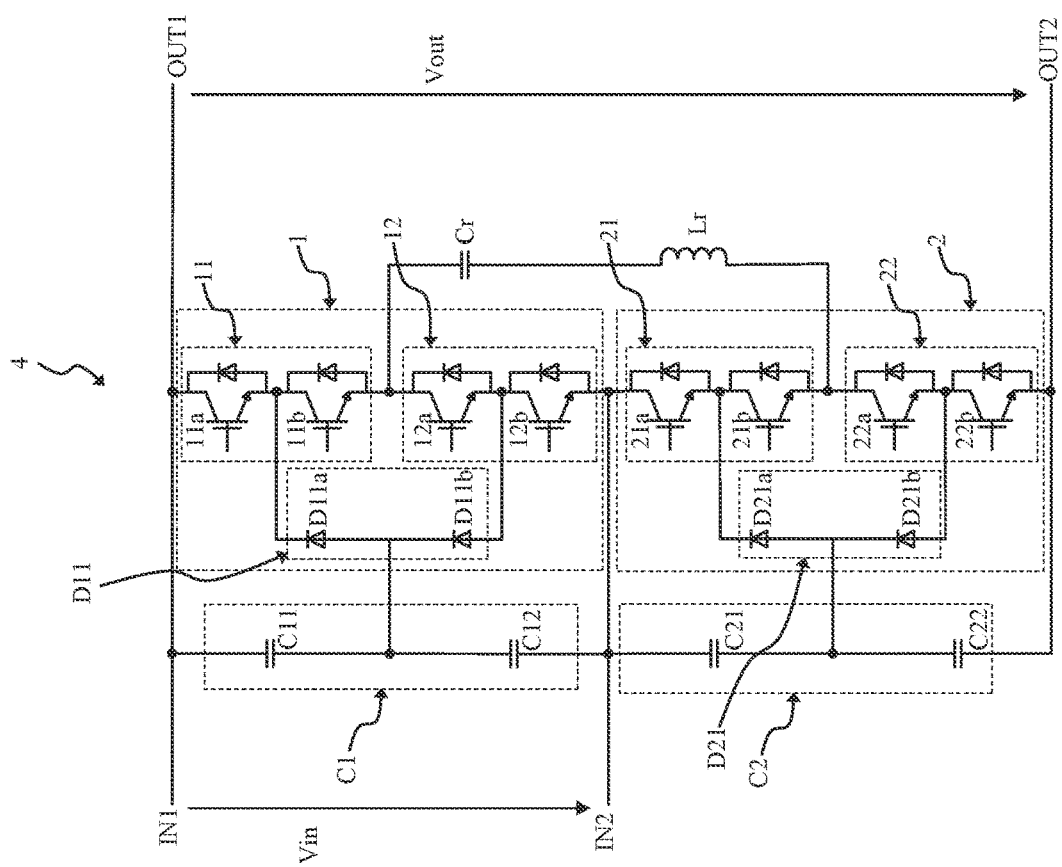

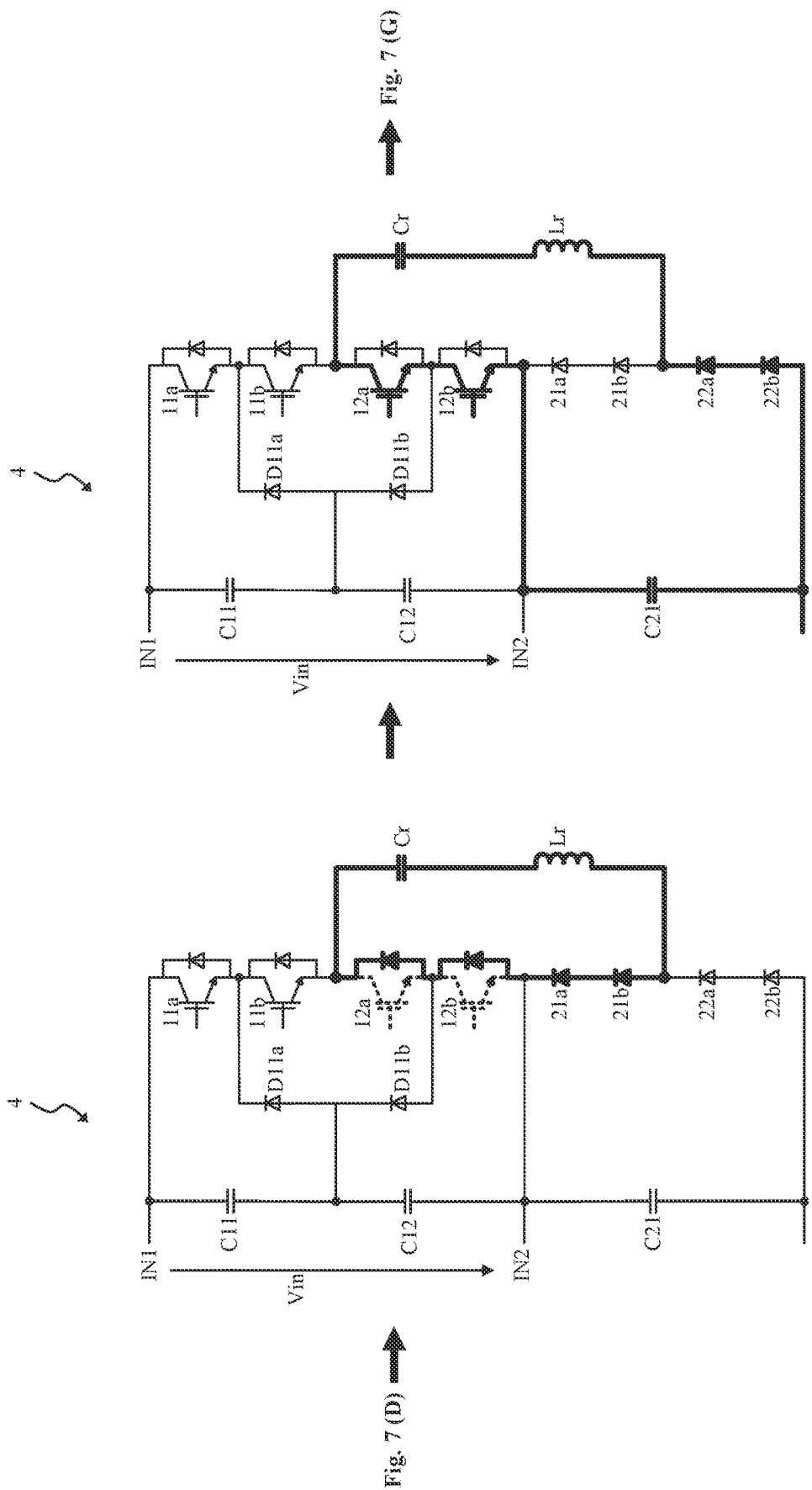

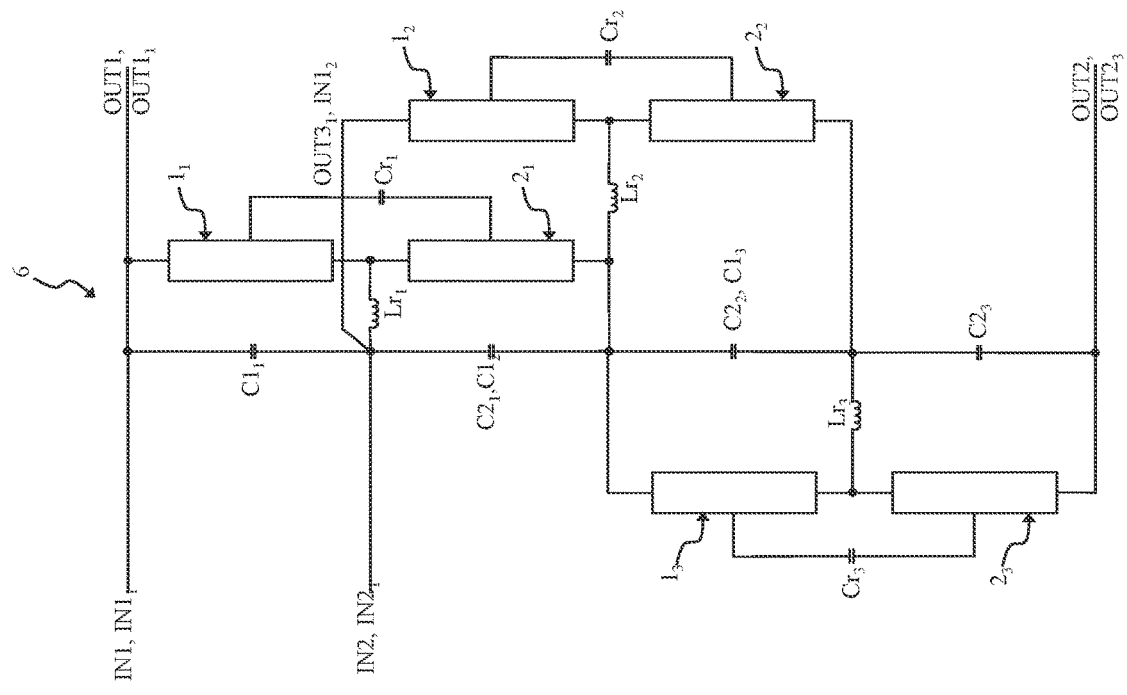
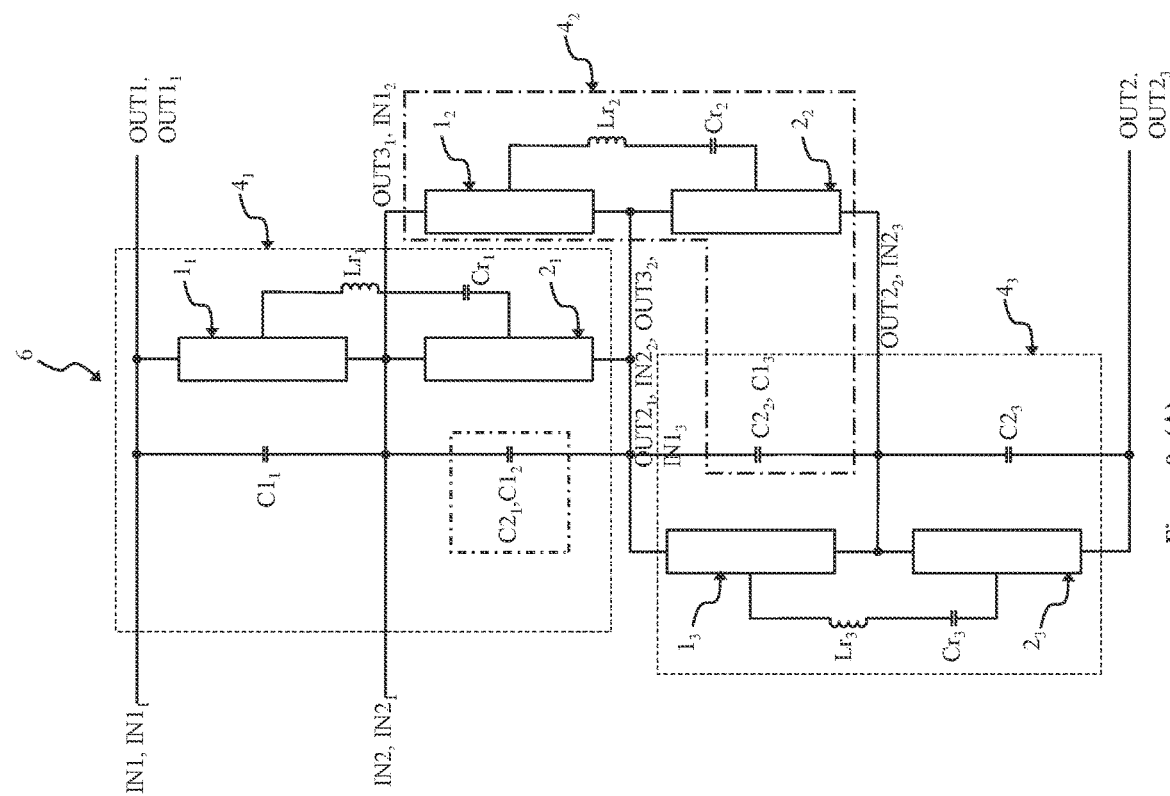
Figure 9 (A)
Figure 9 (B)

DC/DC POWER CONVERTER, METHOD FOR CONTROLLING SWITCHING THEREOF, DC/DC POWER CONVERTER ARRANGEMENT AND SYSTEM

CROSS-REFERENCE TO RELATED APPLICATIONS

This application is a continuation of International Application No. PCT/CN2020/116278, filed on Sep. 18, 2020, the disclosure of which is hereby incorporated by reference in its entirety.

TECHNICAL FIELD

The present disclosure relates to a DC/DC power converter, a method for controlling switching of such a DC/DC power converter, a DC/DC power converter arrangement comprising a cascade of a plurality of DC/DC power converters and a system comprising such a DC/DC power converter or such a DC/DC power converter arrangement. In particular, the present disclosure relates to a DC/DC power converter comprising a resonant circuit.

BACKGROUND

DC/DC power converters are configured to convert one DC voltage level to another DC voltage level. Thus, they are used for connecting one DC voltage level to another DC voltage level. DC/DC power converters are used in different technical fields. For example, a DC/DC power converter may be used in a renewable energy device such as a photo-voltaic device or a wind energy device configured to transform one level of DC to another level. A DC/DC power converter may also be used in fixed voltage transfer applications such as for DC/DC conversion in server power suppliers or power suppliers used in telecommunication equipment.

SUMMARY

Embodiments of the present disclosure are also based on the following considerations:

FIG. 1 shows a DC/DC power converter based on a resonant balancer concept, i.e. the DC/DC power converter comprises a resonant circuit with a resonant capacitor Cr and a resonant inductor Lr for converting a first DC voltage Vin (input voltage) at input terminals IN1 and IN2 to a second DC voltage Vout (output voltage) at output terminals OUT1 and OUT2, wherein the second DC voltage Vout is a multiple of the first DC voltage Vin. That is, the second DC voltage Vout is greater than the first DC voltage Vin. For example, the DC/DC power converter may be configured to converter the first DC voltage Vin (e.g. Vin=1 V) to the second DC voltage Vout such that the second DC voltage Vout is two times the first DC voltage Vin (e.g. Vout=2·1 V=2 V). The resonant balancer concept is used to generate a mirror effect of one voltage level to another voltage level. A main advantage of the resonant balancer concept is a high efficiency, because the DC/DC power converter based on the resonant balancer concept is operating at almost no switching losses. That is, the switching of the switches S01, S02, S03 and S04 of the DC/DC power converter of FIG. 1 during the operation of the DC/DC power converter causes almost no switching losses as a result of using the resonant balancer concept.

As shown in FIG. 1, four controllable semiconductor switches S01, S02, S03 and S04 in the form of insulated gate bipolar transistors (IGBTs) are electrically connected in series to each other. The term "connected" is used herein as a synonym for the term "electrically connected". A resonant circuit (which also may be referred to as resonant tank) comprises a series connection of a resonant capacitor Cr and a resonant inductor Lr. The series connection of the resonant capacitor Cr and the resonant inductor Lr is connected on one side to the node between the topmost two switches S01 and S02 of the series connection of the four switches S01, S02, S03 and S04 and on the other side to the node between the bottommost two switches S03 and S04 of the series connection of the four switches S01, S02, S03 and S04.

The terms "top" and "highest" may be used as synonym for the term "topmost". That is, the topmost element in a series connection of a plurality of elements may be referred to as the top element in said series connection or as the highest element in said series connection. The highest/topmost element in a series connection of a plurality of elements is at the highest/topmost position in the series connection of the plurality of elements. The topmost element is the preceding element of the second-topmost element in the series connection of the plurality of elements. The second-topmost element in the series connection of the plurality of elements is the subsequent element of the topmost element and the preceding element of the third-topmost element. The third-topmost element in the series connection of the plurality of elements is the subsequent element of the second-topmost element and the preceding element of the fourth-topmost element and so on.

The terms "bottom" and "lowest" may be used as synonym for the term "bottommost". That is, the bottommost element in a series connection of a plurality of elements may be referred to as the bottom element in said series connection or as the lowest element in said series connection. The lowest/bottommost element in a series connection of a plurality of elements is at the lowest/bottommost position in the series connection of the plurality of elements. The bottommost element is the subsequent element of the second-bottommost element in the series connection of the plurality of elements. The second-bottommost element in the series connection of the plurality of elements is the preceding element of the bottommost element and the subsequent element of the third-bottommost element. The third-bottommost element in the series connection of the plurality of elements is the preceding element of the second-bottommost element and the subsequent element of the fourth-bottommost element and so on.

The term "previous" may be used as a synonym for the term "preceding". The term "successive" may be used as a synonym for the term "subsequent".

As shown in FIG. 1, a series connection of two capacitors C1 and C2 is connected in parallel to the series connection of the four switches S01, S02, S03 and S04. The midpoint of the series connection of the two capacitors C1 and C2 and the midpoint of the series connection of the fours witches S01, S02, S03 and S04 are connected to each other.

As shown in FIG. 1, the input of the DC/DC power converter is connected in parallel to the topmost capacitor C1 (a first capacitor) of the series connection of the two capacitors C1 and C2 and in parallel to the two topmost switches S01 and S02. In particular, a second input terminal IN2 of the input is connected to the side of the topmost capacitor C1 forming the midpoint with the bottommost capacitor C2 (second capacitor) and a first input terminal IN1 of the input is connected to the other side of the topmost capacitor C1. The output of the DC/DC power converter is connected in parallel to the series connection of the two capacitors C1 and C2 and the series connection of the four switches S01, S02, S03 and S04. In particular, as shown in FIG. 1, a first output terminal OUT1 is connected to one side of the series connection of the two capacitors C1 and C2 and to one side of the series connection of the four switches S01, S02, S03 and S04, to which the first input terminal IN1 of the input is connected to. A second output terminal OUT2 is connected to the other side of the series connection of the two capacitors C1 and C2 and the other side of the series connection of the four switches S01, S02, S03 and S04. An optional third output terminal OUT3 is electrically connected to the midpoint of the series connection of the two capacitor C1 and C2 and the midpoint of the series connection of the four switches S01, S02, S03 and S04.

The input (formed by the two input terminals IN1, IN2) and the output (formed by the two output terminals OUT1, OUT2 and optional third output terminal OUT3) of the DC/DC power converter may be referred to as energy ports of the DC/DC power converter. The four switches S01, S02, S03 and S04 are switchable such that the resonant circuit is excited between the input (i.e. energy port between IN1 and IN2) and output (energy port between OUT1 and OUT2) of the DC/DC power converter at constant duty cycle in order to match those two energy ports (i.e. energy port between IN1 and IN2=energy port between OUT1 and OUT3=energy port between OUT2 and OUT3). For operating the DC/DC power converter, the first switch S01 (topmost switch) and the third switch S03 (second-bottommost switch) are switched on and off together in complementary to the second switch S02 (second-topmost switch) and fourth switch S04 (bottommost switch), which are switched on and off together. That is, in case the first switch S01 and third switch S03 are switched from the non-conducting state to the conducting state, the second switch S02 and fourth switch S04 are switched from the conducting state to the non-conducting state and vice versa.

In case the first and third switch S01, S03 are switched on to the conducting state (the second and fourth switches S02, S04 are in the non-conducting state), then the resonant circuit starts resonating with the first capacitor C1 as voltage source. In case the second and fourth switch S02, S04 are switched on to the conducting state (the first and third switches S01, S03 are in the non-conducting state), then the resonant circuit starts resonating with the second capacitor C2 as voltage source. Thus, during such an operation of the DC/DC power converter, energy exchange between the two voltage sources C1 and C2 occurs, which internally balance their voltage levels after several resonant cycles. The DC/DC power converter of FIG. 1 is a non-isolated DC/DC power converter, because it converts the first voltage Vin at the input to the second voltage Vout at the output without a galvanic isolation.

Each switch S01, S02, S03 and S04 of the DC/DC power converter has to comprise a minimum blocking voltage of more than the highest voltage Vin at the input, i.e. between the first input terminal IN1 and the second input terminal IN2. As a result, in practical implementations these switches are implemented as high voltage devices to match with high DC link requirements, i.e. with high values for the first voltage Vin receivable at the input of the DC/DC power converter. The use of high voltage devices increases costs and reduces efficiency. For example, in solar photo-voltaic (solar PV) systems, the first voltage receivable by the input of a DC/DC power converter, such as the one of FIG. 1, may reach up to 1500 V. Typically, for a FIT (Failures in Time) rate of 100 the device operating voltage is 65% of the blocking voltage. That is, in case the first voltage received at the input of the DC/DC power converter reaches up to 1500 V, the switches S01, S02, S03 and S04 have to be rated for at least a blocking voltage of 2308 V (1500 V=0.65·2308 V).

In view of the above-mentioned problems and disadvantages, embodiments of the present application aim to improve the costs and efficiency of a DC/DC power converter comprising a resonant converter. An objective is to provide a DC/DC power converter with an improved efficiency and improved costs.

The objective is achieved by the embodiments of the application as described in the enclosed independent claims. Advantageous implementations of the embodiments of the application are further defined in the dependent claims.

A first aspect of the present disclosure provides a DC/DC power converter for converting voltage at an input of the DC/DC power converter to a voltage at an output of the DC/DC power converter, wherein the output voltage is a multiple of the input voltage. The DC/DC power converter comprises two switching circuits electrically connected in series, two capacitor units electrically connected in series, and a resonant circuit comprising a resonant capacitor and a resonant inductor. Each capacitor unit comprises one or more capacitors and the series connection of the two capacitor units is electrically connected in parallel to the series connection of the two switching circuits. The resonant circuit is electrically connected to the two switching circuits. A first capacitor unit of the two capacitor units is electrically connected in parallel to the input. The series connection of the two switching circuits is electrically connected in parallel to the output. Each switching circuit comprises two switching units electrically connected in series, wherein each switching unit comprises two or more switches electrically connected in series. A first switching circuit of the two switching circuits is electrically connected to one side of the first capacitor unit opposite to the other side of the first capacitor unit connected to the second capacitor unit of the two capacitor units. The switches of the first switching circuit are controllable semiconductor switches. The first capacitor unit comprises two or more capacitors electrically connected in series. The first switching circuit comprises one or more diode units electrically connecting the first capacitor unit to the two switching units of the first switching circuit.

The DC/DC power converter according to the first aspect reduces losses and, thus, comprises an improved efficiency. In addition, it reduces costs. Namely, since each switching unit of the two switching circuits comprises two or more switches, each switch may be implemented by a lower voltage semiconductor switch compared to the case, in which each switching unit is replaced by a single semiconductor switch, as it is the case in the DC/DC power converter of FIG. 1. Therefore, the DC/DC power converter topology according to the first aspect facilitates a highly integrated, low component count and high efficient DC/DC power converter.

Moreover, the two or more capacitors of the first capacitor unit and the one or more diode units of the first switching circuit allow providing a DC/DC power converter that is improved with respect to costs and component count. Namely, as a result of the two or more capacitors of the first capacitor unit and the one or more diode units of the first switching circuit, the controllable semiconductor switches of each switching unit of the first switching circuit may be switched separately for switching a respective switching unit from the conducting state to the non-conducting state or vice versa. As a result, there is no need of a pre-matching of the controllable semiconductor switches of the first switching circuit for similar switching times as well as no need of a complex driver circuitry for providing the driving signals respectively control signals in order to switch together the controllable semiconductor switches of each switching unit of the first switching circuit. This reduces the complexity, costs and component count for implementing the DC/DC power converter according to the first aspect, in particular for implementing the first switching circuit thereof.

The DC/DC power converter may be a DC/DC power converter without a galvanic isolation between its input and output. That is, the DC/DC power converter may be a non-isolated DC/DC power converter. The DC/DC power converter may also be referred to as resonant DC/DC power converter, DC/DC power converter based on resonant balancer concept, resonant balancer DC/DC power converter or resonant switched capacitor converter.

The voltage level of the voltage at the output (may also be referred to as output voltage) is greater than the voltage level of the voltage at the input (may also be referred to as input voltage), wherein the voltage level of the voltage at the output is a multiple of the voltage level of the voltage at the input. In particular, the voltage level of the voltage at the output may be an integer multiple of the voltage level of the voltage at the input. That is, the output voltage may be an integer multiple of the input voltage.

In particular, the absolute value of the output voltage is greater than the absolute value of the input voltage, wherein the absolute value of the output voltage is a multiple of the absolute value of the input voltage. The absolute value of the output voltage may be an integer multiple of the absolute value of the input voltage.

The term "connected" is used as a synonym for the term "electrically connected".

The side of the first capacitor unit, to which the first switching unit is connected to, is not connected to the second capacitor unit of the two capacitor units. The other side of the first capacitor unit forms with one side of the second capacitor unit the midpoint of the series connection of the two capacitor units. The midpoint of a series connection of two elements corresponds to the node between the two elements. For example, the midpoint of the series connection of the two switching units of a switching circuit corresponds to the node between the two switching units of the switching circuit.

A capacitor unit has two sides. In case a capacitor unit comprises or corresponds to one capacitor the two sides of the capacitor unit correspond to the two sides of the one capacitor. In case a capacitor unit comprises two or more capacitors, the two or more capacitor units are connected in series. In this case, the two sides of the capacitor unit correspond to the two ends of the series connection of the two or more capacitors. A side of a capacitor unit may be referred to as terminal of the capacitor unit. Accordingly, a side of a capacitor may be referred to as terminal of the capacitor. Thus, the first switching circuit of the two switching circuits is electrically connected to a first terminal of the first capacitor unit opposite to the second terminal of the first capacitor unit connected to the second capacitor unit of the two capacitor units. The first terminal of the first capacitor unit is not connected to the second capacitor unit of the two capacitor units.

The first capacitor unit comprises or corresponds to two or more capacitors electrically connected in series. The second capacitor unit comprises or corresponds to one or more capacitor. In case the second capacitor unit comprises or corresponds to two or more capacitors, the two or more capacitors are electrically connected in series. That is, the two or more capacitors of the first capacitor unit and the one or more capacitors of the second capacitor unit are electrically connected in series.

The two capacitor units may be referred to as input capacitor units, DC bus capacitor units or bulk storage capacitor units.

The resonant circuit may be electrically connected between the midpoint of the two switching units of the first switching circuit and the midpoint of the two switching units of the second switching circuit of the two switching circuits. The resonant circuit may also be referred to as resonant tank. The resonant capacitor may comprise or correspond to one or more capacitors electrically connected in series and/or parallel to each other. The resonant inductor may comprise or correspond to one or more inductors electrically connected in series and/or parallel to each other. The capacitance of each of the two or more capacitors of the first capacitor unit and the one or more capacitors of the second capacitor unit is greater than the resonant capacitor such that these capacitors do not contribute to resonance of the resonant circuit.

Each switching circuit comprises or corresponds to two switching units electrically connected in series. Each switching unit comprises or corresponds to two or more switches electrically connected in series. That is, the switching units of the two switching circuits are connected in series to each other. The switches of the two switching circuits are connected in series to each other.

Examples of a controllable semiconductor switch are a bipolar junction transistor (BJT), a field effect transistor (FET), such as a metal-oxide semiconductor field effect transistor (MOSFET), and an insulated gate bipolar transistor (IGBT). Therefore, the switches of the first switching circuit may be one or more BJTs, one or more FETs, such as one or more MOSFETs, and/or one or more IGBTs. That is, the controllable semiconductor switches may be transistors. According to an embodiment, the switches of the first switching circuit are of the same switch type, in particular of the same transistor type.

In case a switch is a controllable semiconductor switch, in particular a transistor, a diode may be connected in antiparallel to the controllable semiconductor switch. In case a switch is an IGBT, a diode may be connected in anti-parallel to the IGBT. In particular, the diode is connected in parallel to the IGBT such that the anode of the diode is connected to the emitter terminal of the IGBT and the cathode of the diode is connected to the collector terminal of the IGBT.

The number of switches of each switching unit of the first switching circuit of the two switching circuits may be the same. Alternatively or additionally, the number of switches of each switching unit of the second switching circuit of the two switching circuits may be the same. The number of switches of each switching unit of the DC/DC power converter may be the same.

In an implementation form of the first aspect, the switches of the second switching circuit of the two switching circuits are uncontrollable semiconductor switches. Alternatively, in an implementation form of the first aspect, the switches of the second switching circuit of the two switching circuits are controllable semiconductor switches, the second capacitor unit comprises two or more capacitors electrically connected in series, and the second switching circuit comprises one or more diode units electrically connecting the second capacitor unit to the two switching units of the second switching circuit.

In case the switches of the second switching circuit are uncontrollable semiconductor switches, the switches of the second switching circuit are switched as a result of the voltages across the uncontrollable semiconductor switches caused by the switching of the controllable semiconductor switches of the first switching circuit. A control unit may control the switching. Thus, this reduces the control effort, because only the switching of the switches of the first switching circuit is controlled, and, thus, reduces costs for the control of the DC/DC power converter.

In case the switches of the first switching circuit and the switches of the second switching circuit are all controllable semiconductor switches, the power direction between the input and output of the DC/DC power converter may be bi-directional. This is advantageous, because the power may be delivered from the input to the output of the DC/DC power converter as well as from the output to the input of the DC/DC power converter. Moreover, the two or more capacitors of the second capacitor unit and the one or more diode units of the second switching circuit allow providing a DC/DC power converter that is improved with respect to costs and component count. Namely, as a result of the two or more capacitors of the second capacitor unit and the one or more diode units of the second switching circuit, the controllable semiconductor switches of each switching unit of the second switching circuit may be switched separately for switching a respective switching unit from the conducting state to the non-conducting state or vice versa. As a result, there is no need of a pre-matching of the controllable semiconductor switches of the second switching circuit for similar switching times as well as no need of a complex driver circuitry for providing the driving signals respectively control signals in order to switch together the controllable semiconductor switches of each switching unit of the second switching circuit. This reduces the complexity, costs and component count for implementing the DC/DC power converter according to the implementation form of the first aspect, in particular for implementing the second switching circuit thereof.

Therefore, in case the switches of each switching unit of a switching circuit of the two switching circuits, such as the first switching circuit and optionally the second switching circuit, are controllable semiconductor switches, the respective capacitor unit comprises two or more capacitors electrically connected in series and the switching circuit comprises one or more diode units electrically connecting the respective capacitor unit to the two switching units of the switching circuit. The respective capacitor unit corresponds to the capacitor unit that is at the same position in the series connection of the two capacitor units as the position of the switching circuit in the series connection of the two switching circuits.

The switches of the second switching circuit of the two switching circuits may be one or more uncontrollable semiconductor switches, such as diodes, and/or one or more controllable semiconductor switches, such as transistors. The uncontrollable semiconductor switches may also be referred to as uncontrollable unidirectional semiconductor switches. An example of an uncontrollable semiconductor switch is a diode.

The switches of the second switching circuit may be one or more bipolar junction transistors (BJTs), one or more field effect transistors (FETs), such as one or more metal-oxide semiconductor field effect transistors (MOSFETs), one or more insulated gate bipolar transistors (IGBTs) and/or one or more diodes. According to an embodiment, the switches of the second switching circuit are of the same switch type.

In case a switch is a controllable semiconductor switch, in particular a transistor, a diode may be connected in anti-parallel to the controllable semiconductor switch. In case a switch is an IGBT, a diode may be connected in anti-parallel to the IGBT. In particular, the diode is connected in parallel to the IGBT such that the anode of the diode is connected to the emitter terminal of the IGBT and the cathode of the diode is connected to the collector terminal of the IGBT.

In case the switches of the first switching circuit and the second switching circuit are controllable semiconductor switches, the power flow between the input and the output of the DC/DC power converter may be bi-directional. Therefore, in this case, the DC/DC power converter may be used for converting a first voltage at the output of the DC/DC power converter to a smaller second voltage at the input of the DC/DC power converter, wherein the second voltage is a division of the first voltage. In particular, the second voltage may be an integer division of the first voltage. That is, in the aforementioned case, power may be delivered from the input to the output of the DC/DC power converter as well as from the output to the input of the DC/DC power converter.

In an implementation form of the first aspect, in case the two or more switches of each switching unit of a switching circuit of the two switching circuits are two or more controllable semiconductor switches: the number of the two or more capacitors of a respective capacitor unit corresponds to the number of the two or more switches of each switching unit of the switching circuit, and the number of the one or more diode units of the switching circuit is one less than the number of the two or more switches of each switching unit of the switching circuit.

In this case, the switching units of the switching circuit comprise the same number of switches.

The two or more capacitors of the respective capacitor unit and the one or more diode units of the switching circuit allow providing a DC/DC power converter that is improved with respect to costs and component count. Namely, as a result of the aforementioned two or more capacitors and the aforementioned one or more diode units, the controllable semiconductor switches of each switching unit of the switching circuit may be switched separately for switching a respective switching unit from the conducting state to the non-conducting state or vice versa. As a result, there is no need of a pre-matching of the controllable semiconductor switches of the switching circuit for similar switching times as well as no need of a complex driver circuitry for providing the driving signals respectively control signals in order to switch together the controllable semiconductor switches of each switching unit of the switching circuit. This reduces the complexity, costs and component count for implementing the DC/DC power converter according to the implementation form of the first aspect.

The switching circuit corresponds to the first switching circuit. Optionally the switching circuit also corresponds to the second switching circuit, in case the switches of the second switching circuit are controllable semiconductor switches.

In other words, the number of the two or more capacitors of the first capacitor unit may be equal to the number of the two or more switches of each switching unit of the first switching circuit and the number of the one or more diode units of the first switching circuit may be one less than the number of the two or more switches of each switching unit of the first switching circuit, wherein the two switching units of the first switching circuit comprise the same number of switches. In case the switches of each switching unit of the second switching circuit are controllable semiconductor switches, the number of the two or more capacitors of the second capacitor unit may be equal to the number of the two or more switches (controllable semiconductor switches) of each switching unit of the second switching circuit and the number of the one or more diode units of the second switching circuit may be one less than the number of the two or more switches of each switching unit of the second switching circuit. The two switching units of the second switching circuit comprise the same number of switches.

Therefore, in case each switching unit of a switching circuit (such as the first switching circuit and optionally the second switching circuit) comprises two controllable semiconductor switches as switches, a respective capacitor unit comprises two capacitors and the switching circuit comprises one diode unit. In case each switching unit of a switching circuit comprises three controllable semiconductor switches as switches, a respective capacitor unit comprises three capacitors and the switching circuit comprises two diode units etc.

In an implementation form of the first aspect, in case each switching unit of a respective switching circuit comprises two controllable semiconductor switches connected in series, the respective switching circuit comprises one diode unit and a respective capacitor unit comprises two capacitors: the midpoint of the series connection of the two capacitors of the respective capacitor unit is connected via a first diode of the diode unit to the midpoint of the series connection of the two switches of a first switching unit of the respective switching circuit and via a second diode of the diode unit to the midpoint of the series connection of the two switches of a second switching unit of the respective switching circuit.

The two or more capacitors of the respective capacitor unit and the one or more diode units of the respective switching circuit allow providing a DC/DC power converter that is improved with respect to costs and component count for the reasons outlined already above.

The diode unit may comprise two diodes. The respective switching circuit corresponds to the first switching circuit and optionally to the second switching circuit.

In an implementation form of the first aspect, in case the respective switching circuit is the first switching circuit: the respective capacitor unit is the first capacitor unit, and the second switching unit of the first switching circuit is connected to the midpoint of the series connection of the two switching circuits. The midpoint of the series connection of the two capacitors of the first capacitor unit is connected to the anode of the first diode, wherein the cathode of the first diode is connected to the midpoint of the series connection of the two switches of the first switching unit. The midpoint of the series connection of the two capacitors of the first capacitor unit is connected to the cathode of the second diode, wherein the anode of the second diode is connected to the midpoint of the series connection of the two switches of the second switching unit.

The two or more capacitors of the first capacitor unit and the one or more diode units of the first switching circuit allow providing a DC/DC power converter that is improved with respect to costs and component count for the reasons outlined already above.

Alternatively or additionally, in case the respective switching circuit is the second switching circuit: the respective capacitor unit is the second capacitor unit, and the first switching unit of the second switching circuit is connected to the midpoint of the series connection of the two switching circuits. The midpoint of the series connection of the two capacitors of the second capacitor unit is connected to the anode of the first diode, wherein the cathode of the first diode is connected to the midpoint of the series connection of the two switches of the first switching unit. The midpoint of the series connection of the two capacitors of the second capacitor unit is connected to the cathode of the second diode, wherein the anode of the second diode is connected to the midpoint of the series connection of the two switches of the second switching unit.

The two or more capacitors of the second capacitor unit and the one or more diode units of the second switching circuit allow providing a DC/DC power converter that is improved with respect to costs and component count for the reasons outlined already above.

In an implementation form of the first aspect, in case each switching unit of a respective switching circuit comprises three or more controllable semiconductor switches connected in series, the respective switching circuit comprises two or more diode units and a respective capacitor unit comprises three or more capacitors: each node between two capacitors of the respective capacitor unit is connected via a first diode of a respective diode unit of the two or more diode units to a first node between two switches of a first switching unit of the two switching units of the respective switching circuit and via a second diode of the respective diode unit to a second node between two switches of the second switching unit of the two switching units of the respective switching circuit. The positon of the first node in the series connection of the three or more switches of the first switching unit and the positon of the second node in the series connection of the three or more switches of the second switching unit correspond to each other. The nodes (between two capacitors) of the series connection of the three or more capacitors of the respective capacitor unit are connected to different nodes of the two switching units of the respective switching circuit.

The three or more capacitors of the respective capacitor unit and the two or more diode units of the respective switching circuit allow providing a DC/DC power converter that is improved with respect to costs and component count for the reasons outlined already above.

The position of each node between two capacitors in the series connection of three or more capacitors of the respective capacitor unit, the position of the respective first node between two switches in the series connection of the three or more switches of the first switching unit and the position of the respective second node between two switches in the series connection of the three or more switches of the second switching unit correspond to each other.

That is, a node between two capacitors of a capacitor unit may be connected via a diode unit of a respective switching circuit to a first node between two switches of the first switching unit of the respective switching circuit. The first node is at the same position in the series connection of the three or more switches of the first switching unit as the position of the node between two capacitors in the series connection of three or more capacitors of the capacitor unit. Further, the node between two capacitors of the capacitor unit may be connected via the diode unit to a second node between two switches of the second switching unit of the respective switching circuit. The second node is at the same position in the series connection of the three or more switches of the second switching unit as the position of the node between two capacitors in the series connection of the three or more capacitors of the capacitor unit.

The respective switching circuit corresponds to the first switching circuit and optionally to the second switching circuit.

In an implementation form of the first aspect, in case the respective switching circuit is the first switching circuit: the respective capacitor unit is the first capacitor unit, and the second switching unit of the first switching circuit is connected to the midpoint of the series connection of the two switching circuits. Each node between two capacitors of the first capacitor unit is connected to the anode of the first diode of the respective diode unit of the two or more diode units, wherein the cathode of the first diode is connected to the respective first node between two switches of the first switching unit of the two switching units of the first switching circuit. In addition, each node between two capacitors of the first capacitor unit is connected to the cathode of the second diode of the respective diode unit, wherein the anode of the second diode is connected to the respective second node between two switches of the second switching unit of the two switching units of the first switching circuit.

The three or more capacitors of the first capacitor unit and the two or more diode units of the first switching circuit allow providing a DC/DC power converter that is improved with respect to costs and component count for the reasons outlined already above.

Alternatively or additionally, in case the respective switching circuit is the second switching circuit: the respective capacitor unit is the second capacitor unit, and the first switching unit of the second switching circuit is connected to the midpoint of the series connection of the two switching circuits. Each node between two capacitors of the second capacitor unit is connected to the anode of the first diode of the respective diode unit of the two or more diode units, wherein the cathode of the first diode is connected to the respective first node between two switches of the first switching unit of the two switching units of the second switching circuit. In addition, each node between two capacitors of the second capacitor unit is connected to the cathode of the second diode of the respective diode unit, wherein the anode of the second diode is connected to the respective second node between two switches of the second switching unit of the two switching units of the second switching circuit.

The three or more capacitors of the second capacitor unit and the two or more diode units of the second switching circuit allow providing a DC/DC power converter that is improved with respect to costs and component count for the reasons outlined already above.

In an implementation form of the first aspect, the two or more capacitors of the first capacitor unit are dimensioned such that the voltage at each capacitor of the first capacitor unit corresponds to the voltage at the first capacitor unit divided by the number of capacitors of the first capacitor unit.

This is advantageous, because the one or more capacitors of the first capacitor unit provide a voltage balancing across the switches of the first switching circuit such that at the switches of the first switching circuit the same voltage is applied. In particular, at the switches of the first switching circuit the voltage corresponding to the voltage at the first capacitor unit divided by the number of switches of the first switching circuit may be applied. Thus, the switches of the first switching circuit may be rated with a voltage corresponding to the voltage at the first capacitor unit divided by the number of switches of the first switching circuit.

The same applies to the second switching circuit of the two switching circuits, in case the switches of each switching unit of the second switching circuit are controllable semiconductor switches and the second capacitor unit comprises two or more capacitors. That is, the two or more capacitors of the second capacitor unit may be dimensioned such that the voltage at each capacitor of the second capacitor unit corresponds to the voltage at the second capacitor unit divided by the number of capacitors of the second capacitor unit.

This is advantageous, because the one or more capacitors of the second capacitor unit provide a voltage balancing across the switches of the second switching circuit such that at the switches of the second switching circuit the same voltage is applied in case the input of the DC/DC power converter receives the input voltage. In particular, at the switches of the second switching circuit the voltage corresponding to the voltage at the second capacitor unit divided by the number of switches of the second switching circuit may be applied. Thus, the switches of the second switching circuit may be rated with a voltage corresponding to the voltage at the second capacitor unit divided by the number of switches of the second switching circuit.

The voltage at a capacitor may also be referred to as the voltage across the capacitor or as the voltage of the capacitor.

In an implementation form of the first aspect, the resonant capacitor and the resonant inductor are connected in series between the midpoint of the series connection of the two switching units of the first switching circuit and the midpoint of the series connection of the two switching units of the second switching circuit. Alternatively, in an implementation form of the first aspect, the resonant capacitor is electrically connected between the midpoint of the series connection of the two switching units of the first switching circuit and the midpoint of the series connection of the two switching units of the second switching circuit, and the resonant inductor is electrically connected between the midpoint of the series connection of the two capacitor units and the midpoint of the series connection of the two switching circuits.

The resonant capacitor and resonant inductor enable the DC/DC power converter to be operating at resonant frequency, whereby almost no switching losses are dissipated. The resonant circuit enables soft switching and provides high efficiency.

The first switching circuit may be connected in parallel to the first capacitor unit and the second switching circuit may be connected in parallel to the second capacitor unit, in case the resonant capacitor and the resonant inductor are connected in series between the midpoint of the series connection of the two switching units of the first switching circuit and the midpoint of the series connection of the two switching units of the second switching circuit.

The midpoint of the series connection of the two capacitor units and the midpoint of the series connection of the two switching circuits may be electrically connected with each other, in case the resonant capacitor and the resonant inductor are connected in series between the midpoint of the series connection of the two switching units of the first switching circuit and the midpoint of the series connection of the two switching units of the second switching circuit.

In an implementation form of the first aspect, the input comprises two input terminals and the output comprises two output terminals. A first input terminal of the two input terminals and a first output terminal of the two output terminals is electrically connected to one end of the series connection of the two capacitor units and one end of the series connection of the two switching circuits, The second input terminal of the two input terminals is connected to the midpoint of the series connection of the two capacitor units. The second output terminal of the two output terminals is connected to the other end of the series connection of the two capacitor units and the other end of the series connection of the two switching circuits.

The first switching circuit and the first capacitor unit each may be connected to the first input terminal and the first output terminal. The second switching circuit and the second capacitor unit each may be connected to the second output terminal. In particular, the first capacitor unit may be connected between the first and second input terminal. The second capacitor unit may be connected between the second input terminal and the second output terminal. The first input terminal and the first output terminal may be connected to each other.

In an implementation form of the first aspect, the output comprises a third output terminal. The third output terminal may be electrically connected to the midpoint of the series connection of the two capacitor units and the midpoint of the series connection of the two switching circuits, in case the resonant capacitor and the resonant inductor are electrically connected in series. Alternatively, the third output terminal may be electrically connected to the midpoint of the series connection of the two capacitor units, in case the resonant inductor is electrically connected between the midpoint of the series connection of the two capacitor units and the midpoint of the series connection of the two switching circuits.

The optional third output terminal may be utilised for grounding requirements. The optional third output terminal allows providing two output voltages at the output, namely a first output voltage between the first output terminal and the third output terminal and a second output voltage between the third output terminal and the second output terminal. The first and second output voltages are smaller than the output voltage between the first and second output terminal.

In an implementation form of the first aspect, the DC/DC power converter comprises a control unit. The control unit is configured to complementary switch the switching units of the first switching circuit, optionally with a duty cycle of 50%, between the conducting state and the non-conducting state. Optionally, the control unit is configured to complementary switch the switching units of the first switching circuit and the second switching circuit, optionally with a duty cycle of 50%, between the conducting state and the non-conducting state.

The DC/DC power converter is based on a resonant balancer concept (i.e. the DC/DC power converter comprises the resonant circuit for the DC/DC conversion) and, thus, the control unit does not need a close loop control for operating the DC/DC power converter. Therefore, the DC/DC power converter according to the implementation form of the first aspect is advantageous, because this reduces the size, complexity and costs for controlling the DC/DC power converter, in particular the respective controllable semiconductor switches of the DC/DC power converter.

The control unit may comprise or correspond to a microcontroller, controller, microprocessor, processor, field programmable gate array (FPGA), application specific integrated circuit (ASIC) or any combination of the aforementioned components.

In case the control unit is configured to complementary switch the switching units of the second switching circuit, the switches of the second switching circuit are controllable semiconductor switches. The control unit may be configured to control the switching of the switching units in a feed-forward control (open loop control). That is the control unit may be configured to control the switching of the switching units without a feedback control (closed loop control).

A switching unit is in the conducting state when all the switches of the switching unit are in the conducting state. Correspondingly, a switching unit is in the non-conducting state when all the switches of the switching unit are in the non-conducting state. A switching unit is in a steady state when the switching unit is in the conducting state or in the non-conducting state. The conducting state may also be referred to as on state or as switched on state. The non-conducting state may also be referred to as off state or as switched off state.

In case the control unit is configured to complementary switch switching units of the first switching circuit and second switching circuit, the control unit may be configured to switch the switching units such that the switching units at the same position in the switching circuits are switched together. That is, the control unit may be configured to switch a first switching unit of the first switching circuit and a first switching unit of the second switching circuit from one state to the other state and at the same time to switch the second switching unit of the first switching circuit and the second switching unit of the second switching circuit from the other state to the one state.

The second switching unit of the first switching circuit is connected to the midpoint of the series connection of the two switching circuits, and the first switching unit of the first switching circuit is connected via the second switching unit to said midpoint. The first switching unit of the second switching circuit is connected to the midpoint of the series connection of the two switching circuits, and the second switching unit of the second switching circuit is connected via the first switching unit to said midpoint. The one state may be the conducting state and the other state may be the non-conducting state. Alternatively, the one state may be the non-conducting state and the other state may be the conducting state.

The control unit may be configured to complementary switch the switching units of the first switching circuit with a constant duty cycle of 50% between the conducting state and the non-conducting state. Optionally, the control unit may be configured to complementary switch the switching units of the first switching circuit and the second switching circuit with a constant duty cycle of 50% between the conducting state and the non-conducting state.

This is advantageous, because when switching the switching units of the first switching circuit and optionally the switching units of the second switching circuits (in case the switches of the second switching circuit are controllable semiconductor switches) with a constant duty cycle of 50% no complex control by the control units is needed.

In an implementation form of the first aspect, the control unit is configured to switch each switching unit of a respective switching circuit between the conducting state and non-conducting state by switching the switches of the respective switching unit after each other.

This allows using low voltage semiconductor devices and, thus, low cost controllable switches for implementing the controllable switches of the respective switching circuit without the need of pre-matching the controllable semiconductor switches for similar switching times and without the need of complex gate driver circuitry for providing the driving signals respectively control signals in order to switch together the controllable semiconductor switches of each switching unit of the respective switching circuit. This reduces the complexity, costs and component count for implementing the DC/DC power converter according to the implementation form of the first aspect.

In other words, the control unit may be configured to switch each switching unit of a respective switching circuit between the conducting state and non-conducting state by switching the switches of the respective switching unit one after the other.

The term "respective switching circuit" refers to each switching circuit with switching units that each comprise two or more controllable semiconductor switches. Namely, in case the two or more switches of each switching unit of a switching circuit correspond to two or more controllable semiconductor switches, the two or more switches of each switching unit of the switching circuit are controllable by the control unit.

That is, the control unit may be configured to control the switching of each switching unit of a respective switching circuit between the conducting state and non-conducting state such that at any time only one switch of the switches of the respective switching unit is switched.

For example, the control unit may be configured to control the switching of each switching unit of a respective switching circuit from the conducting state to the non-conducting state by switching the switches of the respective switching unit from the conducting state to the non-conducting state after each other. That is, at any time only one switch of the respective switching unit is switched by the control unit from the conducting state to the non-conducting state for switching the respective switching unit from the conducting state to the non-conducting state. Accordingly, the control unit may be configured to control the switching of each switching unit of a respective switching circuit from the non-conducting state to the conducting state by switching the switches of the respective switching unit from the non-conducting state to the conducting state after each other. That is, at any time only one switch of the respective switching unit is switched by the control unit from the non-conducting state to the conducting state for switching the respective switching unit from the non-conducting state to the conducting state.

The respective switching circuit corresponds to the first switching circuit. Optionally, the respective switching circuit corresponds to the first switching circuit and the second switching circuit.

In an implementation form of the first aspect, the control unit is configured to complementary switch the two switching units of a respective switching circuit between the conducting and non-conducting state by alternately switching the switches of the two switching units of the respective switching circuit.

This reduces the complexity, costs and component count for implementing the DC/DC power converter according to the implementation form of the first aspect for the reasons described already above.

The respective switching circuit corresponds to the first switching circuit. Optionally, the respective switching circuit corresponds to the first switching circuit and the second switching circuit.

In an implementation form of the first aspect, the control unit is configured to switch each switching unit of the two switching units of a respective switching circuit from the conducting state to the non-conducting state by switching the two or more switches of the respective switching unit from the conducting state to the non-conducting state after each other according to the position in the series connection of the two or more switches of the respective switching unit such that the switch of the respective switching unit furthest away from the midpoint of the series connection of the two switching units of the respective switching circuit is switched at first from the conducting state to the non-conducting state.

The respective switching circuit corresponds to the first switching circuit. Optionally, the respective switching circuit corresponds to the first switching circuit and the second switching circuit.

The term "furthest away" is to be understood as "furthest away in terms of nodes". That is, the passage "switch of the respective switching unit furthest away from the midpoint of the series connection of the two switching units" is to be understood as "switch of the respective switching unit furthest away from the midpoint of the series connection of the two switching units in terms of nodes (that are present between said switch and said midpoint).

In an implementation form of the first aspect, the control unit is configured to switch each switching unit of the two switching units of a respective switching circuit from the non-conducting state to the conducting state by switching the two or more switches of the respective switching unit from the non-conducting state to the conducting state after each other according to the position in the series connection of the two or more switches of the respective switching unit such that the switch of the respective switching unit connected to the midpoint of the series connection of the two switching units of the respective switching circuit is switched at first from the non-conducting state to the conducting state.

The respective switching circuit corresponds to the first switching circuit. Optionally, the respective switching circuit corresponds to the first switching circuit and the second switching circuit. Each switching circuit comprises a first switching unit and a second switching unit.

The second switching unit of the first switching circuit is connected to the midpoint of the series connection of the two switching circuits, and the first switching unit of the first switching circuit is connected via the second switching unit to said midpoint. The first switching unit of the second switching circuit is connected to the midpoint of the series connection of the two switching circuits, and the second switching unit of the second switching circuit is connected via the first switching unit to said midpoint. That is, between the two ends of the series connection of the two switching circuits, starting at one end of the two ends, the first switching unit of the first switching circuit is followed by the second switching unit of the first switching circuit, which is followed by the first switching unit of the second switching circuit. The first switching unit of the second switching circuit is followed by the second switching unit of the second switching circuit.

The following is true in case the switches of the first switching circuit are controllable semiconductor switches, such as transistors (e.g. IGBTs or MOSFETs), and the switches of the second switching circuit are uncontrollable semiconductor switches, such as diodes:

The control unit may be configured to switch the first switching unit of the first switching circuit from the conducting state to the non-conducting state and the second switching unit of the first switching circuit from the non-conducting state to the conducting state, by alternately switching the switches of the first switching unit and the switches of the second switching unit, such that at first a switch of the first switching unit is switched from the conducting state to the non-conducting state followed by a switch of the second switching unit being switched from the non-conducting state to the conducting state, the switches of the first switching unit are switched after each other from the conducting state to the non-conducting state, and the switches of the second switching unit are switched after each other from the non-conducting state to the conducting state.

Additionally or alternatively, the control unit may be configured to switch the first switching unit of the first switching circuit from the non-conducting state to the conducting state and the second switching unit of the first switching circuit from the conducting state to the non-conducting state, by alternately switching the switches of the first switching unit and the switches of the second switching unit, such that at first a switch of the second switching unit is switched from the conducting state to the non-conducting state followed by a switch of the first switching unit being switched from the non-conducting state to the conducting state, the switches of the second switching unit are switched after each other from the conducting state to the non-conducting state, and the switches of the first switching unit are switched after each other from the non-conducting state to the conducting state.

The following is true in case the switches of the first switching circuit and the switches of the second switching circuit are controllable semiconductor switches, such as transistors (e.g. IGBTs or MOSFETs):

The control unit may be configured to switch the first switching units together from the conducting state to the non-conducting state and the second switching units together from the non-conducting state to the conducting state, by alternately switching the switches of the first switching units and the switches of the second switching units, such that at first a switch of each first switching unit is switched from the conducting state to the non-conducting state (the position of the switches of the first switching units correspond to each other) followed by a switch of each second switching unit being switched from the non-conducting state to the conducting state (the position of the switches of the second switching units correspond to each other), the switches of each first switching unit are switched after each other from the conducting state to the non-conducting state, and the switches of each second switching unit are switched after each other from the non-conducting state to the conducting state.

Additionally or alternatively, the control unit may be configured to switch the first switching units together from the non-conducting state to the conducting state and the second switching units together from the conducting state to the non-conducting state, by alternately switching the switches of the first switching units and the switches of the second switching units, such that at first a switch of each second switching unit is switched from the conducting state to the non-conducting state (the position of the switches of the second switching units correspond to each other) followed by a switch of each first switching unit being switched from the non-conducting state to the conducting state (the position of the switches of the first switching units correspond to each other), the switches of each second switching unit are switched after each other from the conducting state to the non-conducting state, and the switches of each first switching unit are switched after each other from the non-conducting state to the conducting state.

In an implementation form of the first aspect, the control unit is configured to switch the switching units between the conducting state and the non-conducting state with a switching frequency that is smaller or equal to the resonant frequency of the resonant circuit.

The switching frequency may be matched with the resonant frequency of the resonant circuit. The resonant frequency is dedicated by $$f_{res} = \frac{1}{2\pi\sqrt{C_r L_r}},$$

wherein $f_{res}$ is the resonant frequency of the resonant circuit, $C_r$ is the resonant capacitor of the resonant circuit and $L_r$ is the resonant inductor of the resonant circuit.

In order to achieve the DC/DC power converter according to the first aspect of the present disclosure, some or all of the implementation forms and optional features of the first aspect, as described above, may be combined with each other.

A second aspect of the present disclosure provides a method for controlling switching of a DC/DC power converter according to the first aspect or any of its implementation forms, wherein the switching units of the first switching circuit are complementary switched, by a control unit, optionally with a duty cycle of 50%, between the conducting state and the non-conducting state. Optionally the switching units of the first switching circuit and the second switching circuit are complementary switched, by a control unit, optionally with a duty cycle of 50%, between the conducting state and the non-conducting state.

The control unit may be an external control unit or a control unit of the DC/DC power converter. The control unit may comprise or correspond to a microcontroller, controller, microprocessor, processor, field programmable gate array (FPGA), application specific integrated circuit (ASIC) or any combination of the aforementioned components.

In an implementation form of the second aspect, the control unit switches each switching unit of a respective switching circuit between the conducting state and non-conducting state by switching the switches of the respective switching unit after each other.

In an implementation form of the second aspect, the control unit complementary switches the two switching units of a respective switching circuit between the conducting and non-conducting state by alternately switching the switches of the two switching units of the respective switching circuit.

In an implementation form of the second aspect, the control unit switches each switching unit of the two switching units of a respective switching circuit from the conducting state to the non-conducting state by switching the two or more switches of the respective switching unit from the conducting state to the non-conducting state after each other according to the position in the series connection of the two or more switches of the respective switching unit such that the switch of the respective switching unit furthest away from the midpoint of the series connection of the two switching units of the respective switching circuit is switched at first from the conducting state to the non-conducting state.

In an implementation form of the second aspect, the control unit switches each switching unit of the two switching units of a respective switching circuit from the non-conducting state to the conducting state by switching the two or more switches of the respective switching unit from the non-conducting state to the conducting state after each other according to the position in the series connection of the two or more switches of the respective switching unit such that the switch of the respective switching unit connected to the midpoint of the series connection of the two switching units of the respective switching circuit is switched at first from the non-conducting state to the conducting state.

In an implementation form of the second aspect, the control unit switches the switching units between the conducting state and the non-conducting state with a switching frequency that is smaller or equal to the resonant frequency of the resonant circuit.

The description of the implementation forms and optional features of the DC/DC power converter according to the first aspect is correspondingly valid for the method according to the second aspect.

The method of the second aspect and its implementation forms and optional features achieve the same advantages as the DC/DC power converter of the first aspect and its respective implementation forms and respective optional features.

In order to achieve the method according to the second aspect of the present disclosure, some or all of the implementation forms and optional features of the second aspect, as described above, may be combined with each other.

A third aspect of the present disclosure provides a DC/DC power converter arrangement comprising a cascade of a plurality of DC/DC power converters that are cascaded. Each DC/DC power converter comprises two switching circuits electrically connected in series, two capacitor unis electrically connected in series, and a resonant circuit comprising a resonant capacitor and a resonant inductor. Each capacitor unit comprises one or more capacitors and the series connection of the two capacitor units is electrically connected in parallel to the series connection of the two switching circuits. The resonant circuit is electrically connected to the two switching circuits. A first capacitor unit of the two capacitor units is electrically connected in parallel to an input of the DC/DC power converter and the series connection of the two switching circuits is electrically connected in parallel to an output of the DC/DC power converter. The output of a first DC/DC power converter of the plurality of DC/DC power converters is electrically connected to the input of a second DC/DC power converter of the plurality of DC/DC power converters such that the first capacitor unit of the second DC/DC power converter is connected in parallel to the second capacitor unit of the two capacitor units of the first DC/DC power converter.

A first switching circuit of the two switching circuits of a DC/DC power converter may be electrically connected to one side of the first capacitor unit of the DC/DC power converter opposite to the other side of the first capacitor unit connected to the second capacitor unit of the two capacitor units of the DC/DC power converter.

The first capacitor unit of the second DC/DC power converter and the second capacitor unit of the first DC/DC power converter may be implemented by a single capacitor unit that corresponds to the parallel connection of these two capacitor units. In other words, the parallel connection of the first capacitor unit of the second DC/DC power converter and the second capacitor unit of the first DC/DC power converter may be replaced by a capacitor unit that corresponds to said parallel connection.

The DC/DC power converter arrangement is configured to convert a first voltage (input voltage) at an input of the DC/DC power converter arrangement to a second voltage (output voltage) at an output of the DC/DC power converter arrangement, wherein the second voltage is a multiple of the first voltage. In particular, the second voltage is a multiple of the first voltage and may be greater than two times the first voltage. The second voltage may be an integer multiple of the first voltage.

According to an implementation form, the second voltage may be an integer multiple of the first voltage, wherein the integer multiple is one more than the number of DC/DC power converters of the DC/DC power converter arrangement.

The input of the DC/DC power converter arrangement may correspond to the input of the first DC/DC power converter of the plurality of DC/DC power converters.

In an implementation form of the third aspect, the input of each further DC/DC power converter of the plurality of DC/DC power converters is connected to the output of a respective preceding DC/DC power converter such that the first capacitor unit of the respective further DC/DC power converter is connected in parallel to the second capacitor unit of the respective preceding DC/DC power converter.

The first capacitor unit of the respective further DC/DC power converter and the second capacitor unit of the respective preceding DC/DC power converter may be implemented by a single capacitor unit that corresponds to the parallel connection of these two capacitor units. In other words, the parallel connection of the first capacitor unit of the respective further DC/DC power converter and the second capacitor unit of the respective preceding DC/DC power converter may be replaced by a capacitor unit that corresponds to said parallel connection.

In an implementation form of the third aspect, one or more DC/DC power converters of the plurality of DC/DC power converters correspond to the DC/DC power converter according to the first aspect or any of its implementation forms.

The DC/DC power converter arrangement may comprise one control unit, which is configured to control the plurality of DC/DC power converters. In particular, the control unit may be configured to perform the method according to the second aspect or any of its implementation forms for controlling the plurality of DC/DC power converters.

The control unit of the DC/DC power converter arrangement may comprise or correspond to a microcontroller, controller, microprocessor, processor, field programmable gate array (FPGA), application specific integrated circuit (ASIC) or any combination of the aforementioned components.

The control unit may correspond to a control unit of one DC/DC power converter of the plurality of DC/DC power converters, wherein the one DC/DC power converter is the DC/DC power converter according to the first aspect or any of its implementation forms.

In case two or more DC/DC power converters of the DC/DC power converter arrangement comprises a control unit for controlling the respective DC/DC power converter, the control units of these two or more DC/DC power converters may be configured to communicate with each other.

According to an embodiment of the present disclosure, each DC/DC power converter of the plurality of DC/DC power converters may correspond to the DC/DC power converter according to the first aspect or any of its implementation forms.

The implementation forms and optional features of the DC/DC power converter according to the first aspect are correspondingly valid for the DC/DC power converter arrangement according to the third aspect, in particular for one or more of the plurality of DC/DC power converters of the DC/DC power converter arrangement according to the third aspect.

The DC/DC power converter arrangement of the third aspect and its implementation forms and optional features achieve the same advantages as the DC/DC power converter of the first aspect and its respective implementation forms and respective optional features.

In order to achieve the DC/DC power converter arrangement of the third aspect of the present disclosure, some or all of the implementation forms and optional features of the third aspect, as described above, may be combined with each other.

A fourth aspect of the present disclosure provides a system.

The system comprises a DC/DC power converter according to the first aspect or any of its implementation forms, and a source that is connected to the input of the DC/DC power converter. The source is configured to provide a DC input voltage to the input of the DC/DC power converter and the DC/DC power converter is configured to convert the DC input voltage to a DC output voltage, wherein the DC output voltage is a multiple of the DC input voltage. In particular, the DC output voltage may be two times greater than the DC input voltage.

In other words, the DC/DC power converter is configured to convert the DC input voltage to a DC output voltage, wherein the level of the DC output voltage is greater than the level of the DC input voltage. In particular, the level of the DC output voltage may be two times greater than the level of the DC input voltage.

Alternatively, the system comprises a DC/DC power converter arrangement according to the third aspect or any of its implementation forms, and a source that is connected to the input of the DC/DC power converter arrangement. In particular, the source may be connected to the input of the first DC/DC power converter of the DC/DC power converter arrangement. The source is configured to provide a DC input voltage to the input of the DC/DC power converter arrangement and the DC/DC power converter arrangement is configured to convert the DC input voltage to a DC output voltage, wherein the DC output voltage is a multiple of the DC input voltage. In particular, the DC output voltage is a multiple of the DC input voltage and may be greater than two times the DC input voltage.

According to an implementation form, the DC output voltage (of the DC/DC power converter arrangement) may be an integer multiple of the DC input voltage, wherein the integer multiple is one more than the number of DC/DC power converters of the DC/DC power converter arrangement.

In other words, the DC/DC power converter arrangement is configured to convert the DC input voltage to a DC output voltage, wherein the level of the DC output voltage is a multiple of the level of the DC input voltage and optionally is greater than two times the level of the DC input voltage. According to an implementation form, the level of the DC output voltage may be an integer multiple of the level of the DC input voltage, wherein the integer multiple is one more than the number of DC/DC power converters of the DC/DC power converter arrangement.

The terms "level" and "voltage level" are used as synonyms.

The source may comprise or correspond to
a preceding DC/DC power converter arrangement, and/or
an AC/DC power converter, and/or
a battery (optionally rechargeable), and/or
a solar photo-voltaic (PV) system with one or more solar PV panels, and/or
one or more solar PV strings, and/or
a wind energy system etc.

The preceding DC/DC power converter arrangement may correspond to the DC/DC power converter according to the first aspect or any of its implementation forms or to the DC/DC power converter arrangement according to the third aspect or any of its implementation forms.

In an implementation form of the fourth aspect, the system may further comprise an electric circuit that is connected to the output of the DC/DC power converter. Alternatively, the system may further comprise an electric circuit that is connected to the output of the DC/DC power converter arrangement. In particular, the electric circuit may be connected to the output of the last DC/DC power converter in the cascade of DC/DC power converters of the DC/DC power converter arrangement.

The electric circuit may comprise or correspond to
a DC/DC power converter arrangement, and/or
a DC/AC power converter, and/or
a DC transmission system, and/or
a solid state transformer, and/or
an electric load.

The DC/DC power converter arrangement may correspond to the DC/DC power converter according to the first aspect or any of its implementation forms or to the DC/DC power converter arrangement according to the third aspect or any of its implementation forms.

The implementation forms and optional features of the DC/DC power converter according to the first aspect are correspondingly valid for the system according to the fourth aspect, in particular for the DC/DC power converter of the system according to the fourth aspect. The implementation forms and optional features of the DC/DC power converter arrangement according to the third aspect are correspondingly valid for the system according to the fourth aspect, in particular for the DC/DC power converter arrangement of the system according to the fourth aspect.

The system of the fourth aspect and its implementation forms and optional features achieve the same advantages as the DC/DC power converter of the first aspect and its respective implementation forms and respective optional features.

In order to achieve the system of the fourth aspect of the present disclosure, some or all of the implementation forms and optional features of the fourth aspect, as described above, may be combined with each other.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms will be explained in the following description of specific embodiments in relation to the enclosed drawings, in which FIG. 1 exemplarily shows a DC/DC power converter comprising a resonant circuit.

FIG. 2(A) shows a DC/DC power converter, according to an embodiment of the present application.

FIG. 2(B) shows an optional control unit of a DC/DC power converter, according to an embodiment of the present application.

FIGS. 4(A) and (B) each show a DC/DC power converter, according to an embodiment of the present application.

FIGS. 9(A) and (B) each show a DC/DC power converter arrangement, according to an embodiment of the present application.

In the Figures, corresponding elements are labelled with same reference identifiers.

DETAILED DESCRIPTION OF EMBODIMENTS

Figure 1:
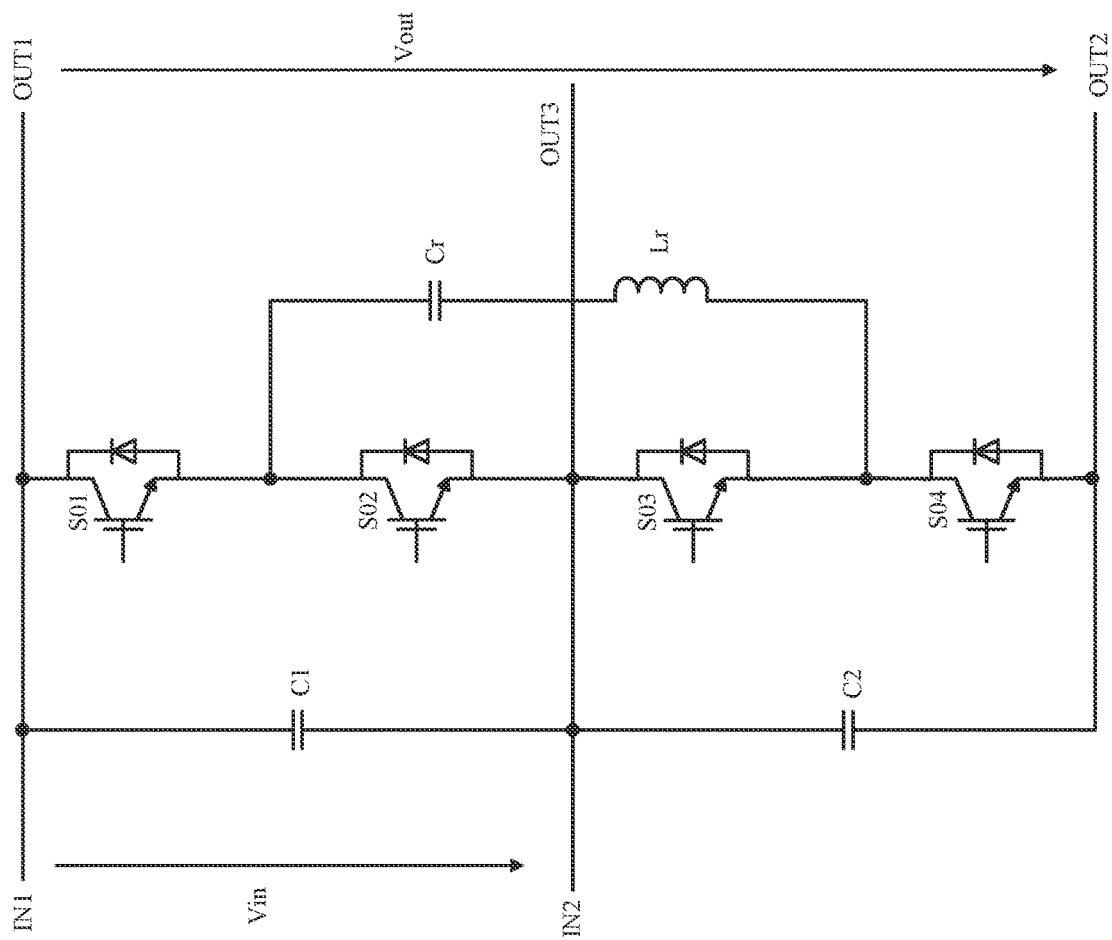

FIG. 2(A) shows a DC/DC power converter, according to an embodiment of the present application.

The above description of the DC/DC power converter of the first aspect or any of its implementation forms is accordingly valid for the DC/DC power converter 4 of FIG. 2(A).

The DC/DC power converter 4 of FIG. 2(A) comprises a resonant circuit 3, a series connection of two switching circuits 1 and 2 and a series connection of two capacitor units C1 and C2. The series connection of the two capacitor units C1, C2 is connected in parallel to the series connection of the two switching circuits 1, 2. The resonant circuit 3 is electrically connected to the two switching circuits 1, 2.

The DC/DC power converter 4 further comprises an input with two input terminals IN1, IN2 and an output with two output terminals OUT1, OUT2. The DC/DC power converter 4 is configured to convert a voltage Vin (input voltage) at the input to a voltage Vout (output voltage) at the output, wherein the voltage Vout at the output is a multiple of the voltage Vin at the input.

A first capacitor unit C1 of the two capacitor units C1, C2 is connected in parallel to the input of the DC/DC power converter 4 such that the voltage Vin receivable at the input of the DC/DC power converter 4 corresponds to the voltage across the first capacitor unit C1. The series connection of the two switching circuits 1, 2 is connected in parallel to the output of the DC/DC power converter 4 such that the voltage Vout at the output of the DC/DC power converter 4 corresponds to the voltage across the series connection of the two switching circuits 1, 2.

A first switching circuit 1 of the two switching circuits 1, 2 is connected to one side of the first capacitor unit C1 opposite to the other side of the first capacitor unit C1 connected to the second capacitor unit C2 of the two capacitor units C1, C2. Thus, the second switching circuit 2 of the two switching circuits 1, 2 is connected to one side of the second capacitor unit C2 opposite to the other side of the second capacitor unit C2 connected to the first capacitor unit C1.

Figure 3:
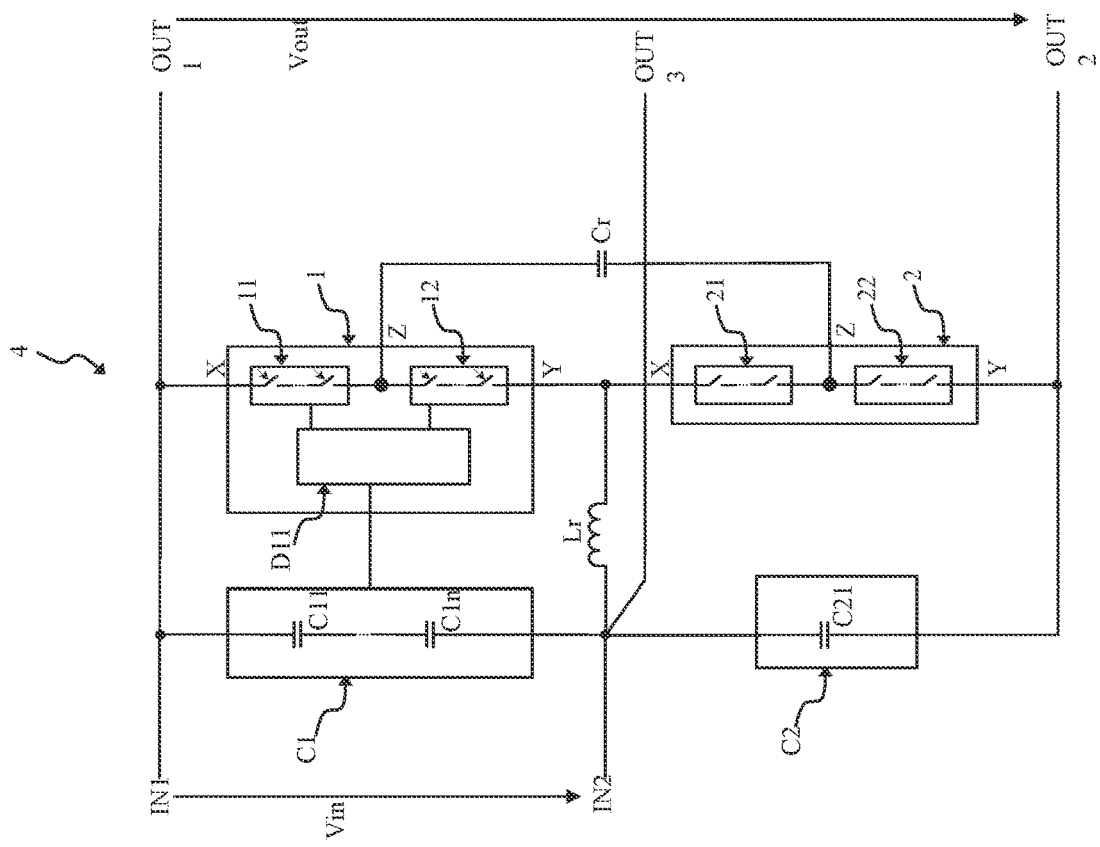
FIGS. 3(A) and (B) each show a DC/DC power converter, according to an embodiment of the present application.
Figure 3:
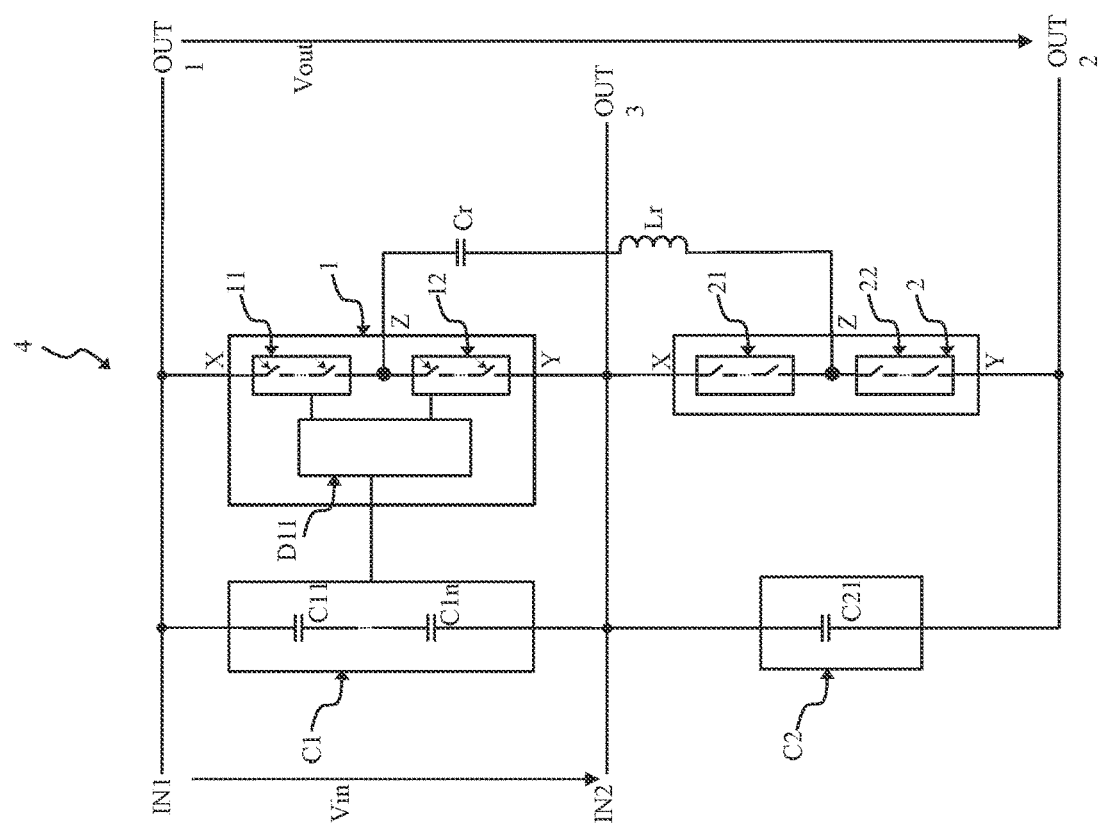

The resonant circuit 3 comprises a resonant capacitor Cr (not shown in FIG. 2(A)) and a resonant inductor Lr (not shown in FIG. 2(A)). According to one alternative, the resonant capacitor Cr and the resonant inductor Lr may be connected in series, wherein this series connection is connected on one side to the first switching circuit 1 and on the other side to the second switching circuit 2. This alternative is shown in FIG. 3(A). In this case, the midpoint of the series connection of the two capacitor units C1, C2 and the midpoint of the series connection of the two switching circuits 1, 2 are connected to each other (as shown in FIGS. 2 (A) and 3(A)). According to another alternative, the resonant capacitor Cr may be connected on one side to the first switching circuit 1 and on the other side to the second switching circuit 2. In addition, the resonant inductor Lr may be connected between the midpoint of the series connection of the two capacitor units C1, C2 and the midpoint of the series connection of the two switching circuits 1, 2. This alternative is shown in FIG. 3(B). In this case, the midpoint of the series connection of the two capacitor units C1, C2 is connected via the resonant inductor Lr to the midpoint of the series connection of the two switching circuits 1, 2 (not shown in FIG. 2(A), but shown in FIG. 3(B)).

The first switching circuit 1 comprises two switching units 11 and 12 that are connected in series. The second switching circuit 2 comprises two switching units 21 and 22 that are connected in series. Thus, the four switching units 11, 12, 21 and 22 are connected in series to each other. Each switching unit of the four switching units 11, 12, 21 and 22 comprises two or more switches that are electrically connected in series. That is, the switches (of the four switching units 11, 12, 21 and 22) of the two switching circuits 1, 2 are electrically connected in series.

The two or more switches of each switching unit 11, 12 of the first switching circuit 1 are controllable semiconductor switches, such as transistors. Therefore, the switching of the switches of the first switching circuit 1 may be actively controlled by a control unit (this is indicated in FIG. 2(A) by the arrows at each switch of the first and second switching unit 11, 12 of the first switching circuit 1). For example, the switches of each switching unit 11, 12 of the first switching circuit 1 may be one or more bipolar junction transistors (BJTs), one or more field effect transistors (FETs), such as one or more metal-oxide semiconductor field effect transistors (MOSFETs), and/or one or more insulated gate bipolar transistors (IGBTs).

Since the switches of the first switching circuit 1 are controllable semiconductor switches, the first capacitor unit C1 comprises two or more capacitors C11, . . . , C1n (n≥2) and the first switching circuit 1 comprises one or more diode units D11. The one or more diode units D11 electrically connect the first capacitor unit C1 to the two switching units 11, 12 of the first switching circuit 1. The second capacitor unit C2 comprises one or more capacitors C21.

The switches of each switching unit 21, 22 of the second switching circuit 2 may either be uncontrollable semiconductor switches, such as diodes, or controllable semiconductor switches, such as transistors. The aforementioned first alternative is shown in FIG. 5 and the aforementioned second alternative is shown in FIG. 4. In case, the switches of the second switching circuit 2 are controllable semiconductor switches, then the second capacitor unit C2 comprises two or more capacitors and the second switching circuit 2 comprises one or more diode units. The one or more diode units electrically connect the second capacitor unit C2 to the two switching units 21, 22 of the second switching circuit 2 (not shown in FIG. 2(A), but shown in FIG. 4).

The capacitance of each of the two or more capacitors C11, . . . , Cn of the first capacitor unit C1 and the one or more capacitors C21 of the second capacitor unit C2 is greater than the capacitance of the resonant capacitor Cr of the resonant circuit 3 such that these capacitors do not contribute to resonance of the resonant circuit 3.

The number of switches of each switching unit of the first switching circuit 1 and/or the second switching circuit 2 may be the same. The switches of each switching unit 11, 12 of the first switching circuit 1 (being controllable semiconductor switches) may be of the same switch type. The switches of each switching unit 21, 22 of the second switching circuit 2 may be of the same switch type.

A first input terminal IN1 of the input and a first output terminal OUT1 of the output are connected to each other. The second input terminal IN2 of the input and the midpoint between the series connection of the two capacitor units C1, C2 are connected to each other. The series connection of the two capacitor units C1, C2 is connected between the first input terminal IN1 and the second output terminal OUT2 of the output and the series connection of the two switching circuits 1, 2 is connected between the first output terminal OUT 1 and the second output terminal OUT 2.

According to FIG. 2(A), each switching circuit 1, 2 comprises an X-terminal, a Y-terminal and a Z-terminal. The X-terminal of the first switching circuit 1 is connected to the first input terminal IN1 and the first output terminal OUT 1. The Y-terminal of the first switching circuit 1 is connected to the X-terminal of the second switching circuit 2. The Y-terminal of the second switching circuit 2 is connected to the second output terminal OUT 2 and to one side of the second capacitor unit C2 opposite to the side of the second capacitor unit C2 that is connected to the first capacitor unit C1. The Z-terminal of the first switching circuit 1 and the Z-terminal of the second switching circuit 2 are connected to the resonant circuit 3. As shown in FIG. 2(A), the series connection of the two switching units 11 and 12 of the first switching circuit 1 is connected between the X-terminal and Y-terminal of the first switching circuit 1. The Z-terminal of the first switching circuit 1 is connected to the midpoint of the series connection of the two switching units 11 and 12 of the first switching circuit 1. Further, as shown in FIG. 2(A), the series connection of the two switching units 21 and 22 of the second switching circuit 2 is connected between the X-terminal and Y-terminal of the second switching circuit 2. The Z-terminal of the second switching circuit 2 is connected to the midpoint of the series connection of the two switching units 21 and 22 of the second switching circuit 2.

The topmost switching unit 11 of the series connection of the two switching units 11, 12 of the first switching circuit 1 may be referred to as first switching unit of the first switching circuit 1. Among the two switching units 11, 12 of the first switching circuit 1, the topmost switching unit 11 (first switching unit 11) of the first switching circuit 1 is furthest away from the midpoint of the series connection of the two switching circuits 1, 2. The bottommost switching unit 12 of the series connection of the two switching units 11, 12 of the first switching circuit 1 may be referred to as second switching unit of the first switching circuit 1. The bottommost switching unit 12 (second switching unit 12) of the first switching circuit 1 is connected to the midpoint of the series connection of the two switching circuits 1, 2. The first switching unit 11 of the first switching circuit 1 is connected via the second switching unit 12 of the first switching circuit 1 to the midpoint of the series connection of the two switching circuits 1, 2.

The topmost switching unit 21 of the series connection of the two switching units 21, 22 of the second switching circuit 2 may be referred to as first switching unit of the second switching circuit 2. The topmost switching unit 21 (first switching unit 21) of the second switching circuit 2 is connected to the midpoint of the series connection of the two switching circuits 1, 2. The bottommost switching unit 22 of the series connection of the two switching units 21, 22 of the second switching circuit 2 may be referred to as second switching unit of the second switching circuit 2. Among the two switching units 21, 22 of the second switching circuit 2, the bottommost switching unit 22 (second switching unit 22) of the second switching circuit 2 is furthest away from the midpoint of the series connection of the two switching circuits 1, 2. The second switching unit 22 of the second switching circuit 2 is connected via the first switching unit 21 of the second switching circuit 2 to the midpoint of the series connection of the two switching circuits 1, 2.

Optionally, the DC/DC power converter 4 may comprise a control unit configured to complementary switch the switching units 11, 12 of the first switching circuit 1 between the conducting state and the non-conducting state. An example of such a control unit is shown in FIG. 2(B). According to an embodiment, the control unit is configured to complementary switch the switching units 11, 12 of the first switching circuit 1 with a duty cycle of 50%.

In case, the switches of the second switching circuit 2 are controllable semiconductor switches, the optional control unit may be configured to complementary switch the switching units 11, 12, 21, 22 of the first switching circuit 1 and the second switching circuit 2 between the conducting state and the non-conducting state. The optional control unit may be configured to switch the first switching units 11 and 21 of the first and second switching circuit 1, 2 from the conducting state to the non-conducting state, while switching the second switching units 12 and 22 of the first and second switching circuit 1, 2 from the non-conducting state to the conducting state. Accordingly, the optional control unit may be configured to switch the first switching units 11 and 21 of the first and second switching circuit 1, 2 from the non-conducting state to the conducting state, while switching the second switching units 12 and 22 of the first and second switching circuit 1, 2 from the conducting state to the non-conducting state. According to an embodiment, the control unit is configured to complementary switch the switching units 11, 12, 21, 22 of the first and second switching circuit 1, 2 with a duty cycle of 50%.

The control unit may be configured to switch each switching unit of the first switching circuit 1 and optionally second switching circuit 2 between the conducting state and the non-conducting state by switching the switches (controllable semiconductor switches) of the respective switching unit after each other.

An example of a control of the switching of the switches of the first switching circuit 1 and optionally the second switching circuit 2 is described below with respect to FIGS. 7(A) to (J).

FIG. 2(B) shows an optional control unit of a DC/DC power converter, according to an embodiment of the present application.

The description of the control unit of the DC/DC power converter according to the first aspect or any of its implementation forms is valid for the control unit 5 of FIG. 2(B). The control unit 5 of FIG. 2(B) is configured to perform the method according to the second aspect or any of its implementation forms.

The control unit 5 may comprise or correspond to a microcontroller, controller, microprocessor, processor, field programmable gate array (FPGA), application specific integrated circuit (ASIC) or any combination of the aforementioned components.

The control unit 5 is configured to provide to each of the controllable semiconductor switches of the first switching circuit 1 control signals $CS11_1, \ldots, CS11_n, CS12_1, \ldots, CS12_n$ for controlling the switching of the controllable semiconductor switches. In case the switches of the second switching circuit 2 are also controllable semiconductor switches, the control unit 5 may be configured to provide to each of the controllable semiconductor switches of the second switching circuit 2 control signals for controlling the switching of the controllable semiconductor switches.

FIGS. 3(A) and 3(B) each show a DC/DC power converter, according to an embodiment of the present application.

The DC/DC power converter 4 of FIG. 3(A) and the DC/DC power converter 4 of FIG. 3(B) correspond to the DC/DC power converter 4 of FIG. 2(A). Thus, the description of the DC/DC power converter 4 of FIG. 2(A) is correspondingly valid for the DC/DC power converters 4 of FIGS. 3(A) and (B). Therefore, in the following mainly additional features of the DC/DC power converters 4 of FIGS. 3(A) and (B) with respect to the DC/DC power converter of FIG. 2 are described. The FIGS. 3(A) and (B) show two implementation forms of the resonant circuit 3.

According to FIG. 3(A) the resonant capacitor Cr and resonant inductor Lr of the resonant circuit 3 are connected in series to each other. The series connection of the resonant capacitor Cr and the resonant inductor Lr is connected on one side to the first switching circuit 1, in particular to the Z-terminal of the first switching circuit 1, and on the side to the second switching circuit 2, in particular to the Z-terminal of the second switching circuit 2.

According to FIG. 3(B) the resonant capacitor Cr is connected on one side to the first switching circuit 1, in particular to the Z-terminal of the first switching circuit 1, and on the side to the second switching circuit 2, in particular to the Z-terminal of the second switching circuit 2. The resonant inductor Lr is connected between the midpoint of the series connection of the two capacitor units C1, C2 and the midpoint of the series connection of the two switching circuits 1, 2.

As shown in FIGS. 3(A) and (B) the output of the DC/DC power converter 4 may comprise an optional third output terminal OUT3. According to FIG. 3(A), the optional third output terminal OUT3, the midpoint between the two switching circuits 1, 2, the midpoint between the two capacitor units C1, C2 and the second input terminal IN2 are connected to each other. According to FIG. 3(B), the optional third output terminal OUT3, the midpoint between the two capacitor units C1, C2 and the second input terminal IN2 are connected to each other.

FIGS. 4(A) and 4(B) each show a DC/DC power converter, according to an embodiment of the present application.

The DC/DC power converter 4 of FIG. 4(A) corresponds to the DC/DC power converter 4 of FIG. 3(A), wherein an implementation form of the two switching circuits 1, 2 and the two capacitor units C1, C2 is shown. The description of the DC/DC power converter 4 of FIGS. 2 and 3(A) is correspondingly valid for the DC/DC power converter 4 of FIG. 4(A). Therefore, in the following mainly additional features of the DC/DC power converter 4 of FIG. 4(A) with respect to the DC/DC power converter 4 of FIGS. 2 and 3(A) are described.

As shown in FIG. 4(A), each switching unit 11, 12 of the first switching circuit 1 and each switching unit 21, 22 of the second switching circuit 2 comprises two controllable semiconductor switches. Thus, the series connection of the first switching circuit 1 and the second switching circuit 2 corresponds to a series connection of eight controllable semiconductor switches 11a, 11b, 12a, 12b, 21a, 21b, 22a and 22b. The number of switches of each switching unit may be greater than two as outlined already above. The number of switches of the two switching units 11, 12 of the first switching circuit 1 may beneficially be the same, as shown in FIG. 4(A). The number of switches of the two switching units 21, 22 of the second switching circuit 2 may beneficially be the same, as shown in FIG. 4(A). The number of switches of each switching unit 11, 12, 21, 22 of the first and second switching circuit 1, 2 may beneficially be the same, as shown in FIG. 4(A).

According to the embodiment of FIG. 4(A), the controllable semiconductor switches are insulated gate bipolar transistors (IGBTs). Alternatively or additionally, the controllable semiconductor switches of the first switching circuit 1 and second switching circuit 2 may be of at least one different transistor type. That is, the controllable semiconductor switches of the first switching circuit 1 and second switching circuit 2 may be one or more IGBTs, one or more bipolar junctions transistors (BJTs) and/or one or more field effect transistors (FETs), such as one or more metal-oxide semiconductor field effect transistors (MOSFETs). Beneficially, the controllable semiconductor switches of the first and second switching circuit 1,2 are of the same transistor type, as shown in FIG. 4(A).

As shown in FIG. 4(A), the eight IGBTs 11a, 11b, 12a, 12b, 21a, 21b, 22a and 22b are connected to each other in series as follows: The collector terminal of the topmost IGBT 11a in the series connection of IGBTs is connected to the first input terminal IN1 and first output terminal OUT1. The emitter terminal of the bottommost IGBT 22b in the series connection of IGBTs is connected to the second output terminal OUT2. The other six IGBTs 11b, 12a, 12b, 21a, 21b and 22a are connected such that the collector terminal of each IGBT of these six IGBTs is connected to the emitter terminal of the respective preceding IGBT and the emitter terminal of each IGBT of these six IGBTs is connected to the collector terminal of the respective subsequent IGBT. For example, the collector terminal of the second-topmost IGBT 11b in the series connection of IGBTs is connected to the emitter terminal of the topmost IGBT 11a (i.e. the respective preceding IGBT) in the series connection of IGBTs. The emitter terminal of the second-topmost IGBT 11b is connected to the collector terminal of the third-topmost IGBT 12a (the respective subsequent IGBT) in the series connection of IGBTs.

An optional diode may be connected in parallel to each IGBT, as shown in FIG. 4 (A). In particular, an optional diode may be connected in parallel to each IGBT such that the anode of the optional diode is connected to the emitter terminal of the respective IGBT and the cathode of the optional diode is connected to the collector terminal of the respective IGBT.

The control signals for controlling the IGBTs may be provided to the gate terminals of the IGBTs. That is, the control signals may be provided to the control terminals of the controllable semiconductor switches.

In case the controllable semiconductor switches 11a, 11b, 12a, 12b, 21a, 21b, 22a, 22b of the first and second switching circuit 1, 2 are implemented by a different transistor type, the series connection of these controllable semiconductor switches is implemented correspondingly. In such a case, an optional diode may be connected in parallel to each controllable semiconductor switch.

Since each switching unit 11, 12 of the first switching circuit 1 and each switching unit 21, 22 of the second switching circuit 2 comprises two controllable semiconductor switches, the first switching circuit 1 and the second switching circuit 2 each comprise a diode unit D11 respectively D21. Each diode unit comprises two diodes. In addition, the first capacitor unit C1 and the second capacitor unit C2 each comprise two capacitors C11, C12 respectively C21, C22.

The number of diode units of a switching circuit and the number of capacitors of the respective capacitor unit depends on the number of controllable semiconductor switches of each switching unit of the switching circuit. In particular, the number of diode units of a switching circuit is one less than the number of controllable semiconductor switches of each switching unit of the switching circuit and the number of capacitors of the respective capacitor unit is equal to the number of controllable semiconductor switches of each switching unit of the switching circuit. Therefore, the number of diode units of the first switching circuit 1 and of the second switching circuit 2 may be greater than one, because the number of switches of each switching unit may be greater than two, as outlined already above. Moreover, the number of capacitors of the first capacitor unit C1 and of the second capacitor unit C2 may be greater than two, because the number of switches of each switching unit may be greater than two as outlined already above.

As shown in FIG. 4(A), the midpoint of the series connection of the two capacitors C11, C12 of the first capacitor unit C1 is connected via a first diode D11a of the diode unit D11 of the first switching circuit 1 to the midpoint of the series connection of the two controllable semiconductor switches 11a, 11b of the first switching unit 11 of the first switching circuit 1. In addition, the midpoint of the series connection of the two capacitors C11, C12 of the first capacitor unit C1 is connected via a second diode D11b of the diode unit D11 to the midpoint of the series connection of the two controllable semiconductor switches 12a, 12b of the second switching unit 12 of the first switching circuit 1. In particular, the midpoint of the series connection of the two capacitors C11, C12 of the first capacitor unit C1 is connected to the anode of the first diode D11a of the diode unit D11, wherein the cathode of the first diode D11a is connected to the midpoint of the series connection of the two switches 11a, 11b of the first switching unit 11 of the first switching circuit 1. The midpoint of the series connection of the two capacitors C11, C12 of the first capacitor unit C1 is connected to the cathode of the second diode D11b of the diode unit D11, wherein the anode of the second diode D11b is connected to the midpoint of the series connection of the two switches 12a, 12b of the second switching unit 12 of the first switching circuit 1.

Further, the midpoint of the series connection of the two capacitors C21, C22 of the second capacitor unit C2 is connected via a first diode D21a of the diode unit D21 of the second switching circuit 2 to the midpoint of the series connection of the two controllable semiconductor switches 21a, 21b of the first switching unit 21 of the second switching circuit 2. In addition, the midpoint of the series connection of the two capacitors C21, C22 of the second capacitor unit C2 is connected via a second diode D21b of the diode unit D21 to the midpoint of the series connection of the two controllable semiconductor switches 22a, 22b of the second switching unit 22 of the second switching circuit 2. In particular, the midpoint of the series connection of the two capacitors C21, C22 of the second capacitor unit C2 is connected to the anode of the first diode D21a of the diode unit D21, wherein the cathode of the first diode D21a is connected to the midpoint of the series connection of the two switches 21a, 21b of the first switching unit 21 of the second switching circuit 2. The midpoint of the series connection of the two capacitors C21, C22 of the second capacitor unit C2 is connected to the cathode of the second diode D21b of the diode unit D21, wherein the anode of the second diode D21b is connected to the midpoint of the series connection of the two switches 22a, 22b of the second switching unit 22 of the second switching circuit 2.

The two capacitors C11, C12 of the first capacitor unit C1 may be dimensioned such that the voltage at each capacitor of the first capacitor unit C1 is equal to the voltage Vin at the first capacitor unit C1 divided by the number of capacitors of the first capacitor unit C1. This number correspond to two according to the embodiment of FIG. 4(A). The same may apply to the second capacitor unit C2. That is, the two capacitors C21, C22 of the second capacitor unit C2 may be dimensioned such that the voltage at each capacitor of the second capacitor unit C2 is equal to the voltage at the second capacitor unit C2 divided by the number of capacitors of the second capacitor unit C2. This number correspond to two according to the embodiment of FIG. 4(A).

Furthermore, as shown in FIG. 4(A) the series connection of the resonant capacitor Cr and resonant inductor Lr of the resonant circuit 3 is connected on one side to the midpoint between the two switching units 11, 12 of the first switching circuit 1 and on the other side to the midpoint between the two switching units 21, 22 of the second switching circuit 2. The midpoint between the two switching units 11, 12 of the first switching circuit 1 is connected to the Z-terminal of the first switching circuit 1. The midpoint between the two switching units 21, 22 of the second switching circuit 2 is connected to the Z-terminal of the second switching circuit 2.

The DC/DC power converter 4 of FIG. 4(B) corresponds to the DC/DC power converter 4 of FIG. 4(A). The difference between these two DC/DC power converters 4 is the implementation form of the resonant circuit 3, which corresponds to the implementation form of the resonant circuit 3 of the DC/DC power converter of FIG. 3(B). Therefore, the above description of the DC/DC power converter 4 of FIG. 4(A) is correspondingly valid for the DC/DC power converter 4 of FIG. 4(B) and in the following mainly the difference between the DC/DC power converter 4 of FIG. 4(A) and the DC/DC power converter 4 of FIG. 4(B) is described. For the description of the implementation of the resonant circuit 3 of the DC/DC power converter 4 of FIG. 4(B) reference is made to the description of the DC/DC power converter 4 of FIG. 3(B).

As shown in FIG. 4(B), the resonant capacitor Cr of the resonant circuit 3 is connected on one side to the midpoint between the two switching units 11, 12 of the first switching circuit 1 and on the other side to the midpoint between the two switching units 21, 22 of the second switching circuit 2. The resonant inductor Lr of the resonant circuit 3 is connected on one side to the midpoint between the two capacitors C1, C2 and on the other side to the midpoint between the two switching circuits 1, 2.

Figure 5A:
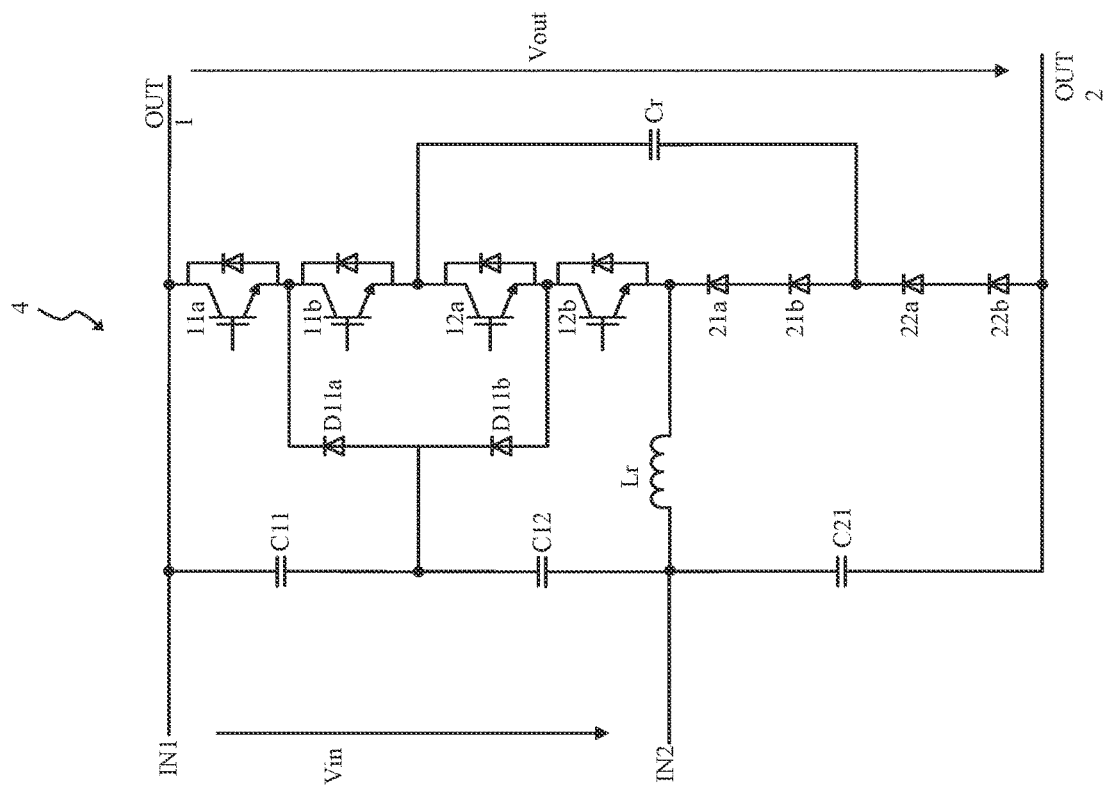
FIGS. 5(A) and (B) each show a DC/DC power converter, according to an embodiment of the present application.
Figure 5B:
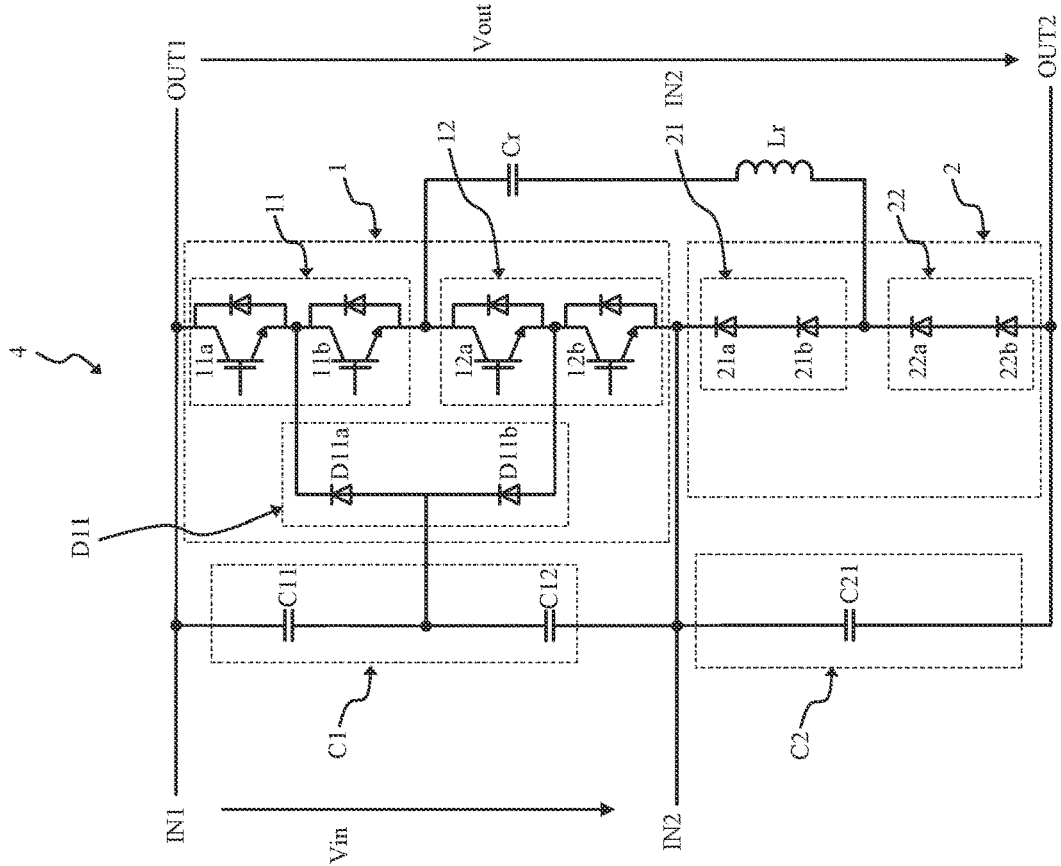

FIGS. 5(A) and 5(B) each show a DC/DC power converter, according to an embodiment of the present application.

The DC/DC power converter 4 of FIG. 5(A) corresponds to the DC/DC power converter 4 of FIG. 4(A), wherein the second switching circuit 2 is implemented differently. The description of the DC/DC power converter 4 of FIGS. 2, 3(A) and 4(A) is correspondingly valid for the DC/DC power converter 4 of FIG. 5(A). Therefore, in the following mainly the difference of the DC/DC power converter 4 of FIG. 5(A) with respect to the DC/DC power converter 4 of 4(A) is described.

As shown in FIG. 5(A), the two switches of each switching unit 21, 22 of the second switching circuit 2 are not controllable semiconductor switches. Namely, the two switches of each switching unit 21, 22 of the second switching circuit 2 are two uncontrollable semiconductor switches, in particular two diodes. Therefore, the series connection of the two switching units 21, 22 of the second switching circuit 2 of the DC/DC power converter 4 according to FIG. 5(A) corresponds to a series connection of four diodes 21a, 21b, 22a and 22b. As outlined already above, each switching unit 21, 22 of the second switching circuit 2 may comprise more than two uncontrollable semiconductor switches, in particular more than two diodes.

As shown in FIG. 5(A), the four diodes 21a, 21b, 22a and 22b are connected to each other in series as follows: The cathode of the topmost diode 21a in the series connection of diodes is connected to the midpoint between the two switching circuits 1, 2. The anode of the bottommost diode 22b in the series connection of diodes is connected to the output terminal OUT2. The other two diodes 21b and 22a of the four diodes of the second switching circuit 2 are connected such that the cathode of each diode of these two diodes is connected to the anode of the respective preceding diode and the anode of each diode of these two diodes is connected to the cathode of the respective subsequent diode. That is, the cathode of the second-topmost diode 21b in the series connection of diodes is connected to the anode of the topmost diode 21a (the respective preceding diode) in the series connection of diodes. The anode of the second-topmost diode 21b is connected to the cathode of the second-bottommost diode 22a (the respective subsequent diode) in the series connection of diodes. The cathode of the second-bottommost diode 22a is connected to the anode of the second-topmost diode 21b (the respective preceding diode) and the anode of the second-bottommost diode 22a is connected to the cathode of the bottommost diode 22b (the respective subsequent diode) in the series connection of diodes.

The second switching circuit 2 of the DC/DC power converter 4 of FIG. 5(A) comprises no diode unit and the second capacitor unit C2 comprise only one capacitor C21, because the switches of the second switching circuit 2 are uncontrollable semiconductor switches.

The DC/DC power converter 4 of FIG. 5(B) corresponds to the DC/DC power converter 4 of FIG. 5(A). The difference between these two DC/DC power converters 4 is the implementation form of the resonant circuit 3, which corresponds to the implementation form of the resonant circuit 3 of the DC/DC power converter 4 of FIGS. 3(B) and 4(B). Therefore, the above description of the DC/DC power converter 4 of FIG. 5(A) is correspondingly valid for the DC/DC power converter 4 of FIG. 5(B). For the description of the implementation of the resonant circuit 3 of the DC/DC power converter 4 of FIG. 5(B) reference is made to the description of the DC/DC power converter 4 of FIGS. 3(B) and 4(B).

Figure 6:
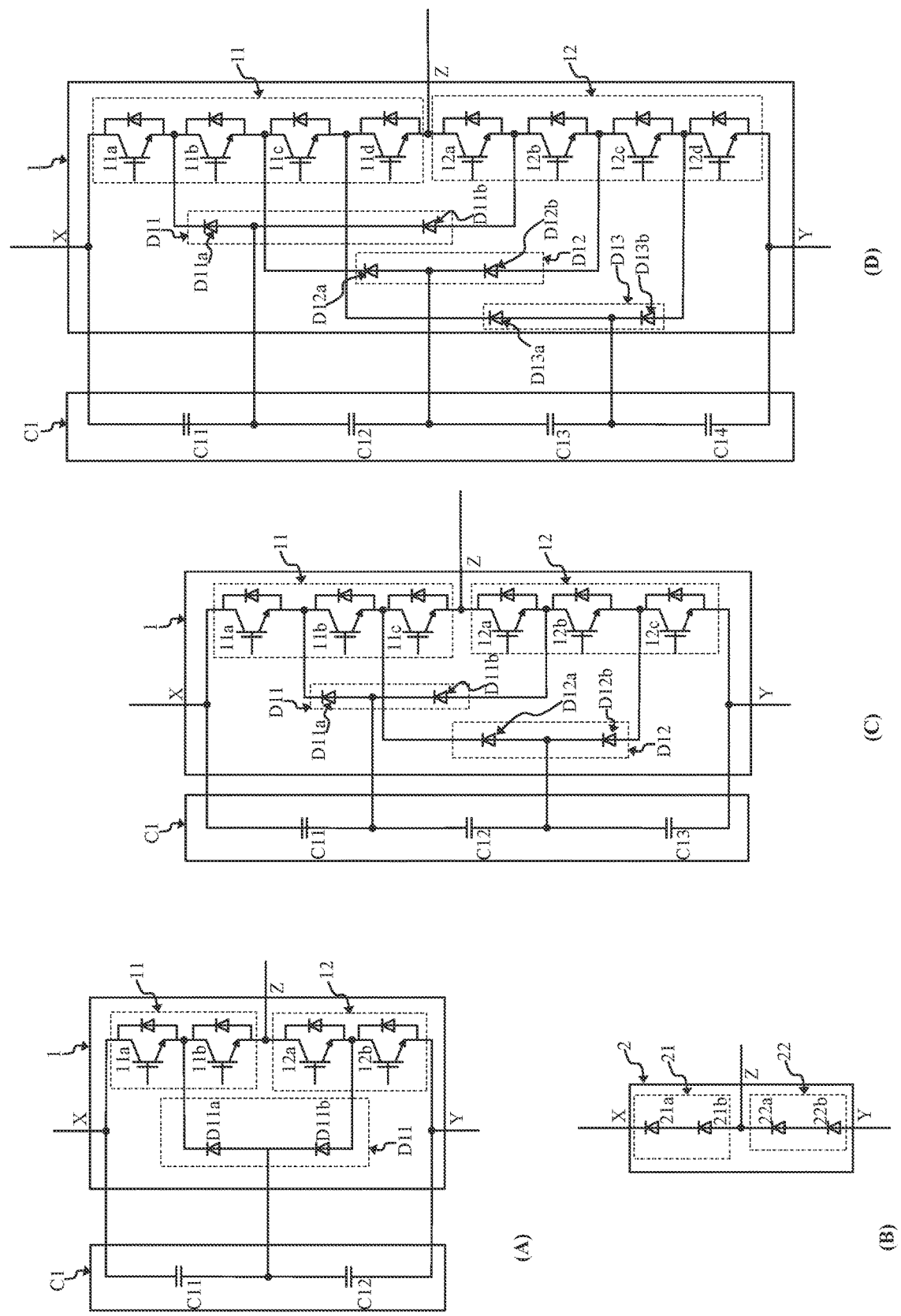
FIG. 6 shows different embodiments of switching circuits for a DC/DC power converter, according to an embodiment of the present application.

FIG. 6 shows different embodiments of switching circuits for a DC/DC power converter, according to an embodiment of the present application.

FIG. 6(A) shows an implementation form of the first switching circuit 1 of a DC/DC power converter, according to an embodiment of the present application. This implementation form corresponds to the implementation form of the first switching circuit 1 of the DC/DC power converters 4 of FIGS. 4(A) and (B). Therefore, reference is made to the description of the DC/DC power converters 4 of FIGS. 4(A) and (B) for describing the first switching circuit 1 shown in FIG. 6(A). As shown in FIGS. 4(A) and (B) the second switching circuit 2 of the DC/DC power converter 4 may be implemented in line with the implementation form of the first switching circuit 1 shown in FIG. 6(A).

FIG. 6(B) shows an implementation form of the second switching circuit 2 of a DC/DC power converter, according to an embodiment of the present application. This implementation form corresponds to the implementation form of the second switching circuit 2 of the DC/DC power converters 4 of FIGS. 5(A) and (B). Therefore, reference is made to the description of the DC/DC power converters 4 of FIGS. 5(A) and (B) for describing the second switching circuit 1 shown in FIG. 6(B).

As outlined already above, each switching unit of a respective switching circuit (first switching circuit 1 and second switching circuit 2) may comprise two or more switches. FIGS. 6(C) and (D) each show a case in which each switching unit 11, 12 of the first switching circuit 1 comprises more than two controllable semiconductor switches and, thus, the first switching circuit 1 comprises more than one diode unit and the first capacitor unit C1 comprises more than two capacitors. The description with respect to the DC/DC converters 4 of FIGS. 4 (A) and (B) is correspondingly valid for the first switching circuit 1 of FIGS. 6(C) and (D).

FIG. 6(C) shows the case, in which each switching unit 11, 12 of the first switching circuit 1 comprises three controllable semiconductor switches. Therefore, according to FIG. 6 (C) the first switching circuit 1 comprises two diode units D11 and D12 and the first capacitor unit comprises three capacitors C11, C12 and C13. Each diode unit comprises two diodes. FIG. 6(D) shows the case, in which each switching unit 11, 12 of the first switching circuit 1 comprises four controllable semiconductor switches. Therefore, according to FIG. 6(C) the first switching circuit 1 comprises three diode units D11, D12 and D13 and the first capacitor unit comprises four capacitors C11, C12, C13 and C14. Each diode unit comprises two diodes.

The description of the FIGS. 6(C) and 6(D) is correspondingly valid for cases, in which each switching unit 11, 12 of the first switching circuit 1 comprises more than four controllable semiconductor switches. The description of the first switching circuit 1 of FIGS. 6 (C) and (D) is correspondingly valid for the second switching circuit 2, in case the switches of the second switching circuit 2 are controllable semiconductor switches.

For the description of the FIGS. 6(C) and (D), it is assumed that the controllable semiconductor switches 11a, 11b, 11c, 11d, 12a, 12b, 12c and 12d are IGBTs. This is only by way of example and does not limit the present disclosure. As outlined already above, alternatively or additionally the controllable semiconductor switches of the first switching circuit 1 may correspond to one or more other transistor types. Beneficially, the controllable semiconductor switches of the first switching circuit 1 are of the same transistor type.

As shown in FIG. 6(C), each node between two capacitors of the first capacitor unit C1 is connected via a first diode of a respective diode unit of the two diode units D11, D12 to a first node between two switches of the first switching unit 11 of the first switching circuit 1 and via a second diode of the respective diode unit to a second node between two switches of the second switching unit 12 of the first switching circuit 1. The positon of the first node in the series connection of the three switches 11a, 11 b, 11c of the first switching unit 11 and the positon of the second node in the series connection of the three switches 12a, 12b, 12c of the second switching unit 12 correspond to each other. The nodes between two capacitors of the series connection of the three capacitors C11, C12, C13 of the first capacitor unit C1 are connected to different nodes of the two switching units 11, 12 of the first switching circuit 1.

As shown in FIG. 6(C), the position of each node between two capacitors in the series connection of three capacitors C11, C12, C13 of the first capacitor unit C1, the position of the respective first node between two switches in the series connection of the three switches 11a, 11b, 11c of the first switching unit 11 and the position of the respective second node between two switches in the series connection of the three switches 12a, 12b, 12c of the second switching unit 12 correspond to each other.

In particular, the node between the topmost capacitor C11 and the second-topmost capacitor C12 in the series connection of capacitors of the first capacitor unit C1 is connected via a first diode D11a of a first diode unit D11 of the two diode units D11, D12 to the node between the topmost IGBT 11a and the second-topmost IGBT 11b (a first node) in the series connection of IGBTs of the first switching unit 11 of the first switching circuit 1. In addition, the node between the topmost capacitor C11 and the second-topmost capacitor C12 of the first capacitor unit C1 is connected via the second diode D11b of the first diode unit D11 to the node between the topmost IGBT 12a and the second-topmost IGBT 12b (a second node) in the series connection of IGBTs of the second switching unit 12 of the first switching circuit 1. The position of the node between the topmost capacitor C11 and second-topmost capacitor C12 in the series connection of capacitors of the first capacitor unit C1, the position of the node between the topmost IGBT 11a and second-topmost IGBT 11b in the series connection of IGBTs of the first switching unit 11 and the position of the node between the topmost IGBT 12a and second-topmost IGBT 12b in the series connection of IGBTs of the second switching unit 12 correspond to each other.

Furthermore, as shown in FIG. 6(C), the node between the second-topmost capacitor C12 and the bottommost capacitor C13 in the series connection of capacitors of the first capacitor unit C1 is connected via a first diode D12a of a second diode unit D12 of the two diode units D11, D12 to the node between the second-topmost IGBT 11b and the bottommost IGBT 11c (a first node) in the series connection of IGBTs of the first switching unit 11 of the first switching circuit 1. In addition, the node between the second-topmost capacitor C12 and the bottommost capacitor C13 of the first capacitor unit C1 is connected via the second diode D12b of the second diode unit D12 to the node between the second-topmost IGBT 12b and the bottommost IGBT 12c (a second node) in the series connection of IGBTs of the second switching unit 12 of the first switching circuit 1. The position of the node between the second-topmost capacitor C12 and bottommost capacitor C13 in the series connection of capacitors of the first capacitor unit C1, the position of the node between the second-topmost IGBT 11b and bottommost IGBT 11c in the series connection of IGBTs of the first switching unit 11 and the position of the node between the second-topmost IGBT 12b and bottommost IGBT 12c in the series connection of IGBTs of the second switching unit 12 correspond to each other.

The three capacitors C11, C12, C13 of the capacitor unit C1 may be dimensioned such that the voltage at each capacitor of the first capacitor unit C1 is equal to the voltage at the first capacitor unit C1 divided by the number of capacitors of the first capacitor unit C1.

The above description of FIG. 6(C) is correspondingly valid for the first switching circuit 1 of FIG. 6(D).

As shown in FIG. 6(D), each node between two capacitors of the first capacitor unit C1 is connected via a first diode of a respective diode unit of the three diode units D11, D12, D13 to a first node between two switches of the first switching unit 11 of the first switching circuit 1 and via a second diode of the respective diode unit to a second node between two switches of the second switching unit of the first switching circuit 1. The nodes of the series connection of the four capacitors C11, C12, C13, C14 of the first capacitor unit C1 are connected to different nodes of the two switching units 11, 12 of the first switching circuit 1. The position of each node between two capacitors in the series connection of the four capacitors C11, C12, C13, C14 of the first capacitor unit C1, the position of the respective first node between two switches in the series connection of the four switches 11a, 11b, 11c, 11d of the first switching unit 11 and the position of the respective second node between two switches in the series connection of the four switches 12a, 12b, 12c, 12d of the second switching unit 12 correspond to each other.

In particular, the node between the topmost capacitor C11 and the second-topmost capacitor C12 in the series connection of capacitors of the first capacitor unit C1 is connected via a first diode D11a of a first diode unit D11 of the three diode units D11, D12, D13 to the node between the topmost IGBT 11a and the second-topmost IGBT 11b (a first node) in the series connection of IGBTs of the first switching unit 11 of the first switching circuit 1. In addition, the node between the topmost capacitor C11 and the second-topmost capacitor C12 of the first capacitor unit C1 is connected via the second diode D11b of the first diode unit D11 to the node between the topmost IGBT 12a and the second-topmost IGBT 12b (a second node) in the series connection of IGBTs of the second switching unit 12 of the first switching circuit 1. The position of the node between the topmost capacitor C11 and second-topmost capacitor C12 in the series connection of capacitors of the first capacitor unit C1, the position of the node between the topmost IGBT 11a and second-topmost IGBT 11b in the series connection of IGBTs of the first switching unit 11 and the position of the node between the topmost IGBT 12a and second-topmost IGBT 12b in the series connection of IGBTs of the second switching unit 12 correspond to each other.

Further, as shown in FIG. 6(D), the node between the second-topmost capacitor C12 and the second-bottommost capacitor C13 in the series connection of capacitors of the first capacitor unit C1 is connected via a first diode D12a of a second diode unit D12 of the three diode units D11, D12, D13 to the node between the second-topmost IGBT 11b and the second-bottommost IGBT 11c (a first node) in the series connection of IGBTs of the first switching unit 11 of the first switching circuit 1. In addition, the node between the second-topmost capacitor C12 and the second-bottommost capacitor C13 of the first capacitor unit C1 is connected via the second diode D12b of the second diode unit D12 to the node between the second-topmost IGBT 12b and the second-bottommost IGBT 12c (a second node) in the series connection of IGBTs of the second switching unit 12 of the first switching circuit 1. The position of the node between the second-topmost capacitor C12 and second-bottommost capacitor C13 in the series connection of capacitors of the first capacitor unit C1, the position of the node between the second-topmost IGBT 11b and second-bottommost IGBT 11c in the series connection of IGBTs of the first switching unit 11 and the position of the node between the second-topmost IGBT 12b and second-bottommost IGBT 12c in the series connection of IGBTs of the second switching unit 12 correspond to each other.

Furthermore, as shown in FIG. 6(D), the node between the second-bottommost capacitor C13 and the bottommost capacitor C14 in the series connection of capacitors of the first capacitor unit C1 is connected via a first diode D13a of a third diode unit D13 of the three diode units D11, D12, D13 to the node between the second-bottommost IGBT 11c and the bottommost IGBT 11d (a first node) in the series connection of IGBTs of the first switching unit 11 of the first switching circuit 1. In addition, the node between the second-bottommost capacitor C13 and the bottommost capacitor C14 of the first capacitor unit C1 is connected via the second diode D13b of the third diode unit D13 to the node between the second-bottommost IGBT 12c and the bottommost IGBT 12d (a second node) in the series connection of IGBTs of the second switching unit 12 of the first switching circuit 1. The position of the node between the second-bottommost capacitor C13 and bottommost capacitor C14 in the series connection of capacitors of the first capacitor unit C1, the position of the node between the second-bottommost IGBT 11c and bottommost IGBT 11d in the series connection of IGBTs of the first switching unit 11 and the position of the node between the second-bottommost IGBT 12c and bottommost IGBT 12d in the series connection of IGBTs of the second switching unit 12 correspond to each other.

The four capacitors C11, C12, C13, C14 of the capacitor unit C1 may be dimensioned such that the voltage at each capacitor of the first capacitor unit C1 is equal to the voltage at the first capacitor unit C1 divided by the number of capacitors of the first capacitor unit C1.

FIGS. 7(A) to (J) show different states, in particular two steady states and transient switching states of a DC/DC power converter, according to an embodiment of the present application, when the DC/DC power converter is switched between the two steady states, according to an embodiment of the present application.

The DC/DC power converter 4 of FIGS. 7(A) to (J) corresponds to the DC/DC power converter 4 of FIG. 5(A). The above description of the DC/DC power converter 4 of FIG. 5(A) is correspondingly valid for the DC/DC power converter 4 of FIGS. 7(A) to (J). The controllable semiconductor switches 11a, 11b, 12a and 12b of the first switching circuit 1 of the DC/DC power converter 4 of FIG. 7 are IGBTs. This is only by way of example and does not limit the present disclosure. That is, the switches of the first switching circuit 1 may be implemented by a different transistor type, as outlined already above.

In the following, a control of the switching of the IGBTs 11a, 11b, 12a and 12b of the first switching circuit 1 of the DC/DC power converter 4 shown in FIG. 7 for controlling operation of the DC/DC power converter 4 is described with respect to the FIGS. 7(A) to (J):

This control may be performed by a control unit, such as the control unit shown in FIG. 2(B). The control unit may be a part of the DC/DC power converter 4 or an external control unit.

The two switching units 11, 12 of the first switching circuit 1 are complementary switched between the conducting state and the non-conducting state. Optionally, they are complementary switched with a duty cycle of 50%.

A switching unit is in the conducting state when all the switches of the switching unit are in the conducting state. Correspondingly, a switching unit is in the non-conducting state when all the switches of the switching unit are in the non-conducting state. A switching unit is in a steady state when the switching unit is in the conducting state or in the non-conducting state. The conducting state may also be referred to as on state or as switched on state. The non-conducting state may also be referred to as off state or as switched off state.

The switching of the IGBTs 11a, 11b, 12a, 12b of the first switching circuit 1 cause the voltages across the uncontrollable semiconductor switches 21a, 21b, 22a, 22b, which are diodes, of the second switching circuit 2 to change. As a result, due to the switching of the IGBTs 11a, 11b, 12a, 12b of the first switching circuit 1, the switching units 21, 22 of the second switching circuit 2 are also complementary switched. In particular, the first switching unit 21 of the second switching circuit 2 is switched according with (in line with) the first switching unit 11 of the first switching circuit 1 and the second switching unit 22 of the second switching circuit 2 is switched according with (in line with) the second switching unit 12 of the first switching circuit 1. That is, in case the first switching unit 11 of the first switching circuit 1 is in the conducting state, the first switching unit 21 of the second switching circuit 2 is also in the conducting state, while the two second switching units 12, 22 are in the non-conducting state, and vice versa. The same applies for the second switching units 12, 22 of the DC/DC power converter 4.

Therefore, as a result of the controlled switching of the switches 11a, 11b, 12a, 12b of the first switching circuit 1, the first switching units 11, 21 are switched together between the conducting and non-conducting state and the second switching units 12, 22 are switched together between the non-conducting and conducting state complementary to the switching of the first switching units 11, 21.

FIG. 7(A) shows a first steady state of the DC/DC power converter 4, in which the first switching unit 11 of the first switching circuit 1 and the first switching unit 21 of the second switching circuit 2 are in the conducting state, while the second switching unit 12 of the first switching circuit 1 and the second switching unit 22 of the second switching circuit 2 are in the non-conducting state. FIG. 7(F) shows a second steady state of the DC/DC power converter 4, in which the second switching unit 12 of the first switching circuit 1 and the second switching unit 22 of the second switching circuit 2 are in the conducting state, while the first switching unit 11 of the first switching circuit 1 and the first switching unit 21 of the second switching circuit 2 are in the non-conducting state. In the first steady state of the DC/DC power converter 4 resonance occurs between the first capacitor unit C1 and the resonant circuit of the DC/DC power converter 4. In the second steady state of the DC/DC power converter 4 resonance occurs between the second capacitor unit C2 and the resonant circuit of the DC/DC power converter 4.

In FIGS. 7(A) to (J) conducting components of the DC/DC power converter are highlighted in bold. In particular, the parts of the DC/DC power converter that are highlighted in bold and are not dotted represent active current paths via which current flows during the operation of the DC/DC power converter. An IGBT that is represented with dotted lines is in the conducting state.

FIGS. 7(B) to (E) show the transient switching states of the DC/DC power converter 4 when controlling the switching of the controllable semiconductor switches of the first switching circuit 1 such that the DC/DC power converter 4 is switched from the first steady state, shown in FIG. 7(A), to the second steady state, shown in FIG. 7(F). FIGS. 7(G) to (J) show the transient switching states of the DC/DC power converter 4 when controlling the switching of the controllable semiconductor switches of the first switching circuit 1 such that the DC/DC power converter 4 is switched from the second steady state, shown in FIG. 7(F), to the first steady state, shown in FIG. 7(A).

As shown in FIG. 7(A), in the first steady state the IGBTs 11a, 11b of the first switching unit 11 of the first switching circuit 1 are in the conducting state and the diodes 21a, 21b of the first switching unit 21 of the second switching circuit 2 are in the conducting state (forward biased). The IGBTs 12a, 12b of the second switching unit 12 of the first switching circuit 1 are in the non-conducting state and the diodes 22a, 22b of the second switching unit 22 of the second switching circuit 2 are in the non-conducting state (reverse biased). Therefore, a current flows via the two capacitors C11, C12 of the first capacitor unit C1, the two IGBTs 11a, 11b of the first switching unit 11 of the first switching circuit 1, the resonant capacitor Cr and resonant inductor Lr of the resonant circuit 3 and the two diodes 21a, 21b of the first switching unit 21 of the second switching circuit 2. In the first steady state, the first capacitor unit C1 is discharged.

As shown in FIG. 7(F), in the second steady state the IGBTs 11a, 11b of the first switching unit 11 of the first switching circuit 1 are in the non-conducting state and the diodes 21a, 21b of the first switching unit 21 of the second switching circuit 2 are in the non-conducting state (reverse biased). The IGBTs 12a, 12b of the second switching unit 12 of the first switching circuit 1 are in the conducting state and the diodes 22a, 22b of the second switching unit 22 of the second switching circuit 2 are in the conducting state (forward biased). Therefore, a current flows via the resonant capacitor Cr and resonant inductor Lr of the resonant circuit 3, the two IGBTs 12a, 12b of the second switching unit 12 of the first switching circuit 1, the capacitor C21 of the second capacitor unit C2 and the two diodes 22a, 22b of the second switching unit 22 of the second switching circuit 2. In the second steady state, the second capacitor unit C2 is charged.

In the following the control of the IGBTs 11a, 11b, 12a and 12b of the first switching circuit for switching the DC/DC power converter 4 from the first steady state (shown in FIG. 7(A)) to the second steady state (shown in FIG. 7(F)) is described:

As shown in FIG. 7(B), at first the IGBT 11a of the first switching unit 11 of the first switching circuit 1 is switched off to the non-conducting state (switching close to zero current). As a result, current flows via the capacitor C12 of the first capacitor unit C1, the first diode D11a of the diode unit D11, the second-topmost IGBT 11b in the series connection of IGBTs of the first switching circuit 1, the resonant circuit and the two diodes 21a and 21b of the first switching unit 21 of the second switching circuit 2. The state of the DC/DC power converter 4 of FIG. 7(B) differs from the preceding state shown in FIG. 7(A) in that in the steady state of FIG. 7(A) the IGBT 11a is in the conducting state, whereas in the transient switching state of FIG. 7(B) the IGBT 11a is switched to the non-conducting state.

Next, as shown in FIG. 7(C), the IGBT 12a of the second switching unit 12 of the first switching circuit 1 is switched on to the conducting state (zero current switching). Nevertheless, the current continues flowing via the capacitor C12 of the first capacitor unit C1, the first diode D11a of the diode unit D11, the second-topmost IGBT 11b in the series connection of IGBTs of the first switching circuit 1, the resonant circuit and the two diodes 21a and 21b of the first switching unit 21 of the second switching circuit 2. The state of the DC/DC power converter 4 of FIG. 7(C) differs from the preceding state shown in FIG. 7(B) in that in the transient switching state of FIG. 7(B) the IGBT 12a is in the non-conducting state, whereas in the transient switching state of FIG. 7(C) the IGBT 12a is switched to the conducting state.

Next, as shown in FIG. 7(D), the IGBT 11b of the first switching unit 11 of the first switching circuit 1 is switched off to the non-conducting state (switching close to zero current). As a result, the current flows via the resonant circuit, the two diodes 21a and 21b of the first switching unit 21 of the second switching circuit 2, the diode connected in parallel to the bottommost IGBT 12b (IGBT 12b is in the non-conducting state) in the series connection of IGBTs and the diode connected in parallel to the second-bottommost IGBT 12a (IGBT 12a is in the conducting state) in the series connection of IGBTs. The state of the DC/DC power converter 4 of FIG. 7(D) differs from the preceding state shown in FIG. 7(C) in that in the transient switching state of FIG. 7(C) the IGBT 11b is in the conducting state, whereas in the transient switching state of FIG. 7(D) the IGBT 11b is switched to the non-conducting state.

Next, as shown in FIG. 7(E), the IGBT 12b of the second switching unit 12 of the first switching circuit 1 is switched on to the conducting state (zero voltage switching). Nevertheless, the current continues flowing via the resonant circuit, the two diodes 21a and 21b of the first switching unit 21 of the second switching circuit 2, the diode connected in parallel to the bottommost IGBT 12b (IGBT 12b is in the conducting state) in the series connection of IGBTs and the diode connected in parallel to the second-bottommost IGBT 12a (IGBT 12a is in the conducting state) in the series connection of IGBTs. The state of the DC/DC power converter 4 of FIG. 7(E) differs from the preceding state shown in FIG. 7(D) in that in the transient switching state of FIG. 7(D) the IGBT 12b is in the non-conducting state, whereas in the transient switching state of FIG. 7(E) the IGBT 12b is switched to the conducting state.

Next, as shown in FIG. 7(F), as soon as the direction of the current changes: the diode connected in parallel to the IGBT 12a and the diode connected in parallel to the IGBT 12b are reverse biased, the diodes 21a, 21b of the first switching unit 21 of the second switching circuit 2 are reverse biased and, thus, in the non-conducting state, and the diodes 22a, 22b of the second switching unit 22 of the second switching circuit 2 are forward biased and, thus, in the conducting state. As a result, current flows via the resonant circuit, the two IGBTs 12a and 12b of the second switching unit 12 of the first switching circuit 1, the capacitor C21 of the second capacitor unit C2 and the two diodes 22a, 22b of the second switching unit 22 of the second switching circuit 2. The second capacitor unit C2 is charged. This state corresponds to the second steady state of the DC/DC power converter 4. The transition between the transient switching state of FIG. 7(E) and the steady state of FIG. 7(F) may be instantaneous (transition time=0 ns).

In the light of the above, the first switching unit 11 of the first switching circuit 1 is switched from the conducting state (FIG. 7(A)) to the non-conducting state (FIGS. 7(D), (E) and (F)) by switching the two IGBTs 11a, 11b of the first switching unit 11 from the conducting state to the non-conducting state after each other according to the position in the series connection of the IGBTs 11a, 11b of the first switching unit 11 such that the IGBT 11a of the first switching unit 11 furthest away from the midpoint of the series connection of the two switching units 11, 12 of the first switching circuit 1 is switched at first from the conducting state to the non-conducting state.

The second switching unit 12 of the first switching circuit 1 is switched from the non-conducting state (FIG. 7(A)) to the conducting state (FIGS. 7(E) and (F)) by switching the two IGBTs 12a, 12b of the second switching unit 12 from the non-conducting state to the conducting state after each other according to the position in the series connection of the IGBTs 12a, 12b of the second switching unit 12 such that the switch 12a of the second switching unit 12 connected to the midpoint of the series connection of the two switching units 11, 12 of the first switching circuit 1 is switched at first from the non-conducting state to the conducting state.

In the light of the above, the first switching unit 11 of the first switching circuit 1 is switched from the conducting state to the non-conducting state and the second switching unit 12 of the first switching circuit 1 is switched from the non-conducting state to the conducting state, by alternately switching the IGBTs 11a, 11b of the first switching unit 11 and the IGBTs 12a, 12b of the second switching unit 12 such that
 at first a switch of the first switching unit 11 (namely IGBT 11a) is switched from the conducting state to the non-conducting state followed by a switch of the second switching unit 12 (namely IGBT 12a) being switched from the non-conducting state to the conducting state,
 the switches 11a, 11b of the first switching unit 11 are switched after each other from the conducting state to the non-conducting state, and
 the switches 12a, 12b of the second switching unit 12 are switched after each other from the non-conducting state to the conducting state.

In the following the control of the IGBTs 11a, 11b, 12a and 12b of the first switching circuit for switching the DC/DC power converter 4 from the second steady state (shown in FIG. 7(F)) to the first steady state (shown in FIG. 7(A)) is described:

As shown in FIG. 7(G), at first the IGBT 12b of the second switching unit 12 of the first switching circuit 1 is switched off to the non-conducting state. As a result, current flows via the resonant circuit, the IGBT 12a, the second diode D11b of the diode unit D11, the capacitor C12 of the first capacitor unit C1, the capacitor C21 of the second capacitor unit C2 and the two diodes 22a, 22b of the second switching unit 22 of the second switching circuit 2. The state of the DC/DC power converter 4 of FIG. 7(G) differs from the preceding state shown in FIG. 7(F) in that in the steady state of FIG. 7(F) the IGBT 12b is in the conducting state, whereas in the transient switching state of FIG. 7(G) the IGBT 12b is switched to the non-conducting state.

Next, as shown in FIG. 7(H), the IGBT 11b of the first switching unit 11 of the first switching circuit 1 is switched on to the conducting state (zero current switching). Nevertheless, the current continues flowing via the resonant circuit, the IGBT 12a, the second diode D11b of the diode unit D11, the capacitor C12 of the first capacitor unit C1, the capacitor C21 of the second capacitor unit C2 and the two diodes 22a, 22b of the second switching unit 22 of the second switching circuit 2. The state of the DC/DC power converter 4 of FIG. 7(H) differs from the preceding state shown in FIG. 7(G) in that in the transient switching state of FIG. 7(G) the IGBT 11b is in the non-conducting state, whereas in the transient switching state of FIG. 7(H) the IGBT 11b is switched to the conducting state.

Next, as shown in FIG. 7(I), the IGBT 12a of the second switching unit 12 of the first switching circuit 1 is switched off to the non-conducting state (zero current switching). Since the direction of the current changes between the transient switching state of FIG. 7(H) and the transient switching state of FIG. 7(I) the current flows in the transient switching state of FIG. 7(I) as follows: the current flows via the resonant circuit, the two diodes 21a, 21b of the first switching unit 21 of the second switching circuit 2, the capacitor C12 of the first capacitor unit C1, the first diode D11a of the diode unit D11 and the IGBT 11b. The state of the DC/DC power converter 4 of FIG. 7(I) differs from the preceding state shown in FIG. 7(H) in that in the transient switching state of FIG. 7(H) the IGBT 12a is in the conducting state, whereas in the transient switching state of FIG. 7(I) the IGBT 12a is switched to the non-conducting state.

Next, as shown in FIG. 7(J), the IGBT 11a of the first switching unit 11 of the first switching circuit 1 is switched on to the conducting state (switching close to zero current). As a result, the current flows via the two capacitors C11, C12 of the first capacitor unit C1, the two IGBTs 11a, 11b of the first switching unit 11 of the first switching circuit 1, the resonant circuit and the two diodes 21a, 21b of the first switching unit 21 of the second switching circuit 2. The state of the DC/DC power converter 4 of FIG. 7(J) differs from the preceding state shown in FIG. 7(I) in that in the transient switching state of FIG. 7(I) the IGBT 11a is in the non-conducting state, whereas in the transient switching state of FIG. 7(J) the IGBT 11a is switched to the conducting state.

Next, as shown in FIG. 7(A), in the first steady state current flows via the two capacitors C11, C12 of the first capacitor unit C1, the two IGBTs 11a, 11b of the first switching unit 11 of the first switching circuit 1, the resonant circuit and the two diodes 21a, 21b of the first switching unit 21 of the second switching circuit 2. The first capacitor unit C1 is discharged. The transition between the transient switching state of FIG. 7(J) and the first steady state of FIG. 7(A) may be instantaneous (transition time=0 ns).

In the light of the above, the first switching unit 11 of the first switching circuit 1 is switched from the non-conducting state (FIGS. 7(F)) to the conducting state (FIGS. 7(J) and (A)) by switching the two IGBTs 11a, 11b of the first switching unit 11 from the non-conducting state to the conducting state after each other according to the position in the series connection of the IGBTs 11a, 11b of the first switching unit 11 such that the switch 11b of the first switching unit 11 connected to the midpoint of the series connection of the two switching units 11, 12 of the first switching circuit 1 is switched at first from the non-conducting state to the conducting state.

The second switching unit 12 of the first switching circuit 1 is switched from the conducting state (FIG. 7(F)) to the non-conducting state (FIGS. 7(I), (J) and (A)) by switching the two IGBTs 12a, 12b of the second switching unit 12 from the conducting state to the non-conducting state after each other according to the position in the series connection of the IGBTs 12a, 12b of the second switching unit 12 such that the IGBT 12b of the second switching unit 12 furthest away from the midpoint of the series connection of the two switching units 11, 12 of the first switching circuit 1 is switched at first from the conducting state to the non-conducting state.

In the light of the above, the first switching unit 11 of the first switching circuit 1 is switched from the non-conducting state to the conducting state and the second switching unit 12 of the first switching circuit 1 is switched from the conducting state to the non-conducting state, by alternately switching the IGBTs 11a, 11b of the first switching unit 11 and the IGBTs 12a, 12b of the second switching unit 12, such that at first a switch of the second switching unit 12 (namely IGBT 12b) is switched from the conducting state to the non-conducting state followed by a switch of the first switching unit 11 (namely IGBT 11b) being switched from the non-conducting state to the conducting state, the switches 12a, 12b of the second switching unit 12 are switched after each other from the conducting state to the non-conducting state, and the switches 11a, 11b of the first switching unit 11 are switched after each other from the non-conducting state to the conducting state.

As shown in FIGS. 7(A) to (J), each switching unit of the first switching circuit 1 is switched between the conducting state and non-conducting state by switching the switches of the respective switching unit after each other. The two switching units 11 and 12 of the first switching circuit 1 are complementary switched between the conducting and non-conducting state by alternately switching the switches of the two switching units 11, 12 of the first switching circuit 1.

The transient switching states of the DC/DC power converter 4 may occur at low or no load current. Therefore, the capacitors C11 and C12 of the first capacitor unit C1 of the DC/DC power converter of FIG. 7 do not need active balancing and may be naturally maintained at half the voltage of the first capacitor unit C1.

Figure 7:
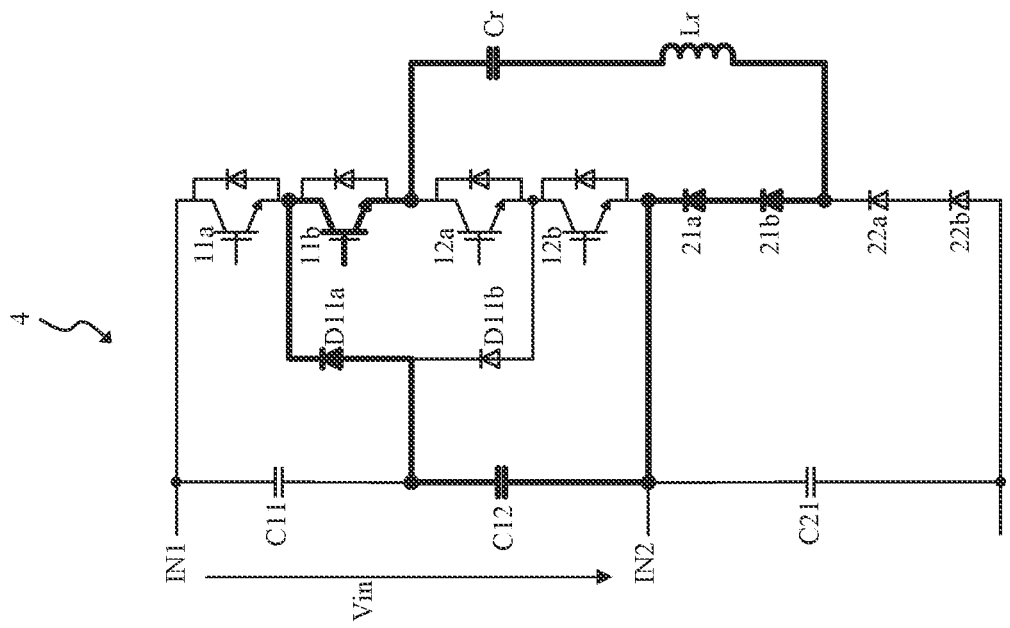
FIGS. 7(A) through (J) show different states, in particular two steady states and transient switching states of a DC/DC power converter, according to an embodiment of the present application, when the DC/DC power converter is switched between the two steady states, according to an embodiment of the present application.
Figure 7:
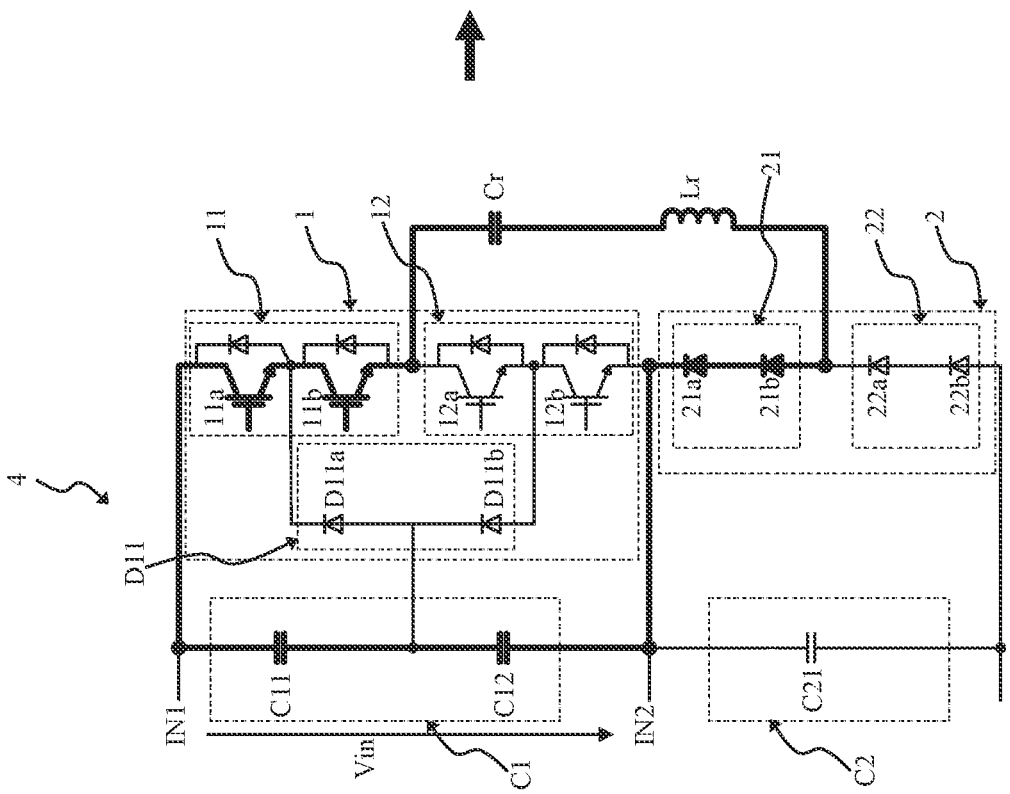
Figure 7:
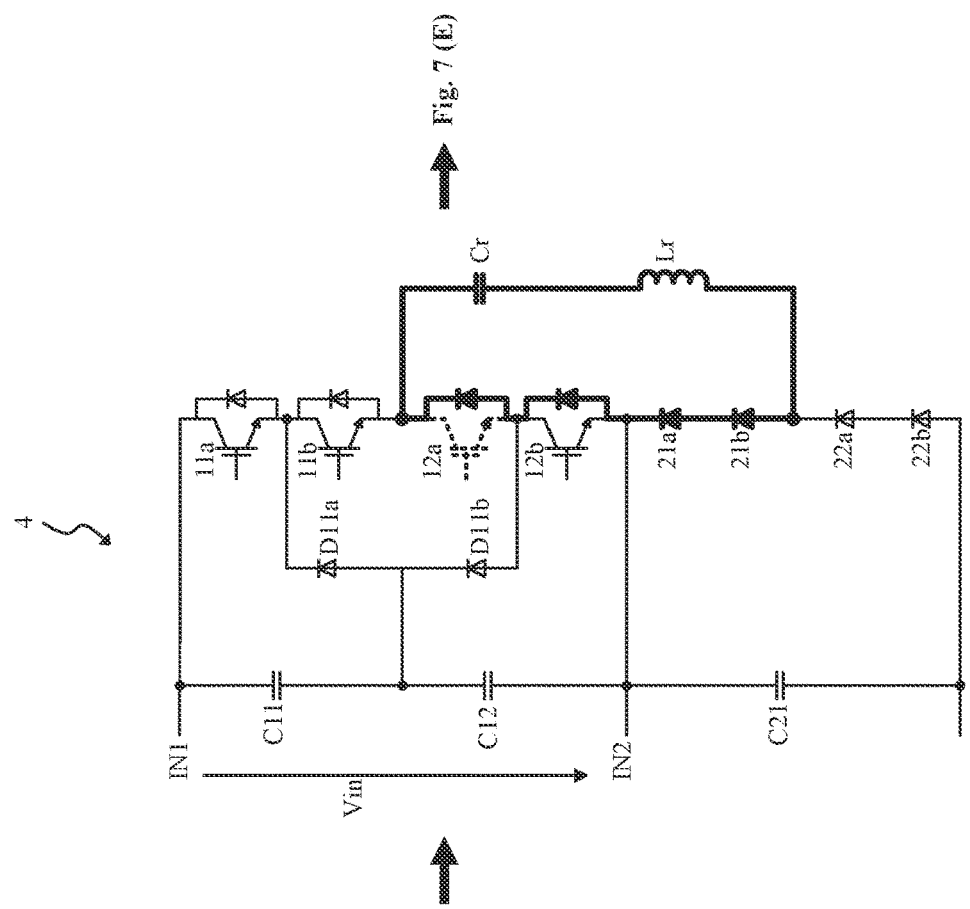
Figure 7:
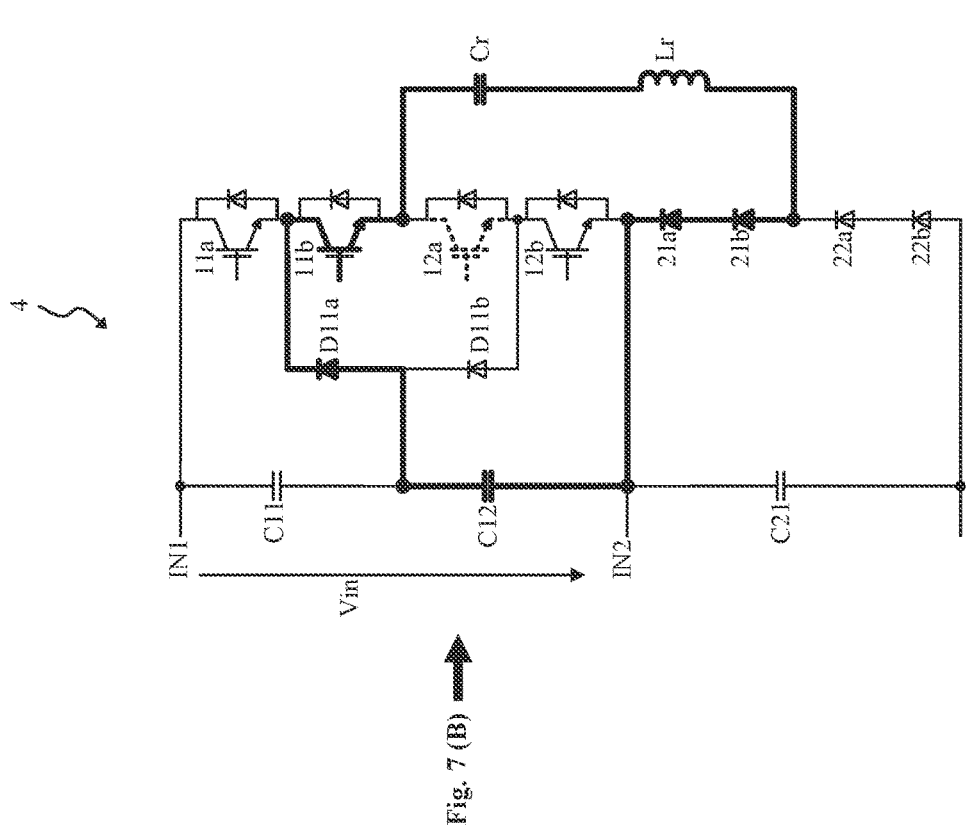
Figure 7:
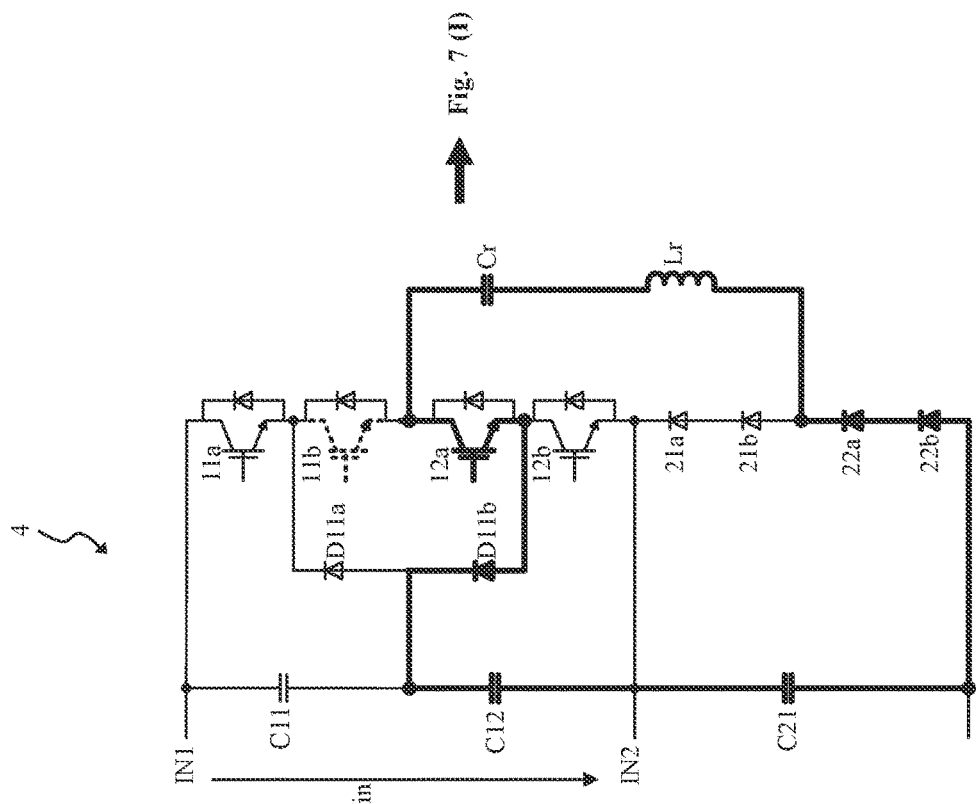
Figure 7:
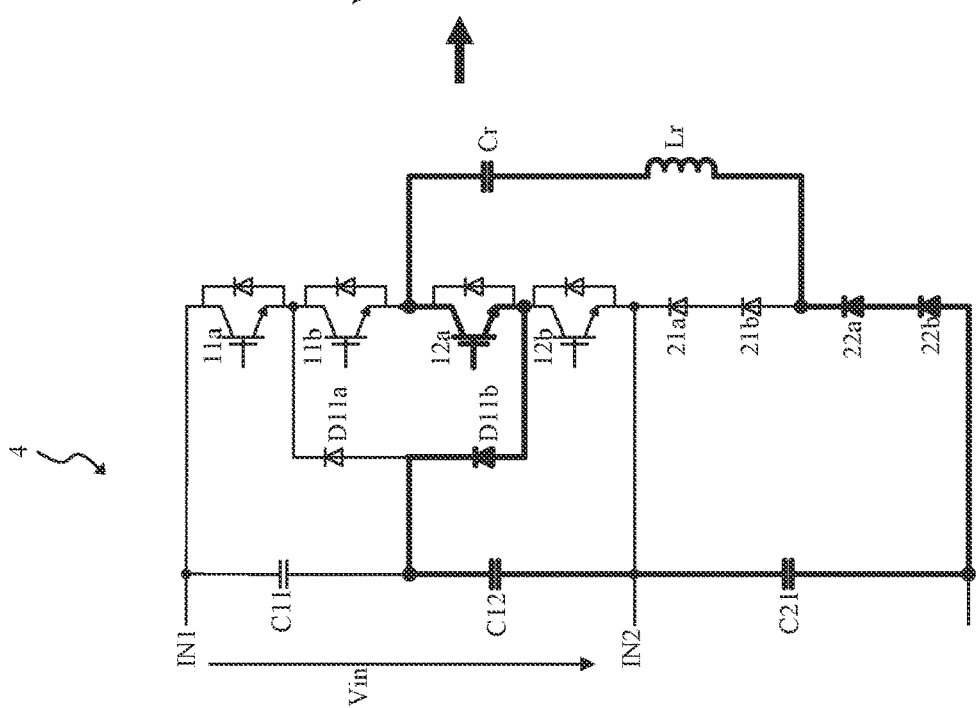
Figure 7:
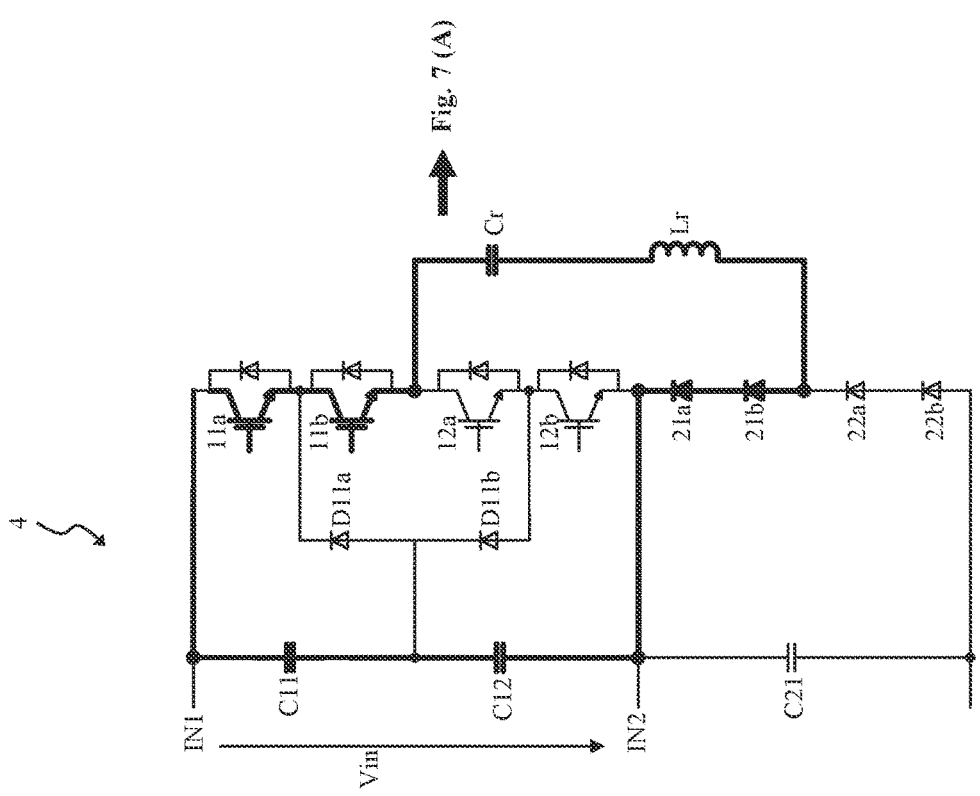
Figure 7:
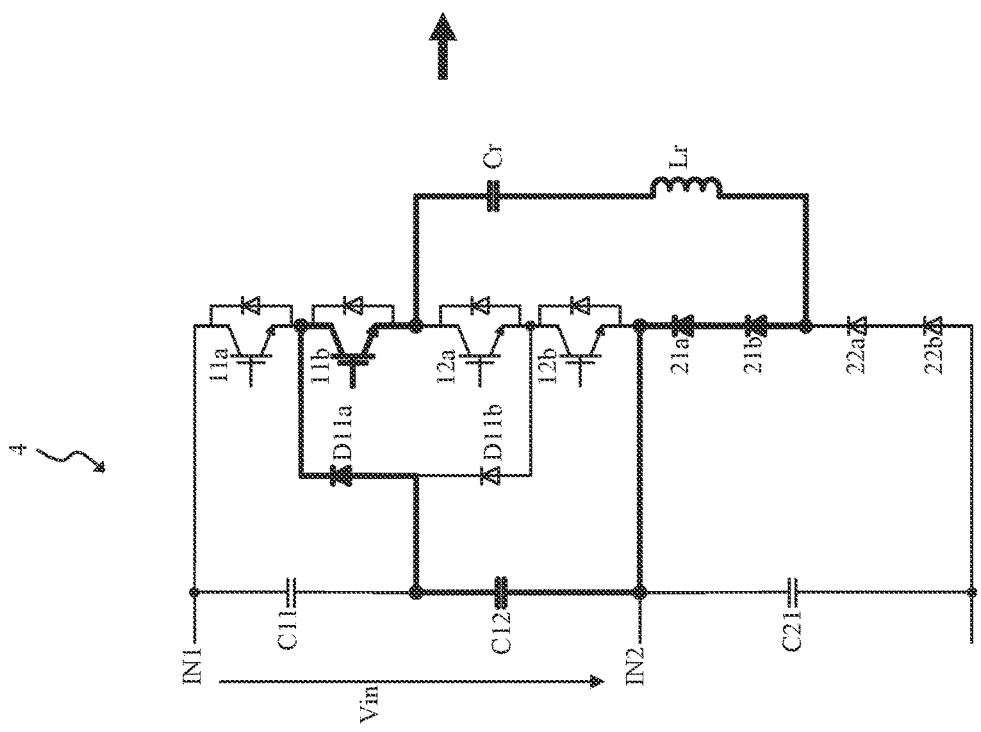

In case the switches 21a, 21b, 22a, 22b of the second switching circuit 2 are not uncontrollable semiconductor switches (diodes), as it is shown in FIG. 7, but they are also controllable semiconductor switches, such as IGBTs, (not shown in FIG. 7), the switches 21a, 21b, 22a, 22b of the second switching circuit 2 are switched according with (in line with) the controllable semiconductor switches 11a, 11b, 12a, 12b of the first switching circuit 1, as described above. That is, corresponding controllable semiconductor switches of the first switching circuit 1 and the second switching circuit 2 are switched together. That is, the topmost switch 21a in the series connection of switches of the second switching circuit 2 and the topmost switch 11a in the series connection of switches of the first switching circuit 1 are switched together, the second-topmost switch 21b in the series connection of switches of the second switching circuit 2 and the second-topmost switch 11b in the series connection of switches of the first switching circuit 1 are switched together and so on.

The switching units 11, 12 of the first switching circuit 1 may be switched between the conducting state and the non-conducting state with a switching frequency that is smaller or equal to the resonant frequency of the resonant circuit. The DC/DC power converter 4 may be switched between the first steady state (shown in FIG. 7(A)) and the second steady state (shown in FIG. 7(F)) with a switching frequency that is smaller or equal to the resonant frequency of the resonant circuit of the DC/DC power converter 4.

The above description is correspondingly valid in case each switching unit of the first switching circuit 1 and optionally of the second switching circuit 2 comprises a series connection of three or more controllable semiconductor switches.

For example, the switching times for switching the controllable semiconductor switches of the first switching circuit 1 and optionally of the second switching circuit 2 may correspond to tens of microseconds. The delay time between the transient switching states of FIGS. 7(B) and 7(C), the delay time between the transient switching states of FIGS. 7(C) and 7(D) and the delay time between the transient switching states of FIGS. 7(D) and 7(E) may for example be 100 ns. The delay time between the transient switching states of FIGS. 7(G) and 7(H) and the delay time between the transient switching states of FIGS. 7(I) and 7(J) may for example be 100 ns. These delay times depend on the turn on (switch on) delays and turn off (switch off) delays of the transistor type, such as IGBTS, BJTs, FETs or MOSFETs, used for implementing the controllable semiconductor switches of the first switching circuit 1 and optionally the second switching circuit 2.

FIGS. 8(A) and (B) each show a DC/DC power converter arrangement, according to an embodiment of the present application.

The above description of the DC/DC power converter arrangement of the third aspect or any of its implementation forms is accordingly valid for the DC/DC power converter arrangement 6 of FIGS. 8(A) and (B).

The DC/DC power converter arrangement 6 of FIG. 8(A) comprises two DC/DC power converters $4_1$ and $4_2$. The above description of the DC/DC power converter of the first aspect or any of its implementation forms is accordingly valid for the DC/DC power converters $4_1$ and $4_2$ of the DC/DC power converter arrangement of FIG. 8(A). The two DC/DC power converters $4_1$ and $4_2$ may correspond to the DC/DC power converter 4 of FIGS. 2, 3(A), 4(A) and 5(A). That is, the two DC/DC power converters $4_1$ and $4_2$ may be implemented as described above with regard to FIGS. 2, 3(A), 4(A) and 5(A). The two DC/DC power converters $4_1$ and $4_2$ may be identically implemented.

As shown in FIG. 8(A), the DC/DC power converter arrangement 6 comprises a cascade of two DC/DC power converters $4_1$ and $4_2$ that are cascaded. The output of a first DC/DC power converter $4_1$ of the two DC/DC power converters $4_1$ and $4_2$ is electrically connected to the input of the second DC/DC power converter $4_2$ of the two DC/DC power converters $4_1$ and $4_2$ such that the first capacitor unit $C1_2$ of the second DC/DC power converter $4_2$ is connected in parallel to the second capacitor unit $C2_1$ of the two capacitor units $C1_1$, $C2_1$ of the first DC/DC power converter $4_1$. According to FIG. 8(A) the parallel connection of the first capacitor unit $C1_2$ of the second DC/DC power converter $4_2$ and the second capacitor unit $C2_1$ of the first DC/DC power converter $4_1$ is implemented by a single capacitor unit. This is only by way of example and does not limit the present disclosure.

In particular, as shown in FIG. 8(A), the optional third output terminal $OUT3_1$ of the output of the first DC/DC power converter $4_1$ and the first input terminal $IN1_2$ of the input of the second DC/DC power converter $4_2$ are connected with each other. The second output terminal $OUT2_1$ of the output of the first DC/DC power converter $4_1$ and the second input terminal $IN2_2$ of the input of the second DC/DC power converter $4_2$ are connected with each other.

The input of the DC/DC power converter arrangement 6 of FIG. 8(A) corresponds to the input of the first DC/DC power converter arrangement $4_1$. In particular, a first input terminal IN1 of the input of the DC/DC power converter arrangement 6 corresponds to the first input terminal $IN1_1$ of the input of the first DC/DC power converter $4_1$ and a second input terminal IN2 of the input of the DC/DC power converter arrangement 6 corresponds to the second input terminal $IN2_1$ of the input of the first DC/DC power converter $4_1$. The output of the DC/DC power converter arrangement 6 comprises two output terminals OUT1 and OUT2. A first output terminal OUT1 of the DC/DC power converter arrangement 6 corresponds to the first output terminal $OUT1_1$ of the output of the first DC/DC power converter $4_1$ and the second output terminal OUT2 of the DC/DC power converter arrangement 6 corresponds to the second output terminal $OUT2_2$ of the output of the second DC/DC power converter $4_2$.

Figure 8:
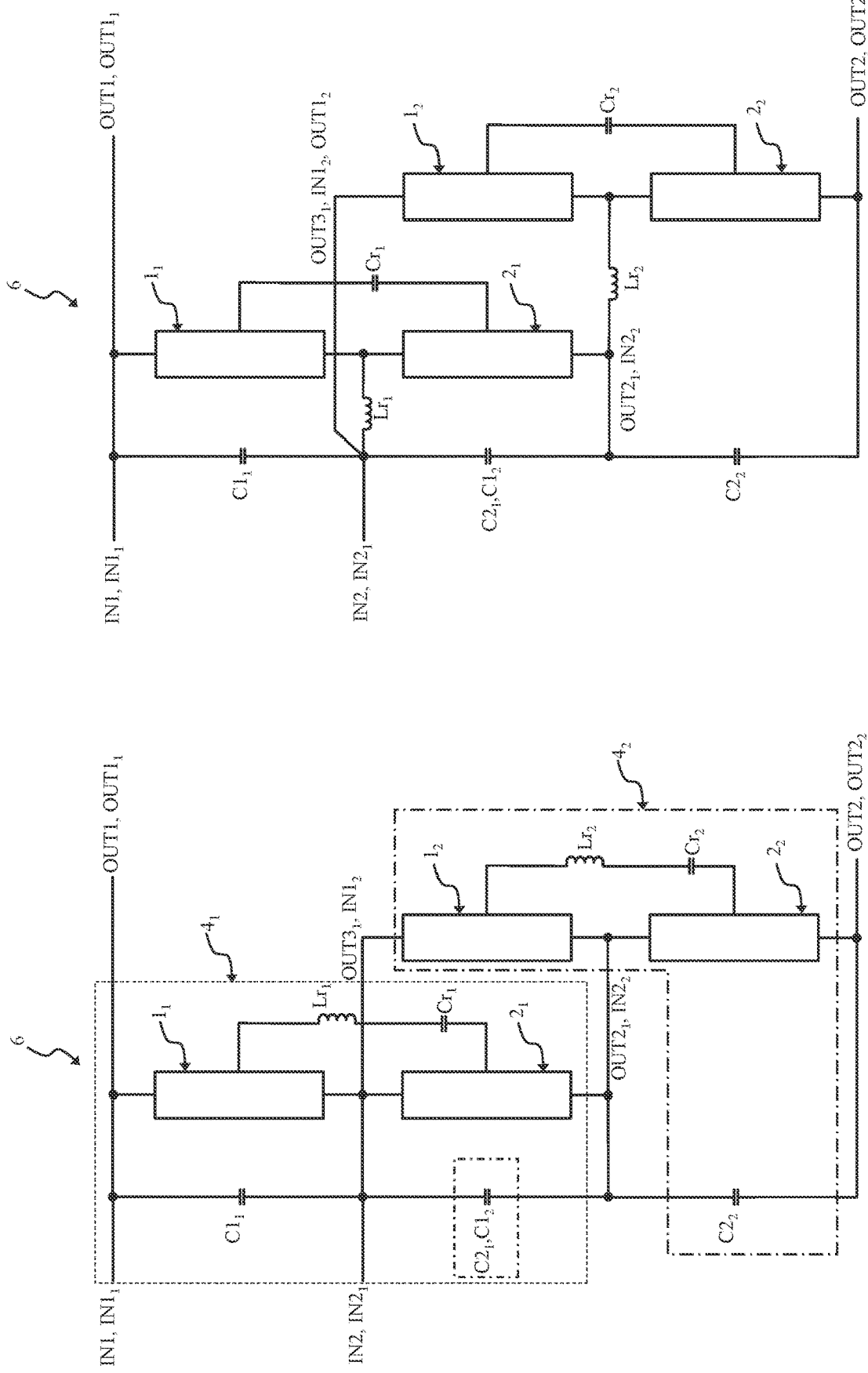
FIGS. 8(A) and (B) each show a DC/DC power converter arrangement, according to an embodiment of the present application.

The DC/DC power converter arrangement 6 of FIG. 8(A) may comprise a control unit (not shown in FIG. 8), which is configured to control the DC/DC power converters of the DC/DC power converter arrangement 6. In particular, the control unit may be configured to perform the method according to the second aspect or any of its implementation forms for controlling the DC/DC power converters.

The control unit of the DC/DC power converter arrangement 6 may comprise or correspond to a microcontroller, controller, microprocessor, processor, field programmable gate array (FPGA), application specific integrated circuit (ASIC) or any combination of the aforementioned components.

The control unit may correspond to a control unit of one DC/DC power converter of the DC/DC power converters of the DC/DC power converter arrangement 6.

In case two or more DC/DC power converters of the DC/DC power converter arrangement 6 comprise a control unit for controlling the respective DC/DC power converter, the control units of these two or more DC/DC power converters may be configured to communicate with each other.

The DC/DC power converter arrangement 6 of FIG. 8(B) corresponds to the DC/DC power converter arrangement 6 of FIG. 8(A). The difference between these two DC/DC power converter arrangements is the implementation of the resonant circuit 3 of the two DC/DC power converters $4_1$ and $4_2$. Namely, as shown in FIG. 8(A), the resonant capacitor $Cr_1$ and resonant inductor $Lr_1$ of the first DC/DC power converter $4_1$ as well as the resonant capacitor $Cr_2$ and resonant inductor $Lr_2$ of the second DC/DC power converter $4_2$ are implemented according to the embodiments of FIGS. 3(A), 4(A) and 5(A). Thus, reference is made to the description of FIGS. 3(A), 4(A) and 5(A) for the description of this implementation form. As shown in FIG. 8(B), the resonant capacitor $Cr_1$ and resonant inductor $Lr_1$ of the first DC/DC power converter $4_1$ as well as the resonant capacitor $Cr_2$ and resonant inductor $Lr_2$ of the second DC/DC power converter $4_2$ are implemented according to the embodiments of FIGS. 3(B), 4(B) and 5(B). Thus, reference is made to the description of FIGS. 3(B), 4(B) and 5(B) for the description of this implementation form.

The description of the DC/DC power converter arrangement 6 of FIG. 8(A) is correspondingly valid for the DC/DC power converter arrangement 6 of FIG. 8(B).

FIGS. 9(A) and (B) each show a DC/DC power converter arrangement, according to an embodiment of the present application.

The DC/DC power converter arrangement 6 of FIG. 9(A) corresponds to the DC/DC power converter 6 of FIG. 8(A), wherein DC/DC power converter arrangement 6 of FIG. 9(A) comprises an additional third DC/DC power converter 6. The description of the DC/DC power converter arrangement 6 of FIG. 8(A) is correspondingly valid for the DC/DC power converter arrangement of FIG. 8(A). Therefore, in the following mainly the additional features of FIG. 9 (A) are described.

As shown in FIG. 9(A), the DC/DC power converter arrangement 6 comprises a cascade of three DC/DC power converters $4_1$, $4_2$ and $4_3$ that are cascaded. The connection of the first DC/DC power converter $4_1$ and the second power converter $4_2$ is as already described with respect to FIG. 8(A).

The output of the second DC/DC power converter $4_2$ of the three DC/DC power converters $4_1$, $4_2$ and $4_3$ is electrically connected to the input of the third DC/DC power converter $4_3$ of the of the three DC/DC power converters $4_1$, $4_2$ and $4_3$ such that the first capacitor unit $C1_3$ of the third DC/DC power converter $4_3$ is connected in parallel to the second capacitor unit $C2_2$ of the two capacitor units $C1_2$, $C2_2$ of the second DC/DC power converter $4_2$. According to FIG. 9(A) the parallel connection of the first capacitor unit $C1_3$ of the third DC/DC power converter $4_3$ and the second capacitor unit $C2_2$ of the second DC/DC power converter $4_2$ is implemented by a single capacitor unit. This is only by way of example and does not limit the present disclosure.

In particular, as shown in FIG. 9(A), the optional third output terminal $OUT3_2$ of the output of the second DC/DC power converter $4_2$ and the first input terminal $IN1_3$ of the input of the third DC/DC power converter $4_3$ are connected with each other. The second output terminal $OUT2_2$ of the output of the second DC/DC power converter $4_2$ and the second input terminal $IN2_3$ of the input of the third DC/DC power converter $4_3$ are connected with each other.

The input of the DC/DC power converter arrangement 6 of FIG. 9(A) corresponds to the input of the first DC/DC power converter arrangement $4_1$. The output of the DC/DC power converter arrangement 6 comprises two output terminals OUT1 and OUT2. A first output terminal OUT1 of the DC/DC power converter arrangement 6 corresponds to the first output terminal $OUT1_1$ of the output of the first DC/DC power converter $4_1$ and the second output terminal OUT2 of the DC/DC power converter arrangement 6 corresponds to the second output terminal $OUT2_3$ of the output of the third DC/DC power converter $4_3$.

The DC/DC power converter arrangement 6 of FIG. 9(B) corresponds to the DC/DC power converter arrangement 6 of FIG. 9(A). The difference between these two DC/DC power converter arrangements is the implementation of the resonant circuit 3 of the three DC/DC power converters $4_1$, $4_2$ and $4_3$. Namely, as shown in FIG. 9(A), the resonant capacitor Cr' and resonant inductor $Lr_1$ of the first DC/DC power converter $4_1$, the resonant capacitor $Cr_2$ and resonant inductor $Lr_2$ of the second DC/DC power converter $4_2$ as well as the resonant capacitor $Cr_3$ and resonant inductor $Lr_3$ of the third DC/DC power converter $4_3$ are implemented according to the embodiments of FIGS. 3(A), 4(A) and 5(A). Thus, reference is made to the description of FIGS. 3(A), 4(A) and 5(A) for the description of this implementation form. As shown in FIG. 9(B), the resonant capacitor Cr' and resonant inductor $Lr_1$ of the first DC/DC power converter $4_1$, the resonant capacitor $Cr_2$ and resonant inductor $Lr_2$ of the second DC/DC power converter $4_2$ as well as the resonant capacitor $Cr_3$ and resonant inductor $Lr_3$ of the third DC/DC power converter $4_3$ are implemented according to the embodiments of FIGS. 3(B), 4 (B) and 5(B). Thus, reference is made to the description of FIGS. 3(B), 4(B) and 5(B) for the description of this implementation form.

The description of the DC/DC power converter arrangement 6 of FIG. 9(A) is correspondingly valid for the DC/DC power converter arrangement 6 of FIG. 9(B).

According to the present disclosure, the DC/DC power converter 6 arrangement may comprise more than three DC/DC power converters that are cascaded with each other. The above description with respect to FIGS. 8(A), (B) and 9(A), (B) is correspondingly valid for this case.

The DC/DC power converter arrangement 6 of FIGS. 8(A) and (B) may be configured to convert an input voltage at its input to an output voltage at its output, which is a multiple of the input voltage and which is greater than the output voltage that may be provided by a single DC/DC power converter at its output, such as one of the DC/DC power converters of the FIGS. 2, 3, 4 and 5. The DC/DC power converter arrangement 6 of FIGS. 9(A) and (B) may be configured to convert an input voltage at its input to an output voltage at its output, which is a multiple of the input voltage and which is greater than the output voltage that may be provided by the DC/DC power converter arrangement 6 of FIGS. 8(A) and (B) at its output. According to an embodiment, the DC/DC power converter arrangement 6 of FIGS. 8(A) and (B) may convert an input voltage at its input to an output voltage at its output, which is three times the input voltage. According to an embodiment, the DC/DC power converter arrangement 6 of FIGS. 9(A) and (B) may converter an input voltage at its input to an output voltage at its output, which is four times the input voltage.

In case the DC/DC power converter arrangement 6 comprises more than three DC/DC power converters that are cascaded, the DC/DC power converter arrangement may be configured to convert an input voltage at its input to an output voltage at its output, which is an integer multiple of the input voltage. The integer multiple is one more than the number of DC/DC power converters of the DC/DC power converter arrangement 6.

Figure 10:
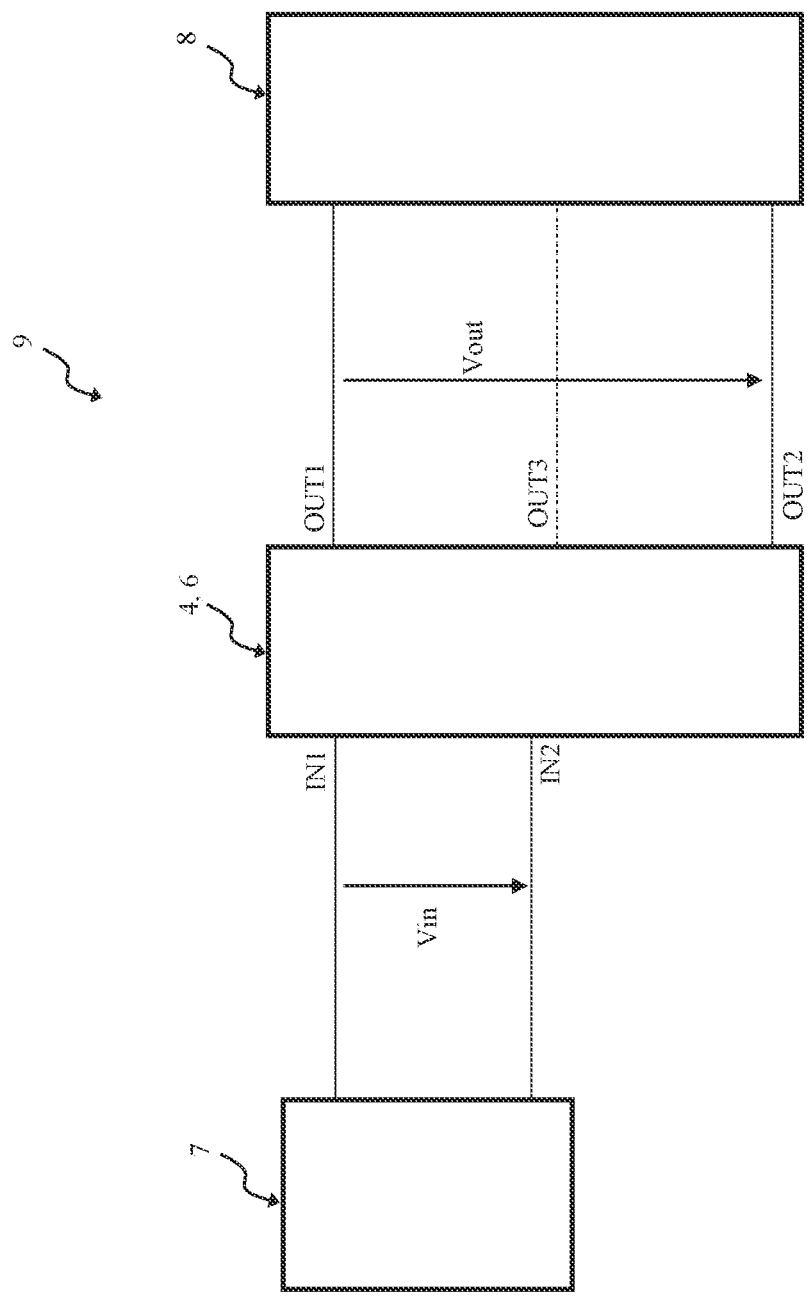
FIG. 10 shows a system, according to an embodiment of the present application.

FIG. 10 shows a system, according to an embodiment of the present application.

The above description of the system of the fourth aspect or any of its implementation forms is accordingly valid for the system of FIG. 10.

According to FIG. 10, the system 9 comprises a DC/DC power converter 4 according to the first aspect or any of its implementation forms. Alternatively, the system 9 comprises a DC/DC power converter arrangement 6 according to the third aspect or any of its implementation forms. The system 9 further comprises a source 7 that is connected to the input, in particular to two input terminals IN1, IN2 of the input, of the DC/DC power converter 4 respectively DC/DC power converter arrangement 6. The source is configured to provide a DC input voltage Vin to the DC/DC power converter 4 respectively DC/DC power converter arrangement 6. For example, the DC input voltage Vin may be between 800 V and 1500 V. In this case, the switches of the DC/DC power converter 4 respectively the DC/DC power converter arrangement 6 may be for example implemented by 950 V or 1200 V voltage blocking class devices. Those devices are low in cost and losses.

The DC/DC power converter 4 is configured to convert the DC input voltage Vin to a DC output voltage Vout, wherein the DC output voltage Vout is a multiple of the DC input voltage Vin. In particular, the DC output voltage Vout may be two times greater than the DC input voltage Vin.

The DC/DC power converter arrangement 6 is configured to convert the DC input voltage Vin to a DC output voltage Vout, wherein the DC output voltage Vout is a multiple of the DC input voltage Vin. In particular, the DC output voltage Vout is a multiple of the DC input voltage Vin and may be greater than two times the DC input voltage Vin. According to an implementation form, the DC output voltage Vout (converted by the DC/DC power converter arrangement 6) may be an integer multiple of the DC input voltage, wherein the integer multiple is one more than the number of DC/DC power converters of the DC/DC power converter arrangement 6.

The source 7 may comprise or correspond to one or more of the following elements: a preceding DC/DC power converter arrangement, an AC/DC power converter, a battery (optionally rechargeable), a solar photo-voltaic (PV) system with one or more solar PV panels, one or more solar PV strings and a wind energy system.

The preceding DC/DC power converter arrangement may correspond to the DC/DC power converter according to the first aspect or any of its implementation forms or to the DC/DC power converter arrangement according to the third aspect or any of its implementation forms.

The DC/DC power converter 4 of the system 9 may correspond to the DC/DC power converter 4 of FIGS. 2, 3(A), (B), 4(A) (B) and 5(A), (B). That is, the DC/DC power converter 4 of the system 9 may be implemented as described above with regard to FIGS. 2, 3(A), (B), 4 (A) (B), 5(A), (B), 6 and 7.

The DC/DC power converter arrangement 6 of the system 9 may correspond to the DC/DC power converter arrangement 6 of FIGS. 8(A) (B) and 9(A), (B). That is, the DC/DC power converter arrangement 6 of the system 9 may be implemented as described above with regard to FIGS. 8(A) (B) and 9(A), (B).

Optionally, the system 9 may further comprise an electric circuit 8 that is connected to the output of the DC/DC power converter 4 respectively DC/DC power converter arrangement 6. In particular, the electric circuit 8 is connected to two output terminals OUT1, OUT2 of the output of the DC/DC power converter 4 respectively DC/DC power converter arrangement 6. Optionally, the electric circuit 8 is also connected to an optional third output terminal OUT3 of the output of the DC/DC power converter 4 respectively DC/DC power converter arrangement 6.

The DC/DC power converter 4 is configured to provide the DC output voltage Vout to the electric circuit 8. The DC/DC power converter arrangement 6 is configured to provide the DC output voltage Vout to the electric circuit 8.

The electric circuit 8 may comprise or correspond to one or more of the following elements: a DC/DC power converter arrangement, a DC/AC power converter, a DC transmission system, a solid state transformer and an electric load. The DC/DC power converter arrangement may correspond to the DC/DC power converter according to the first aspect or any of its implementation forms or to the DC/DC power converter arrangement according to the third aspect or any of its implementation forms.

The DC/DC power converter proposed by the present disclosure is based on low voltage and, thus, low cost semiconductor devices. Thus, the DC/DC power converter according to the present disclosure may be produced with low costs and comprises lower conduction losses. Since the DC/DC power converter proposed by the present disclosure is based on a resonant balancer principle, i.e. it comprises a resonant circuit, the DC/DC power converter comprises minimum switching losses and, thus a high efficiency. In addition, in case of switching controllable semiconductor switches of the DC/DC power converter with a constant duty cycle of 50%, no complex controller is needed and simple gate drivers are sufficient improving costs (low costs).

What is claimed is:

1. A DC/DC power converter for converting a voltage at an input of the DC/DC power converter to a voltage at an output of the DC/DC power converter, wherein the voltage at the output is a multiple of the voltage at the input, wherein the DC/DC power converter comprises:
two switching circuits electrically connected in series;
two capacitor units electrically connected in series, wherein each capacitor unit comprises one or more capacitors and the series connection of the two capacitor units is electrically connected in parallel to the series connection of the two switching circuits;
a resonant circuit comprising a resonant capacitor and a resonant inductor, wherein the resonant circuit is electrically connected to the two switching circuits;
a first capacitor unit of the two capacitor units is electrically connected in parallel to the input;
the series connection of the two switching circuits is electrically connected in parallel to the output;
each switching circuit comprises two switching units electrically connected in series, wherein each switching unit comprises two or more switches electrically connected in series;
a first switching circuit of the two switching circuits is electrically connected to one side of the first capacitor unit opposite to an other side of the first capacitor unit connected to the second capacitor unit of the two capacitor units;
the switches of the first switching circuit are controllable semiconductor switches;
the first capacitor unit comprises two or more capacitors electrically connected in series; and
the first switching circuit comprises one or more diode units electrically connecting the first capacitor unit to the two switching units of the first switching circuit.

2. The DC/DC power converter according to claim 1, wherein:
the switches of the second switching circuit of the two switching circuits are uncontrollable semiconductor switches; or
the switches of the second switching circuit of the two switching circuits are controllable semiconductor switches, the second capacitor unit comprises two or more capacitors electrically connected in series, and the second switching circuit comprises one or more diode units electrically connecting the second capacitor unit to the two switching units of the second switching circuit.

3. The DC/DC power converter according to claim 1, wherein, in response to the two or more switches of each switching unit of a switching circuit of the two switching circuits are two or more controllable semiconductor switches:

a number of the two or more capacitors of a respective capacitor unit corresponds to a number of the two or more switches of each switching unit of the switching circuit; and
a number of the one or more diode units of the switching circuit is one less than the number of the two or more switches of each switching unit of the switching circuit.

4. The DC/DC power converter according to claim 1, wherein in response to each switching unit of a respective switching circuit comprising two controllable semiconductor switches connected in series, the respective switching circuit comprises one diode unit and a respective capacitor unit comprises two capacitors, and wherein:
a midpoint of the series connection of the two capacitors of the respective capacitor unit is connected via a first diode of the diode unit to a midpoint of the series connection of the two switches of a first switching unit of the respective switching circuit and via a second diode of the diode unit to a midpoint of the series connection of the two switches of a second switching unit of the respective switching circuit.

5. The DC/DC power converter according to claim 4, wherein in response to the respective switching circuit being the first switching circuit:
the respective capacitor unit is the first capacitor unit;
the second switching unit of the first switching circuit is connected to the midpoint of the series connection of the two switching circuits;
the midpoint of the series connection of the two capacitors of the first capacitor unit is connected to an anode of the first diode, wherein a cathode of the first diode is connected to the midpoint of the series connection of the two switches of the first switching unit; and
the midpoint of the series connection of the two capacitors of the first capacitor unit is connected to a cathode of the second diode, wherein an anode of the second diode is connected to the midpoint of the series connection of the two switches of the second switching unit; or
in response to the respective switching circuit being the second switching circuit:
the respective capacitor unit is the second capacitor unit;
the first switching unit of the second switching circuit is connected to the midpoint of the series connection of the two switching circuits;
the midpoint of the series connection of the two capacitors of the second capacitor unit is connected to the anode of the first diode, wherein the cathode of the first diode is connected to the midpoint of the series connection of the two switches of the first switching unit; and
the midpoint of the series connection of the two capacitors of the second capacitor unit is connected to the cathode of the second diode, wherein the anode of the second diode is connected to the midpoint of the series connection of the two switches of the second switching unit.

6. The DC/DC power converter according to claim 1, wherein in a case wherein each switching unit of a respective switching circuit comprises three or more controllable semiconductor switches connected in series, wherein the respective switching circuit comprises two or more diode units and a respective capacitor unit comprises three or more capacitors, wherein:
each node between two capacitors of the respective capacitor unit is connected via a first diode of a respective diode unit of the two or more diode units to a first node between two switches of a first switching unit of the two switching units of the respective switching circuit and via a second diode of the respective diode unit to a second node between two switches of the second switching unit of the two switching units of the respective switching circuit, wherein a positon of the first node in the series connection of the three or more switches of the first switching unit and a positon of the second node in the series connection of the three or more switches of the second switching unit correspond to each other, and wherein the nodes of the series connection of the three or more capacitors of the respective capacitor unit are connected to different nodes of the two switching units of the respective switching circuit.

7. The DC/DC power converter according to claim 6, wherein in response to the respective switching circuit being the first switching circuit, and wherein:

the respective capacitor unit is the first capacitor unit;

the second switching unit of the first switching circuit is connected to a midpoint of the series connection of the two switching circuits;

each node between two capacitors of the first capacitor unit is connected to:

an anode of the first diode of the respective diode unit of the two or more diode units, wherein a cathode of the first diode is connected to the respective first node between two switches of the first switching unit of the two switching units of the first switching circuit; and a cathode of the second diode of the respective diode unit, wherein an anode of the second diode is connected to the respective second node between two switches of the second switching unit of the two switching units of the first switching circuit; or in response to the respective switching circuit being the second switching circuit and the respective capacitor unit is the second capacitor unit;

the first switching unit of the second switching circuit is connected to the midpoint of the series connection of the two switching circuits and each node between two capacitors of the second capacitor unit is connected to the anode of the first diode of the respective diode unit of the two or more diode units, wherein the cathode of the first diode is connected to the respective first node between two switches of the first switching unit of the two switching units of the second switching circuit, and to the cathode of the second diode of the respective diode unit, wherein the anode of the second diode is connected to the respective second node between two switches of the second switching unit of the two switching units of the second switching circuit.

8. The DC/DC power converter according to claim 1, wherein the two or more capacitors of the first capacitor unit are dimensioned such that a voltage at each capacitor of the first capacitor unit corresponds to a voltage at the first capacitor unit divided by a number of capacitors of the first capacitor unit.

9. The DC/DC power converter according to claim 1, wherein:

the resonant capacitor and the resonant inductor are connected in series between a midpoint of the series connection of the two switching units of the first switching circuit and a midpoint of the series connection of the two switching units of the second switching circuit, or the resonant capacitor is electrically connected between the midpoint of the series connection of the two switching units of the first switching circuit and the midpoint of the series connection of the two switching units of the second switching circuit, and the resonant inductor is electrically connected between a midpoint of the series connection of the two capacitor units and the midpoint of the series connection of the two switching circuits.

10. The DC/DC power converter according to claim 1, wherein the input comprises two input terminals and the output comprises two output terminals, and wherein:

a first input terminal of the two input terminals and a first output terminal of the two output terminals is electrically connected to one end of the series connection of the two capacitor units and one end of the series connection of the two switching circuits;

the second input terminal of the two input terminals is connected to a midpoint of the series connection of the two capacitor units; and the second output terminal of the two output terminals is connected to an other end of the series connection of the two capacitor units and an other end of the series connection of the two switching circuits.

11. The DC/DC power converter according to claim 10, wherein the output comprises a third output terminal, and wherein:

the third output terminal is electrically connected to the midpoint of the series connection of the two capacitor units and a midpoint of the series connection of the two switching circuits, in response to the resonant capacitor and the resonant inductor being electrically connected in series; or the third output terminal is electrically connected to the midpoint of the series connection of the two capacitor units, in case the resonant inductor is electrically connected between the midpoint of the series connection of the two capacitor units and the midpoint of the series connection of the two switching circuits.

12. The DC/DC power converter according to claim 1, wherein the DC/DC power converter comprises a control unit, and wherein:

the control unit is configured to complementary switch the switching units of the first switching circuit, with a duty cycle of 50%, between a conducting state and a non-conducting state; and the control unit is configured to complementary switch the switching units of the first switching circuit and the second switching circuit, with a duty cycle of 50%, between the conducting state and the non-conducting state.

13. The DC/DC power converter according to claim 12, wherein the control unit is configured to switch each switching unit of a respective switching circuit between the conducting state and non-conducting state by switching the switches of the respective switching unit after each other.

14. The DC/DC power converter according to claim 12, wherein the control unit is configured to complementary switch the two switching units of a respective switching circuit between the conducting and non-conducting state by alternately switching the switches of the two switching units of the respective switching circuit.

15. The DC/DC power converter according to claim 12, wherein the control unit is configured to switch each switching unit of the two switching units of a respective switching circuit from the conducting state to the non-conducting state by switching the two or more switches of the respective switching unit from the conducting state to the non-conducting state after each other according to a position in the series connection of the two or more switches of the respective switching unit such that the switch of the respective switching unit furthest away from the midpoint of the series connection of the two switching units of the respective switching circuit is switched at first from the conducting state to the non-conducting state.

16. The DC/DC power converter according to claim 12, wherein the control unit is configured to switch each switching unit of the two switching units of a respective switching circuit from the non-conducting state to the conducting state by switching the two or more switches of the respective switching unit from the non-conducting state to the conducting state after each other according to a position in the series connection of the two or more switches of the respective switching unit such that the switch of the respective switching unit connected to a midpoint of the series connection of the two switching units of the respective switching circuit is switched at first from the non-conducting state to the conducting state.

17. The DC/DC power converter according to claim 12, wherein the control unit is configured to switch the switching units between the conducting state and the non-conducting state with a switching frequency that is smaller or equal to a resonant frequency of the resonant circuit.

18. A method for controlling switching of a DC/DC power converter according to claim 1, wherein:
   the switching units of the first switching circuit are complementary switched, by a control unit, with a duty cycle of 50%, between a conducting state and a non-conducting state, and
   the switching units of the first switching circuit and the second switching circuit are complementary switched, by a control unit, with a duty cycle of 50%, between the conducting state and the non-conducting state.

19. A DC/DC power converter arrangement comprising a cascade of a plurality of DC/DC power converters that are cascaded,
   wherein each DC/DC power converter comprises;
   two switching circuits electrically connected in series;
   two capacitor units electrically connected in series, wherein each capacitor unit comprises one or more capacitors and the series connection of the two capacitor units is electrically connected in parallel to the series connection of the two switching circuits; and
   a resonant circuit comprising a resonant capacitor and a resonant inductor, wherein the resonant circuit is electrically connected to the two switching circuits,
   wherein a first capacitor unit of the two capacitor units is electrically connected in parallel to an input of the DC/DC power converter and the series connection of the two switching circuits is electrically connected in parallel to an output of the DC/DC power converter, and
   wherein an output of a first DC/DC power converter of the plurality of DC/DC power converters is electrically connected to an input of a second DC/DC power converter of the plurality of DC/DC power converters such that a first capacitor unit of the second DC/DC power converter is connected in parallel to a second capacitor unit of the two capacitor units of the first DC/DC power converter.

20. The DC/DC power converter arrangement according to claim 19, wherein aninput of each further DC/DC power converter of the plurality of DC/DC power converters is connected to the output of a respective preceding DC/DC power converter such that the first capacitor unit of the respective further DC/DC power converter is connected in parallel to the second capacitor unit of the respective preceding DC/DC power converter.

21. The DC/DC power converter arrangement according to claim 19, wherein one or more DC/DC power converters of the plurality of DC/DC power converters comprises:
   two switching circuits electrically connected in series;
   two capacitor units electrically connected in series, wherein each capacitor unit comprises one or more capacitors and the series connection of the two capacitor units is electrically connected in parallel to the series connection of the two switching circuits;
   a resonant circuit comprising a resonant capacitor and a resonant inductor, wherein the resonant circuit is electrically connected to the two switching circuits;
   a first capacitor unit of the two capacitor units is electrically connected in parallel to the input;
   the series connection of the two switching circuits is electrically connected in parallel to the output;
   each switching circuit comprises two switching units electrically connected in series, wherein each switching unit comprises two or more switches electrically connected in series;
   a first switching circuit of the two switching circuits is electrically connected to one side of the first capacitor unit opposite to an other side of the first capacitor unit connected to the second capacitor unit of the two capacitor units;
   the switches of the first switching circuit are controllable semiconductor switches;
   the first capacitor unit comprises two or more capacitors electrically connected in series; and
   the first switching circuit comprises one or more diode units electrically connecting the first capacitor unit to the two switching units of the first switching circuit.

22. A system, wherein:
   the system comprises:
   a DC/DC power converter according to claim 1; and
   a source that is connected to the input of the DC/DC power converter,
   wherein the source is configured to provide a DC input voltage to the input of the DC/DC power converter and the DC/DC power converter is configured to convert the DC input voltage to a DC output voltage, wherein the DC output voltage is a multiple of the DC input voltage; or
   the system comprises:
   a DC/DC power converter arrangement according to claim 19; and
   a source that is connected to the input of the DC/DC power converter arrangement and in particular to the input of the first DC/DC power converter of the DC/DC power converter arrangement,
   wherein the source is configured to provide a DC input voltage to the input of the DC/DC power converter arrangement and the DC/DC power converter arrangement is configured to convert the DC input voltage to a DC output voltage, and wherein the DC output voltage is a multiple of the DC input voltage.

* * * * *

UNITED STATES PATENT AND TRADEMARK OFFICE
CERTIFICATE OF CORRECTION

PATENT NO. : 12,206,324 B2
APPLICATION NO. : 17/991645
DATED : January 21, 2025
INVENTOR(S) : Wijekoon et al.

Page 1 of 1

It is certified that error appears in the above-identified patent and that said Letters Patent is hereby corrected as shown below:

In the Claims

Claim 3: Column 48, Line 6: "circuit is one less than the number of the two or more" should read as -- circuit is one less than a number of the two or more --.

Claim 7: Column 49, Line 35: "the respective capacitor unit is the second capacitor unit;" should read as -- the respective capacitor unit is the second capacitor unit: --.

Claim 7: Column 49, Line 45: "two switching units of the second switching circuit, and" should read as -- two switching units of the second switching circuit and --.

Claim 15: Column 51, Line 2: "switching unit furthest away from the midpoint of the series" should read as -- switching unit furthest away from a midpoint of the series --.

Claim 19: Column 51, Line 37: "wherein each DC/DC power converter comprises;" should read as -- wherein each DC/DC power converter comprises: --.

Claim 19: Column 51, Line 57: "such that a first capacitor unit of the second DC/DC" should read as -- such that a first capacitor unit of a second DC/DC --.

Claim 20: Column 51, Line 62: "to claim 19, wherein aninput of each further DC/DC power" should read as -- to claim 19, wherein an input of each further DC/DC power --.

Claim 20: Column 52, Line 1: "connected to the output of a respective preceding DC/DC" should read as -- connected to an output of a respective preceding DC/DC --.

Signed and Sealed this
Seventeenth Day of June, 2025

Coke Morgan Stewart
*Acting Director of the United States Patent and Trademark Office*